US009100675B2

(12) United States Patent
Gillies et al.

(10) Patent No.: US 9,100,675 B2
(45) Date of Patent: Aug. 4, 2015

(54) SYSTEM AND METHOD FOR DISTRIBUTING AND REDEEMING COUPONS ON A BROADCAST SYSTEM

(75) Inventors: Donald William Gillies, San Diego, CA (US); Charles N. Lo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 173 days.

(21) Appl. No.: 12/630,770

(22) Filed: Dec. 3, 2009

(65) Prior Publication Data

US 2010/0122274 A1  May 13, 2010

Related U.S. Application Data

(63) Continuation-in-part of application No. 12/417,493, filed on Apr. 2, 2009, now Pat. No. 8,689,247.

(60) Provisional application No. 61/042,597, filed on Apr. 4, 2008, provisional application No. 61/061,556, filed on Jun. 13, 2008, provisional application No. 61/120,355, filed on Dec. 5, 2008.

(51) Int. Cl.
*H04N 21/478* (2011.01)
*H04N 21/2543* (2011.01)
(Continued)

(52) U.S. Cl.
CPC ......... *H04N 21/2543* (2013.01); *G06Q 20/387* (2013.01); *G06Q 30/02* (2013.01);
(Continued)

(58) Field of Classification Search
CPC ............... H04N 21/47815; H04N 21/4784; G06Q 30/0207

USPC ........................................ 725/5, 23; 705/14.1
See application file for complete search history.

(56) References Cited

U.S. PATENT DOCUMENTS 5,465,401 A    11/1995  Thompson
7,134,145 B1 * 11/2006  Epstein ........................... 726/27
(Continued)

FOREIGN PATENT DOCUMENTS

CN    1212576 A    3/1999
EP    0891084 A2   1/1999
(Continued)

OTHER PUBLICATIONS

International Search Report—PCT/US09/039499, International Search Authority—European Patent Office—Jul. 21, 2009.
(Continued)

*Primary Examiner* — Robert Hance
(74) *Attorney, Agent, or Firm* — The Marbury Law Group, PLLC

(57) ABSTRACT

Methods and systems enable receiver devices to receive electronic coupons from mobile TV broadcast service providers. Coupon templates may be broadcasted to mobile devices. Coupon templates may be used to communicate with coupon managers to receive digitally signed coupons. Coupon managers may use received data to create digitally signed coupons for delivery to receiver devices via a unicast networks. Digitally signed coupons may also be broadcasted to receiver devices. A receiver device may verify received electronic coupons using the digital signature to identify those coupons intended for them. The electronic coupons may be redeemed at a point of sale. Merchants may locally verify coupons using their digital signature. Coupon digital signatures may be generated using a chain of X.509 certificates leading to a root X.509 coupon-signing authority to enable recipients to confirm that coupons originated from a trustworthy entity.

46 Claims, 33 Drawing Sheets

(51) Int. Cl.

| | | |
|---|---|---|
| *G06Q 20/38* | (2012.01) | |
| *G06Q 30/02* | (2012.01) | |
| *H04N 7/173* | (2011.01) | |
| *H04N 21/254* | (2011.01) | |
| *H04N 21/258* | (2011.01) | |
| *H04N 21/266* | (2011.01) | |
| *H04N 21/41* | (2011.01) | |
| *H04N 21/414* | (2011.01) | |
| *H04N 21/4623* | (2011.01) | |
| *H04N 21/4784* | (2011.01) | |

(52) U.S. Cl.
CPC ....... *G06Q30/0207* (2013.01); *H04N 7/17318* (2013.01); *H04N 21/2542* (2013.01); *H04N 21/25816* (2013.01); *H04N 21/26613* (2013.01); *H04N 21/4126* (2013.01); *H04N 21/41407* (2013.01); *H04N 21/4623* (2013.01); *H04N 21/4784* (2013.01); *H04N 21/47815* (2013.01)

(56) References Cited

U.S. PATENT DOCUMENTS

| | | | |
|---|---|---|---|
| 7,209,733 | B2 | 4/2007 | Ortiz et al. |
| 7,437,574 | B2* | 10/2008 | Ronkka et al. ............... 713/194 |
| 7,660,580 | B2 | 2/2010 | Jiang |
| 7,882,356 | B2* | 2/2011 | Klemets et al. ............... 713/172 |
| 2001/0014870 | A1* | 8/2001 | Saito et al. ...................... 705/14 |
| 2002/0042774 | A1 | 4/2002 | Ortiz et al. |
| 2002/0143612 | A1* | 10/2002 | Barik et al. ...................... 705/14 |
| 2003/0023482 | A1* | 1/2003 | Messner et al. ................. 705/14 |
| 2003/0236756 | A1* | 12/2003 | Humpleman et al. .......... 705/76 |
| 2004/0132437 | A1* | 7/2004 | Ohmori et al. ............. 455/414.1 |
| 2004/0215510 | A1 | 10/2004 | Wilkie |
| 2005/0027810 | A1 | 2/2005 | Donovan |
| 2006/0148404 | A1 | 7/2006 | Wakim |
| 2006/0149679 | A1* | 7/2006 | Nishizawa et al. ............. 705/51 |
| 2006/0156329 | A1 | 7/2006 | Treese |
| 2006/0269222 | A1* | 11/2006 | Horii .............................. 386/83 |
| 2007/0027755 | A1 | 2/2007 | Lee |
| 2007/0150339 | A1* | 6/2007 | Retter et al. .................... 705/14 |
| 2007/0203792 | A1* | 8/2007 | Rao ................................ 705/14 |
| 2007/0234058 | A1* | 10/2007 | White ........................... 713/176 |
| 2008/0052169 | A1 | 2/2008 | O'Shea et al. |
| 2008/0065490 | A1* | 3/2008 | Novick et al. .................. 705/14 |
| 2008/0154714 | A1* | 6/2008 | Liu et al. ......................... 705/14 |
| 2008/0200153 | A1* | 8/2008 | Fitzpatrick et al. ........ 455/414.1 |
| 2009/0076912 | A1 | 3/2009 | Rajan et al. |
| 2009/0254930 | A1 | 10/2009 | Lo et al. |

FOREIGN PATENT DOCUMENTS

| | | | |
|---|---|---|---|
| GB | 2370946 | | 7/2002 |
| GB | 2391683 | | 2/2004 |
| KR | 19990013861 | | 2/1999 |
| KR | 20030029294 | A | 4/2003 |
| KR | 20030080111 | A | 10/2003 |
| KR | 20050092068 | A | 9/2005 |
| KR | 20070096530 | A | 10/2007 |
| WO | 9930256 | | 6/1999 |
| WO | WO0213073 | A1 | 2/2002 |
| WO | WO03044711 | A1 | 5/2003 |
| WO | 2006031202 | | 3/2006 |
| WO | WO 2006031202 | A1 * | 3/2006 ............ H04H 1/00 |

OTHER PUBLICATIONS

Partial Search Report—PCT/US2009/066829—International Search Authority—European Patent Office, Mar. 26, 2010.
Written Opinion—PCT/US09/039499, International Search Authority—European Patent Office—Jul. 21, 2009.
"Electronic Coupon Smart Cards for Internet PCs and Interactive TVs" IBM Technical Disclosure Bulletin, International Business Machines Corp. (Thornwood), US, vol. 41, No. 414, Oct. 1, 1998, XP002101012, ISSN: 0018-8689, the whole document.
International Search Report, PCT/US2009/066829, International Searching Authority, European Patent Office, May 12, 2010.
Written Opinion, PCT/US2009/066829, International Searching Authority, European Patent Office, May 12, 2010.

* cited by examiner

| Code | Status |
|---|---|
| 000 | Success |
| 003 | Purchase Item Unknown |
| 009 | Charging Error |
| 011 | Operation not Permitted |
| 015 | Requested Service Unavailable |
| 016 | Request already Processed |
| 021 | Information Invalid |
| 022 | Invalid Request |
| 031 | Coupon Expired |
| 032 | Coupon Already Used |

604a

SYSTEM AND METHOD FOR DISTRIBUTING AND REDEEMING COUPONS ON A BROADCAST SYSTEM

RELATED APPLICATIONS

This application is a continuation-in-part (CIP) patent application of and claims priority to U.S. patent application Ser. No. 12/417,493, entitled "Systems And Methods For Distributing And Redeeming Credits On A Broadcast System" filed on Apr. 2, 2009, issued as U.S. Pat. No. 8,689,247 on Apr. 1, 2014, which claims the benefit of priority to U.S. Provisional Application Nos.: 61/042,597 entitled "Method and Apparatus for Enabling and Applying Coupon and Token Usage in Mobile Television" filed Apr. 4, 2008; 61/061,556 entitled "Coupons for Broadcast Content Redemption" filed Jun. 13, 2008; and 61/120,355 entitled "Enhanced Coupons for Broadcast Content Redemption" filed Dec. 5, 2008, the entire contents of all of which are hereby incorporated by reference.

This application also separately claims the benefit of priority to U.S. Provisional Application No. 61/120,355 entitled "Enhanced Coupons for Broadcast Content Redemption" filed Dec. 5, 2008.

BACKGROUND

Wireless communication technologies have seen explosive growth over the past few years. This growth has been fueled by wireless services providing freedom of movement to the mobile public, and cutting the tether to hardwired communication systems. In addition, the increasing quality and speed of voice and data communications over the wireless medium has attracted additional users. As a result of these service enhancements, the popularity of wireless services is expected to continue to grow rapidly.

A recent addition to wireless communication technologies has been the ability to broadcast television to mobile users. Mobile broadcast users can view mobile editions of news, entertainment, sports, business, and other programming using their cell phone or other wireless devices. These broadcast systems have seen significant increase in usage and availability worldwide. At present, users of mobile television and broadcast systems pay fees to receive program content. These fees vary with the service provider and level of service chosen.

SUMMARY

The various embodiments herein provide methods and systems for delivering digitally signed coupons to receiver device users and redeeming those coupons to purchase rights to view broadcast content or purchase products or services. In an embodiment, encrypted coupon templates may be delivered to receiver device users via the broadcast network. The receiver devices may decrypt the coupon templates and use the data obtained from the coupon templates to request digitally signed coupons from coupon managers. Coupon managers may receive the request for digitally signed coupons along with device data. The coupon mangers may use the device data to create and deliver digitally signed coupons to the requesting receiver devices via a unicast network or the Internet. The signature on coupons may be calculated over the entire coupon record, including coupon identity to prevent counterfeit coupons or other masquerading as legitimate coupon holders.

In a further embodiment, digitally signed coupons may be delivered to receiver devices via the broadcast network. A receiver device may decrypt the received coupon signature to determine whether the coupon is intended for the receiver device. If the data received in the digitally signature matches data possessed by the receiver device, the receiver device may store the coupon in memory. If the data received in the digitally signature does not match the data possessed by the receiver device, the receiver device may ignore the coupon.

In a further embodiment, digitally signed coupons may be redeemed at a point of sale. Upon presenting the coupon at the point of sale, the coupon may be verified by the point of sale system based upon coupon data and the digital signature. Alternatively, the coupon itself may indicate that the merchant point of sale system should request a coupon manager to verify the coupon by sending the coupon and receiver device data to the coupon manager. The coupon manager may decrypt the coupon signature and determine whether the coupon and received data match the data retrieved from the coupon signature. If the data match, the coupon manager may transmit a verification message to the point of sale to authorize or authenticate the purchase transaction using the presented coupon. A cancellation message may also be transmitted to the receiver device to delete or cancel the presented coupon from the receiver device. If the data do not match, the coupon manager may transmit a rejection message to the point of sale to inform the merchant that the coupon is not authentic or authorized for the purchase transaction.

In a further embodiment, the digitally signed coupons may include a weighted number. Such a weight number may be used by the coupon manger to determine whether two or more coupons may be combined in a single purchase transaction. The coupon manager may receive coupon data from the point of sale and calculate the sum of the weight numbers. If the sum of the weigh numbers of several coupons is greater than a pre-determined number, the combination of the coupons may be rejected.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
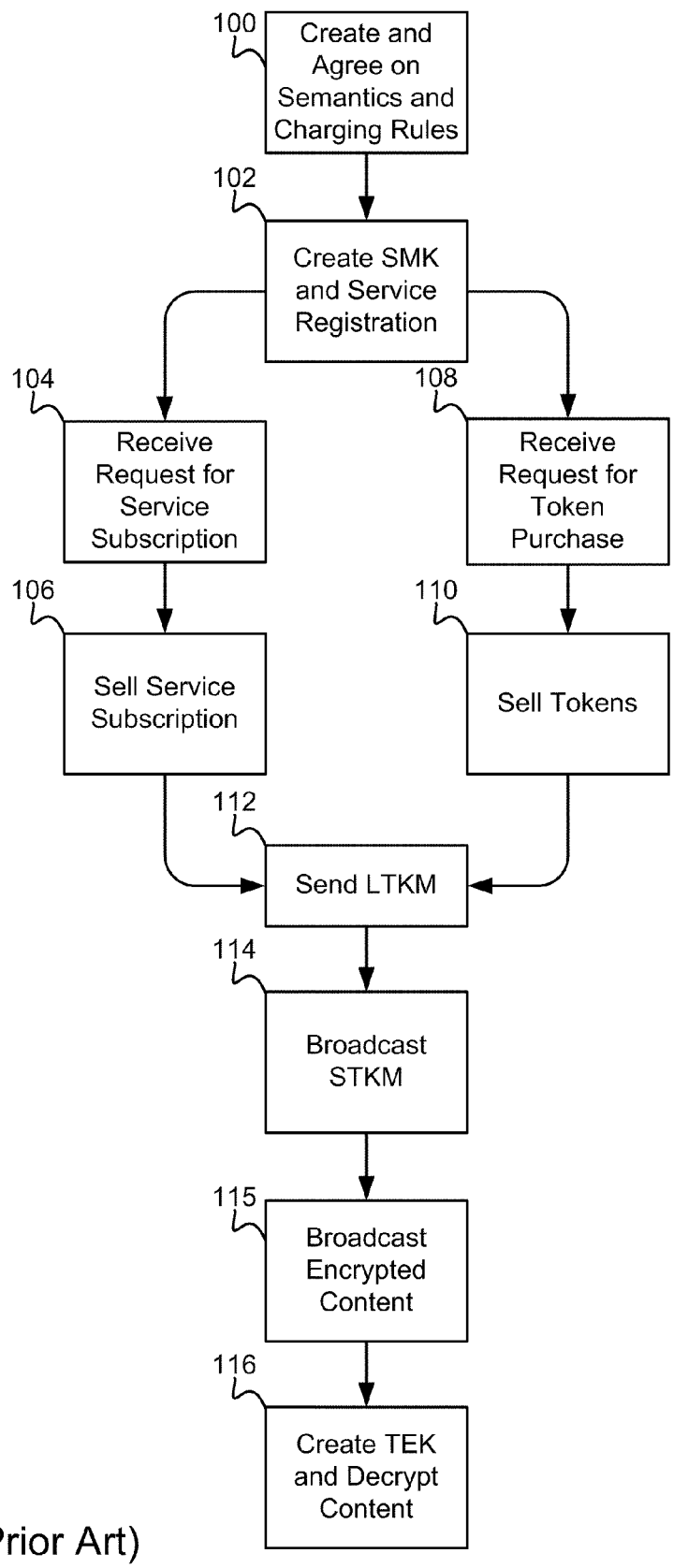
FIG. 1 is a process flow diagram of conventional methods used to provision receiver devices to receive mobile broadcasts.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, the terms "receiver device" and "mobile device" are used interchangeably herein to refer to any one or all of cellular telephones, personal data assistants (PDA's), palm-top computers, wireless electronic mail receivers (e.g., the Blackberry® and Treo® devices), multimedia Internet enabled cellular telephones (e.g., the Blackberry Storm®), Global Positioning System (GPS) receivers, wireless gaming controllers, and similar personal electronic devices which include a programmable processor and memory and receiver circuitry for receiving and processing mobile broadcast television services. As used herein, mobile devices are receiver devices; however, not all receiver devices are "mobile" as some embodiments may be implemented with non-mobile receiver devices.

The words "credit," "incentive," "promotion," "coupon" and "token" are used herein interchangeably to refer to a unit of value that may be exchanged for or otherwise spent to receive something of value, such as the ability to receive one or more mobile television broadcasts, or to purchase products or services. In the context of the various embodiments, such credits or coupons may be issued or created by vendors, businesses, or content providers as part of programs to reward consumers for purchasing various products or services or viewing certain content, or to motivate consumers to take a particular course of action, view a particular program or purchase a particular product or service.

The term "unicast network" is used herein to refer to communication networks which transmit data to a single destination. Examples of a unicast network include WiFi and cellular data communication networks. Examples of unicast transmissions include simple message service (SMS), multimedia message service (MMS), and electronic mail messages as may be carried via a cellular telephone data communication network.

The word "broadcast" is used herein to mean the transmission of data (information packets) so that it can be received by a large number of receiving devices. Examples of a broadcast message are mobile television service broadcast signals.

The word "content providers" is used herein to refer to companies which provide video, website and other data that is broadcast over a mobile television system. The term "network providers" is used herein to refer to those entities which broadcast mobile television signals. Typically, network providers receive broadcast content from the content providers. The term "advertisers" is used herein to generally refer to merchants, manufacturers, service providers, and other entities that may purchase advertising or paid for product placements within broadcast content.

The following reference Table 1 includes an alphabetical list of abbreviations with their related meanings as used herein:

TABLE 1

Table of Abbreviations

| Abbreviations | Meanings |
| --- | --- |
| BCMCS | Broadcast and Multicast Services |
| BDS | Broadcast Distribution System |
| BSM | Broadcast Service Management/Provider |
| DRM | Digital Rights Management |
| GBA | Generic Bootstrapping Architecture |
| ID | Identifier |
| KMS | Key Management System |
| LTKM | Long Term Key Massage |
| MMS | Multimedia Message Service |
| MIKEY | Multimedia Internet Keying |
| NTP | Network Time Protocol |

TABLE 1-continued

Table of Abbreviations

| Abbreviations | Meanings |
| --- | --- |
| OMA BCAST | Open Mobile Alliance Broadcast Working Group |
| POS | Point of Sale |
| PPP | Pay-Per-Play |
| PPT | Pay-Per-Time |
| PPV | Pay-Per-View |
| RO | Rights Object (i.e., an object subject to DRM) |
| SMK | Subscriber Management Key |
| SMS | Short Message Service |
| SPE | Security Policy Extension |
| STKM | Short Term Key Message |
| TEK | Traffic Encryption Key |

The growing popularity of mobile television (TV) has provided new sources of revenue for content providers, network providers, and merchants, manufactures, service providers, and other advertisers who can use the new medium to reach consumers. New revenue models include subscription-based sales of mobile television access, PPV or PPT mobile television access, advertising, and cross marketing of goods and services to consumers such as via loyalty or incentive programs. For example, mobile TV network providers can generate revenue from their service by selling subscriptions to users with access to mobile TV broadcast networks limited to subscribers. Merchants or manufacturers may advertise on the mobile TV broadcast system to generate revenue from the sale of their products and services. As usage continues to increase, mobile broadcast service providers may wish to simplify and encourage access to consumers through the use of credits such as coupons and tokens that can be delivered to mobile receiver devices and exchanged to purchase mobile TV content (i.e., viewing privileges), service or products.

Mobile TV users are different from the home television audience in that they use viewing devices (i.e. receiver devices) that they carry with them which receive mobile TV broadcast services and can communicate via unicast messages. Additionally, mobile receiver devices can be personalized to users since in the majority of instances only one person uses a mobile device. Typically, users carry their mobile devices with them everywhere, including when shopping for products and services. Thus, the mobility and access to mobile TV broadcasting services mean that mobile receiver devices may be highly valuable marketing tools for reaching particular customers and building customer loyalty. Therefore, mobile receiver devices provide unique opportunities to reward high-value customers.

Providers may employ different methods to measure the value of their customers. For example, users who significantly engaged in the use of their receiver devices to view mobile broadcast TV content may be especially valuable to content providers, such as television producers, movie studios, and music publishing houses. Using the technologies available on mobile devices, the actual content viewed by users may be measured explicitly such as through in-program voting, betting or purchasing utilities, or implicitly such as through audience measurements. Further, measurement software can run in conjunction with the tuner on the mobile device to monitor channel changes to provide accurate measures of the broadcast audience. Additionally, the unicast communication capabilities of mobile devices can be used to receive immediate feedback and direct measurements of content viewing. In addition to being able to determine who is viewing their content, mobile devices and can also provide important demographic information to content providers, allowing them to characterize their audience in terms of important demographic and related consumer information.

In addition to being able to measure general audience participation and demographics, pay-per-view and pay-per-time access services can enable content providers to identify and track actual viewers. Thus, targeted consumer loyalty programs can be enabled on mobile devices in ways not possible through conventional broadcast television.

Since content providers can identify individual viewers, they may want to implement targeted marketing programs aimed at retaining their customers, increasing customer satisfaction, and promoting similar content. One vehicle for building customer loyalty and expanding audiences involves rewarding customers with free access to broadcast content. For example, a content provider may wish to grant its loyal viewers credits or coupons enabling them to see a first-run movie, or allowing access to free music downloads. Thus, a content provider may wish to provide coupons to those viewers of particular mobile TV programs to encourage them to see a similar movie at a conventional movie theater. Similarly, content providers may wish to give loyal viewers credits or coupons to enable them to view more of their programs on mobile TV. In addition, content providers may wish to run a cross-promotion, enticing viewers to watch content on a home (possibly fixed) subscription-based television system, such as DirecTV™ or Dish™ Network.

Content providers are not alone in benefiting from customer loyalty coupons that may be delivered to mobile devices. Commercial businesses that sell directly to consumers, such as retail stores and consumer service providers, can identify their customers at the point of sale (POS). Traditionally, merchants have provided customers with paper coupons and similar promotional items. The technical capabilities of mobile devices provide merchants with new vehicles for rewarding customer loyalty. For example, merchants may wish to provide loyal customers with credits or coupons that they can use to view mobile TV programs. If the credits or coupons enable customers to view programs which include advertising from the merchant granting the credit or coupons, such merchants may benefit from double advertising benefits.

Additionally, mobile TV broadcast service providers may also wish to reward their customers with credits or coupons that enable them to view additional content or purchase products or services at a discount.

Other reasons for businesses, content providers and mobile broadcast network providers to award customers credits or coupons include recognizing prior service or attracting future interaction; rewarding unicast network traffic generated by service interaction activity; compensating or providing future incentives for watching advertisements; and providing bonuses to premium customers. Credits or coupons may also be awarded as part of customer loyalty programs (e.g. air mileage, hotel points, dinning dollars, etc.). Additionally, when consumer demographics can be accurately determined, credits or coupons may be provided to accurately cross sell products or services that such consumers are likely to desire.

A number of different mobile broadcast television services and broadcast standards are available or contemplated in the future, all of which may implement and benefit from the various embodiments. Such services and standards include Open Mobile Alliance Mobile Broadcast Services Enabler Suite (OMA BCAST), MediaFLO, Digital Video Broadcast IP Datacasting (DVB-IPDC), and China Multimedia Mobile Broadcasting (CMMB). Typically, mobile broadcast transmissions are encrypted so that the access to programming can be sold on a subscription or pay-per-view basis. A variety of mechanisms may be used to link decryption keys to subscription purchases. Typically, mobile broadcast services utilize unicast communication networks, such as a customer's cellular telephone data service, to communicate subscription messages to/from particular customer mobile devices, and a separate broadcast network to broadcast the mobile television programming to all mobile devices. In overview, a mobile broadcast service provider can transmit messages which include information that enables a mobile device to generate the decryption keys needed to receive a particular broadcast. Decryption keys may be configured to expire after a predetermined amount of time in order to enable pay-per-view type services, as well as limit the economic impact of decryption keys falling into the public domain Additionally, the messages providing decryption keys may include service limitation parameters that may be used to limit received broadcast services to particular programs, channels, or other market segmentations.

By way of example, the OMA BCAST standard uses a long-term key message (LTKM) that is transmitted to mobile devices via a unicast network to provide a restricted access key. The restricted access key is used by the mobile device to decrypt a Traffic Encryption Key (TEK) contained in encrypted form within Short Term Key Messages (STKMs) which are broadcast regularly over the broadcast network. When decrypted, the TEK enables the mobile device to decrypt the encrypted broadcast content stream for a short period of time (e.g. two minutes, for example). When a TEK expires access to the encrypted broadcast content will terminate unless a new TEK is obtained. To enable customers to view entire programs, STKM messages are broadcast on a sequential basis so that new TEKs can be obtained from those STKMs using the long-term key obtained from the LTKM.

The various embodiments are described below using OMA BCAST standard terminology and message names as an illustrative example. The other mobile broadcast standards use similar messaging structures differing in message names and details that are not critical to the various embodiments. For example, DVB-IPDC uses Key Management Messages (KMMs) in a manner similar to the LTKM of the OMA BCAST standard, Key Stream Messages (KSM) in a manner similar to the STKM of the OMA BCAST standard, and TEKs in a manner similar to the TEKs of the OMA BCAST standard. Similarly, MediaFLO and CMMB use Encryption Management Messages (EMMs) in a manner similar to the LTKM of the OMA BCAST standard, Encryption Codeword Messages (ECM) in a manner similar to the STKM of the OMA BCAST standard, and Codewords (CW) in a manner similar to the TEKs of the OMA BCAST standard. Thus, the following descriptions are provided as an illustrative example, and are not intended to limit the scope of the embodiments or the claims to the OMA BCAST standard. For ease of reference, longer term rights management messages will be referred to herein as long term decryption key messages or LTKM, the shorter term decryption key delivery messages will be referred to herein as short term decryption key messages or STKM, and the decryption key used to decrypt encrypted broadcast content will be referred to herein as the content decryption key or TEK.

Currently the mobile broadcast TV system allows consumption of services or contents through the purchase of subscription tokens or credits. In other words, users must first pay to become subscribers or pre-pay for tokens that may then be redeemed for programming content. For example, in a typical mobile broadcast TV system customers can purchase one token for every dollar they pay. Then an electronic wallet is activated within the mobile device to deduct tokens as users watch mobile TV programs. When users have consumed all of their tokens, they must purchase new tokens before they can view further mobile TV programs.

FIG. 1 is a process flow diagram illustrating a current regime by which mobile device users can subscribe to or purchasing mobile TV broadcast services. In creating broadcast services or content, mobile TV service providers have created and agreed upon a set of usage charging rules, step 100. Based on these charging rules, the service provider creates subscriber management keys (SMKs) and establishes Service Registrations, step 102. The service provider may either receive from the users requests for service subscriptions, step 104, or requests to purchase prepay-per-view or pay-per-time tokens, step 108. The mobile broadcast service provider sells the requested subscriptions or tokens to the requesting users, steps 106, 110, after which the mobile broadcast service provider sends an LTKM message to the user's mobile device through the unicast network, step 112. The LTKM includes a long-term key for decrypting messages transmitted via the broadcast network. The long-term key is typically subscription or service dependent. For example, users may subscribe to a basic level of membership which would allow them to, for example, only receive basic cable broadcast channels on their mobile devices. At this level of membership users may not be able to view premium channels, such as HBO® or ShowTime®. Channel access control is typically facilitated by use of different long-term keys between basic and premium channels.

The LTKM may also include service rules governing the use of the aforementioned long-term key. Such rules define usage criteria and constraints and their instantiation typically depends on the terms and conditions of the contract between the user and the service provider. For example, a service rule may inform the device of one of the following modes of permitted content consumption: existing subscription to live services, PPV access to a live event, PPV access to either a live event or recorded content, or unlimited playback of recorded content. The LTKM is transmitted through the unicast network in a message directed to the specific user's mobile device where the long term key is stored in a secure function, e.g., secure memory of the terminal or on a Smartcard. The service provider then broadcasts a STKM, step 114. Continuously over time the service provider also transmits an encrypted program content stream, step 115. STKMs enable encrypted program content to be viewed by a mobile device. Every mobile device in the service provider network receives the broadcast of an STKM stream and the associated encrypted content stream. However, not every user can decrypt every STKM necessary to decrypt the content. One's viewing privilege is based on the service rules prescribed in the LTKM for each mobile device. Accordingly, if the service rules provided in the LTKM allow viewing of the program content, the mobile device decrypts one or more TEKs to decrypt the content and display it on the mobile device display, step 116. In cases where tokens are purchased, if LTKM rules allow the viewing of the program content, tokens are first decremented from the mobile device electronic wallet (e.g. smartcard) before a TEK is decrypted and then used for decrypting the content. However, if the service rules as provided in the LTKM do not grant access to the program content, the terminal would not be allowed to decrypt the encrypted TEKs in the STKM stream to allow viewing of the programming associated with the STKM stream.

The current system, however, has limited capabilities for issuing credit to users for promotions or to create purchase incentives in the form of coupons or free tokens. Presently, the only way the mobile broadcast TV system provides credits to users is when coupons are delivered to mobile broadcast TV users at the time a service is purchased. These coupons are transmitted to users as part of the Purchase Data that is transmitted to users' mobile devices with the content. Because these coupons are distributed at the time the users purchase services, they are not targeted to particular users or user groups. Tokens are also sold to users by the service providers. However, these tokens are only granted upon a purchase request and the present mobile broadcast TV system lacks a means to de-couple token granting from an intended purchase. In other words, tokens must be requested so the present mobile broadcast TV system lacks the capabilities to issue free or discounted tokens. In addition, the mobile broadcast TV network is not structured to deliver a different amount of tokens from that requested. Thus, even if a content provider or network service provider wanted to give a loyal customer more tokens than purchased, the system would not permit this to occur. These current limitations preclude mobile broadcast service providers, network providers and others from creating incentives for their customers to use their services, populate their unicast networks, view their advertisement, or shop at their stores, for example.

In order to overcome these limitations and enable new marketing uses of mobile TV broadcast services, the various embodiment methods and systems enable delivering credits to mobile devices that can be used in new revenue models and customer recognition reward programs by making available free or discounted goods or service to their customers. Content providers, mobile broadcast service providers and advertisers can issue targeted credits (e.g. coupons and tokens) to mobile device users. These credits may then be used for complimentary or discounted viewing of additional mobile TV content or purchasing of products or services and thus create incentives for the users to continue or increase their use of the mobile broadcast TV system.

Within the various embodiments credits may be awarded to users for different reasons. For example, credits may be provided to users for free service trials, content sampling, loyalty awards, early bird award, new subscriber service discounts, and loyal subscriber content discounts. Credits may be issued with different types of limitations as may be specified by the originator of the credit. A universal credit may be used for purchasing services and products of any kind and from anywhere. For example, a universal credit may be used to make a purchase at a POS, for on-line shopping, or for purchasing mobile broadcast TV services. A credit may also be limited to a program credit which may only be used to purchase programs from the mobile broadcast TV system. A credit may further be a specific credit, which may only be used towards purchasing a specific service or product, such as products from the merchant or manufacturer that originated the credit.

In the various embodiments, credits may be provided in the form of tokens or coupons which, like a type of currency, may be used to purchase free or discounted services, programs or products. For example, users may use tokens to purchase pay-per-view (PPV) mobile TV programming to view on their mobile devices. Tokens may be provided to users for free or discounted as a credit or promotion to create incentives for users to purchase products and services. As defined in OMA BCAST 1.0, there are two types of tokens for metered consumption of broadcast services. "User" tokens can be used to consume any content item under a user's membership or subscription level as defined in the service guide rules. "Service" tokens are limited to programs available under a specific service in a users' membership or subscription. It is worth noting that in some mobile broadcast TV systems, such as BCAST, there may be no distinction between membership and subscription from the service guide and programming viewing perspective. However, the flexible exchange of tokens or coupons for acquiring goods, services, and/or programming may be more accurately addressed in terms of membership which may relate to individual privileges.

The various embodiments enable coupons delivered to mobile devices to function as a type of currency that can be exchanged for a financial discount or rebate when purchasing products and services. Unlike paper coupons which are often widely distributed through mail, magazines, newspapers, etc., the coupons enabled in the various embodiments may be delivered to mobile devices via mobile TV broadcast services. Once delivered to a mobile device, users can use such coupons to obtain discounts and promotional items similar to how paper coupons are redeemed.

The various embodiment methods and systems may allow various advertisers to configure credits for different purposes. Credits may have limits on their use. For example, credits may be configured to be valid for a specific time window, apply to any purchase item amount and be independent of the item's actual price. Credits may be exclusive (e.g. coupons that may not be combined) or non-exclusive (e.g. coupons that may be combined if the coupon providers are different). Credits may also be applied to many different purchase items (i.e. individual products or services). Credits may be applied to products and services characterized by a single set of purchase data (e.g., a one-time program view, product or single service), as well as to purchases characterized by multiple sets of purchase data, such as may be the case in a subscription or continuing service purchase. To support purchases of multi-data packages, like subscriptions, the credits may be configured to apply to a subset of purchase data. Credits may be configured for only one user or for a group of users, such as loyal or new users, with no right to transfer, or may be configured to be transferable from the owner to another recipient.

Figure 2:
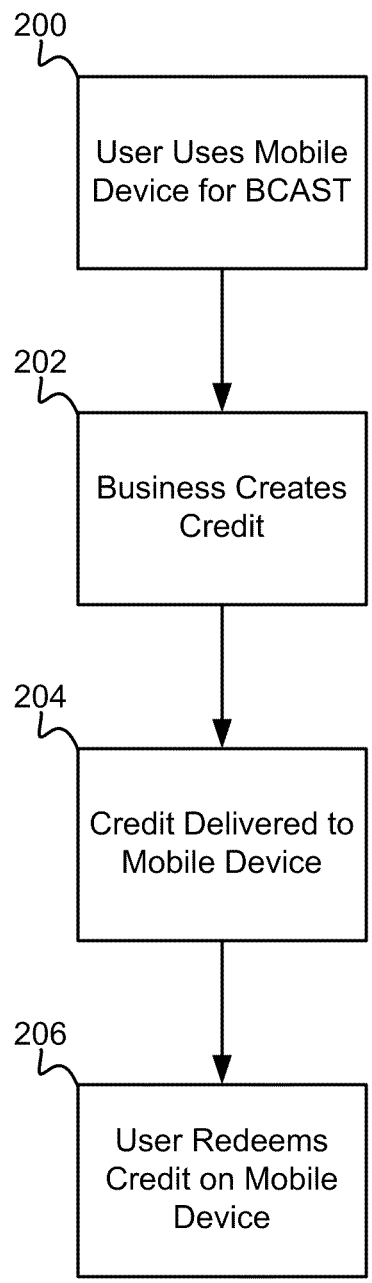
FIG. 2 is a process flow diagram of an overview process for providing coupons to receiver devices according to various embodiments.

FIG. 2 is a process flow diagram of an overall process for creating credits, delivering credits to a user, and consumption of the credits on a mobile device. When users employ their mobile devices to view mobile broadcast TV content, step 200, their usage (e.g. level and type of use) may be measured by the mobile TV service provider. Such tracking may be valuable to service providers as well as content providers based on measurement of both the volume and selectivity of broadcast content viewed on their mobile devices. Mobile TV service providers benefit from frequent usage/consumption paid by subscription fees or one-off token purchases, thereby directly generating revenue for the mobile broadcast service providers. Similarly, content providers benefit from increased demand for their content which will translate into higher advertising revenues and fees paid by the mobile broadcast network providers. Also, the more users use the unicast features of their mobile devices to participate in programs, such as voting for their favorite singer in TV singer competition shows, the more revenue received by the cellular network providers that provide the unicast services. The viewing habits of each user may then be analyzed by service providers, content providers and advertisers to target highly-valuable users, in order to send them promotional and incentive credits or coupons. Accordingly, any one or more of the mobile broadcast service providers, unicast network providers, content providers and advertiser businesses may create targeted credits or coupons, step 202, for delivery to a specific user or a group of users. Such credits may include coupons or free tokens to be used in purchasing services or products. Once a valuable user or user group is identified and matched with the appropriate credit type, the credits may be sent to the identified users' mobile device, step 204. As described in more detail below, such credits may be delivered by unicast or broadcast transmission methods. When such credits are received, the mobile device stores them in secure hardware, which may be secure memory on the terminal or correspond to a removable smartcard, to be used in the mobile broadcast TV system. The user may then redeem the credits by purchasing products or services using their mobile device, step 206. For example, a loyal user may receive credits from the mobile broadcast service provider to be used for purchasing a free cleansing product from a merchant or manufacturer while watching a soap opera show on her mobile device while viewing an advertisement for the product. Once the credit is received, the user may purchase the product on-line, such as by clicking on a hyperlink URL provided with the credit to access the merchant's or manufacture's web-store. Alternatively, the user may use the coupon like other downloadable e-coupons when visiting a store by presenting the mobile device at the point of sale and transferring the credit or recording the use of the credit electronically.

Figure 3:
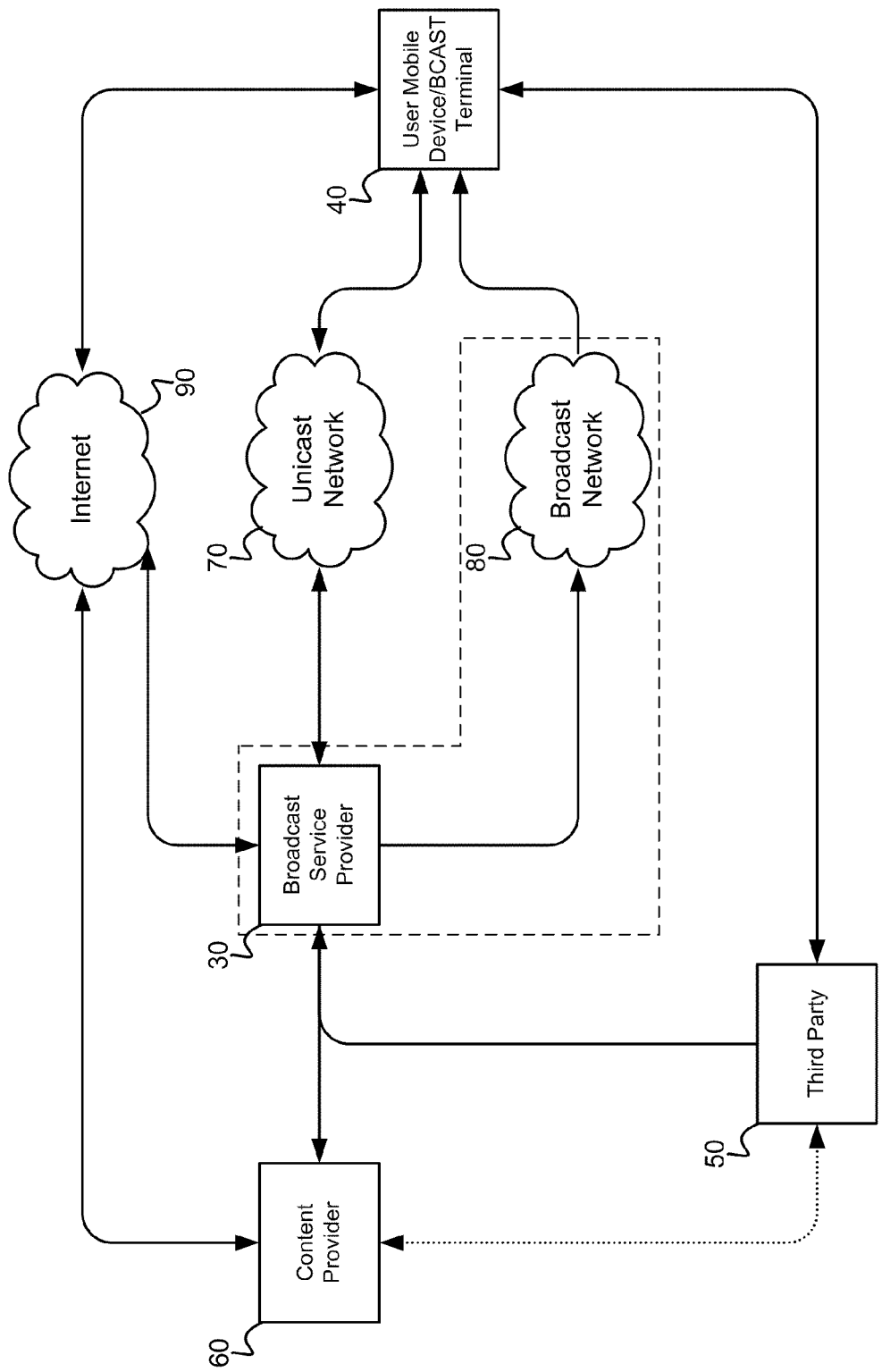
FIG. 3 is a network component diagram illustrating different components of a mobile broadcast TV system.

FIG. 3 is a network component diagram of a mobile broadcast TV system illustrating participants involved in delivering credits to mobile devices. In a mobile broadcast TV system credits may be created by a variety of businesses, including the broadcast service provider 30, third party businesses 50 and content providers 60. A broadcasts service provider 30 is the company that provides the business relationship, typically subscription-based, with end users. The broadcast network operator, which may be the mobile broadcast service provider 30, operates the broadcast network 80 that transmits mobile broadcast TV content to mobile devices 40. The broadcast network 80 may be a dedicated downlink-only broadcast transmission system such as FLO®, or a cellular-based broadcast/multicast system such as that defined by 3GPP MBMS or 3GPP2 BCMCS. Example service provider 30 companies include Verizon®, AT&T® and T-Mobile®. These companies receive audio, video and website content from content providers 60. These contents are then sent to the broadcast network operator, which in turn broadcasts the content via their mobile broadcast TV network 80, or unicast network 70. In some cases the broadcast service providers 30 may also be cellular service providers, in which case they would also provide and operate the unicast network 70 that provides voice and data services to mobile devices 40. However, the broadcast service provider 30 need not be the unicast (e.g., cellular) network 70 provider. Even if the unicast network 70 and broadcast network 80 are operated by different entities, the mobile broadcast service provider 30 may still send messages to and receive messages from mobile devices 40 via a unicast network operated by another company.

Third parties 50 may include merchants and manufacturers, such as HomeDepot®, Starbucks® and Netflix®, who may desire to target promotions to mobile device users. Third parties 50 may interact with the users either directly, such as when users visit their stores, or through the broadcast service providers 30, such as by showing advertisements in mobile broadcast TV programs.

Content providers 60 may include companies that provide content and programs for broadcast via the mobile broadcast TV network 80. Content providers may also include advertising agencies, government agencies, and private individuals who create audio, video and image content for broadcast. For example, a content provider could be the National Broadcasting Corporation (NBC) providing news and entertainment content for broadcast via the mobile broadcast TV network 80. Advertisement agency content providers 60 may contract with third parties 50 to create advertisement content for their products and services. For example, Netflix® may contract with an advertisement company to make an advertisement for Netflix® services.

In addition to the unicast network 70 and mobile TV broadcast network 80, users may communicate with the broadcast service provider 30 and content providers 60 via other communication links, such as telephone (not shown) and the Internet 90. For example, users may access websites maintained by with the mobile broadcast service provider 30 and content providers 60 via their mobile device 40 (e.g., via a cellular data network not shown separately) or a computer coupled to the Internet. Similarly, users may communicate with third parties 50 directly by connecting to their websites via the Internet, or by walking into their establishments.

The various embodiment methods and systems allow for delivery and redemption of credits over many transport networks, such as the broadcast network 80, the Internet 90, SMS messages via a unicast network 70, and directly at the point of sale of a purchase transaction. Users' mobile devices 40 may be targeted for distribution of credits based on their use of the mobile broadcast TV system. Credits may be delivered to the user's mobile device 40 either directly or indirectly. Credits may be delivered to a mobile device 40 directly, for example, when the user makes a purchase at the business's website via the Internet 90 using their mobile device 40. Such credits may also be delivered to the mobile device 40 as part of the Internet session established in such an on-line purchase or through out-of-band means, such as by an SMS, MMS or email message delivered via the unicast network 70. For example, a user's mobile device 40 may receive credits from Starbucks® for a free cup of coffee which could be sent via out-of-band methods, such as by SMS, MMS or email. Irrespective of the method of delivery of the credit, the user's mobile device 40 may be able to redeem the credits through the broadcast service provider 30, such as to receive free or discounted mobile TV programming.

Credits may also be delivered to targeted users indirectly, such as when a third party 50 submits credits to an intermediary, such as the mobile broadcast service provider 30, for delivery to the users' mobile devices 40. Delivery of credits to mobile devices 40 by broadcast service providers 30 may be accomplished using different methods. One method provides credits to users' mobile devices 40 when the users communicate with the service provider 30 to purchase viewing tokens or subscribe to a broadcast service. Delivery of such credits may be accomplished through a service subscription response message that is transmitted by the broadcast service provider 30 in response to a mobile device 40 subscription request message. For example, when a mobile device 40 sends a subscription request message to the service provider 30, such as to request an extension or upgrade to a service subscription (e.g., from basic to premium), the service provider 30 may deliver third party 50 coupons to the user's mobile device 40 as a part of a subscription response message. Delivery of such credits may be through the unicast network 70 and may be based on the perceived value of the user to the credit issuer, or user habits. A second method may include delivering such credits to users' mobile devices 40 when no communication has been initiated by the user's mobile device 40. In this method, the service provider 30 may send (i.e., push) credits to the user's mobile device 40 though a dedicated service provisioning message.

To support the delivery, processing and redemption of mobile TV system credits and coupons, various contractual and technical aspects may be reconciled before targeted delivery of credits to users can be effectuated. Contractual aspects may include defining message interface specifications between third parties 50 and the mobile broadcast service provider 30 as well as establishing business rules pertaining to consumption and charging semantics for credits and coupons. For example, a coupon type A may be defined to be redeemable for X minutes of viewing of certain purchased mobile TV programming, and that coupon A expires on date Y. Another example may include a free token redeemable by the user for a nominally-defined program viewing value of $Z which is transferred from the third party's 50 bank to the service provider's 30 bank as part of the transaction.

Technical aspects required to support mobile TV system credits and coupons may include using service provisioning messages to facilitate the granting and redemption of credits. In addition to communicating information between the mobile broadcast service provider 30 and mobile devices 40, service provisioning messages may prepare the receiving mobile device 40 to accept the credits. Accordingly, the mobile broadcast service providers 30 may create specific and targeted service provisioning messages for credit delivery and target such messages to, for example, loyal users' mobile devices. Once the mobile devices are primed to receive the credits, the mobile broadcast service provider 30 may transmit the credit with its associated rules (i.e. LTKM) to the targeted mobile device 40, such as via the unicast network 70.

Figure 4:
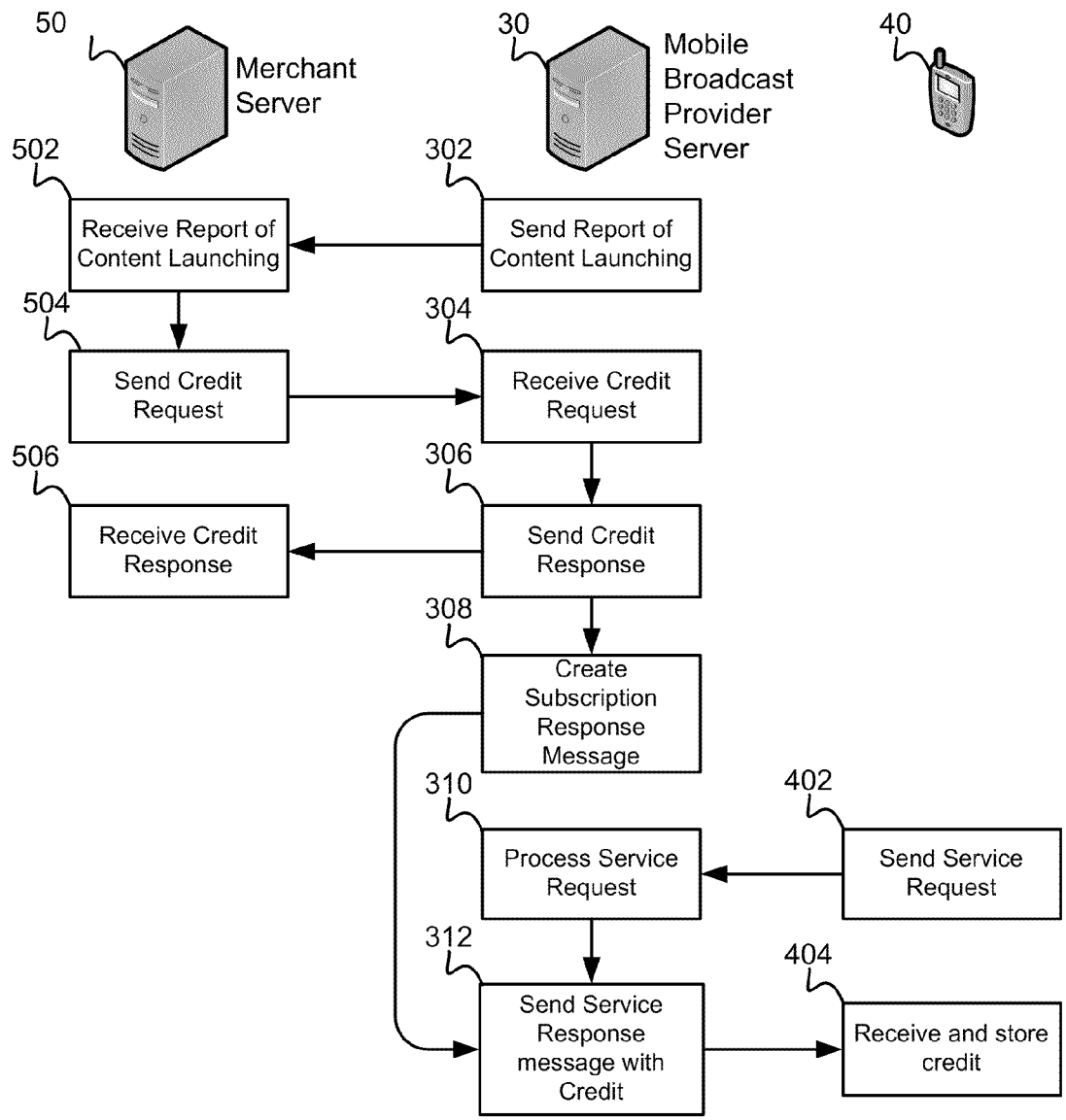
FIG. 4 is a process flow diagram of an embodiment method for delivering credits or coupons to a receiver device.
Figure 5:
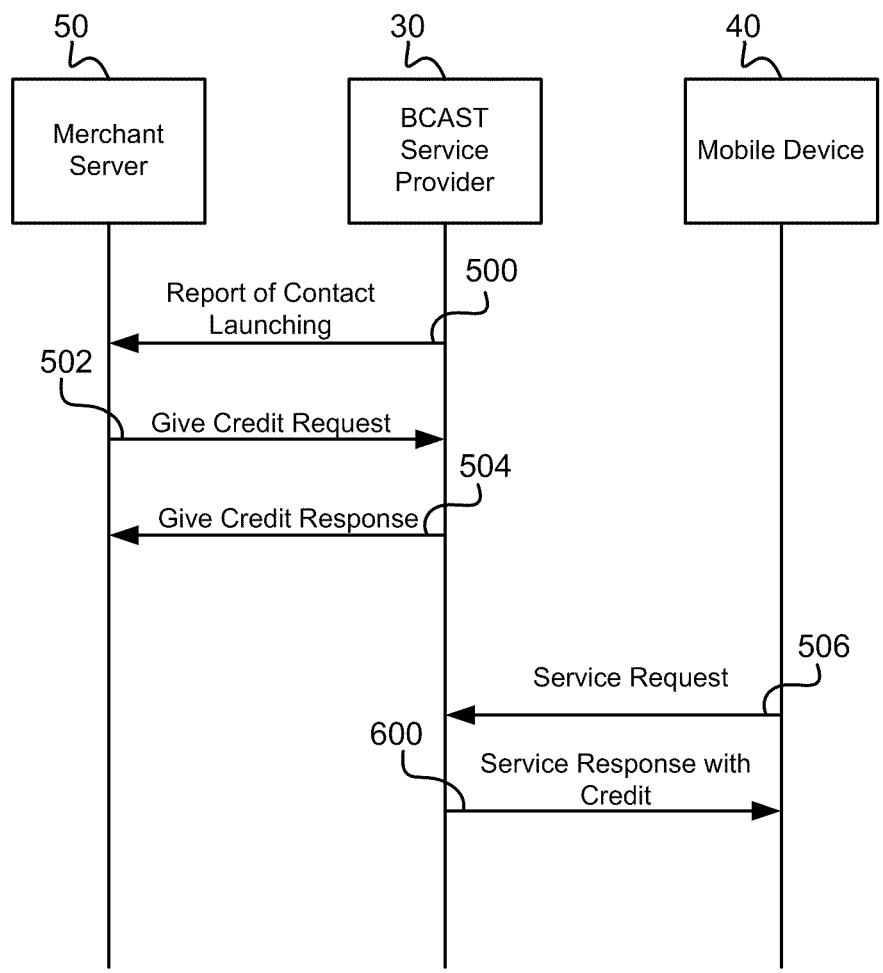
FIG. 5 is a message flow diagram of an embodiment method for delivering credits or coupons to a receiver device.

FIG. 4 illustrates an embodiment method for delivering credits from the mobile broadcast service provider 30 to mobile devices 40 using a subscription response message. FIG. 5 is a message flow diagram illustrating the exchange of messages that may transpire between different mobile broadcast TV system components to deliver credits in the embodiment method shown in FIG. 4. The embodiment method is described below with reference to both FIG. 4 and FIG. 5.

In the illustrated embodiment, a mobile broadcast TV service provider 30 may send a report to a third party 50 describing the programming content that will soon be broadcast, step 302 in FIG. 4 which corresponds to message 500 in FIG. 5. This advance notice of programming to be broadcast enables third parties 50 to evaluate the programming for placement of advertising as well as conduct promotional campaigns, such as providing credits or coupons to targeted consumers. When the third party 50 receives the broadcast programming report, step 502, it may determine whether it would like to provide credits to users' mobile devices 40, such as in the form of coupons or tokens. To extend credits to consumers, the third party 50 may send a credit request message to the service provider 30, step 504 in FIG. 4 which corresponds to message 502 in FIG. 5. This credit request message may identify the details of the credits to be delivered, such as their value, their applicability (e.g., programs, products or services that can be redeemed), their validity dates, and their redemption rules. Upon receiving such a credit request message, step 304, the service provider 30 may send the third party 50 a credit response, step 306 in FIG. 4 which corresponds to message 504 in FIG. 5. The third party 50 may receive the credit response, step 506, which verifies that the service provider 30 has received and processed the third party 50 request, and which may carry data pertaining to the previously agreed contractual terms regarding consumption and payment. In preparation for delivering the third party 50 credits to mobile devices 40, the service provider 30 may create subscription response messages including the credit details provided by the third party 50, step 308. The structure, elements and parameters of a subscription response message are described in more detail below with reference to FIGS. 6-8. Sometime thereafter a user mobile device 40 may send a request for service through the unicast network to the mobile broadcast service provider 30 to request or initiate a service adjustment, such as purchasing viewing tokens, purchasing pay-per-view tokens, subscription request, or upgraded service, step 402 in FIG. 4 which corresponds to message 506 in FIG. 5. The mobile broadcast service provider 30 may receive and process the service request, step 310, and in response, send a suitable service provisioning response message to the mobile device 40 using the unicast or broadcast network 70, step 312 in FIG. 4 which corresponds to message 600 in FIG. 5. This service response may include the third party credits as well as the service adjustment requested by the user. The user's mobile device 40 may receive the subscription response message via the unicast network 70, access the message contents and store the credits in the mobile device 40 memory, such as in an electronic token wallet, step 404. The mobile device user may then use those credits towards purchasing services or products as specified in the credits. Methods by which users can redeem credits stored in the mobile device 40 are described in more detail below with reference to FIGS. 15-20.

Figure 6:
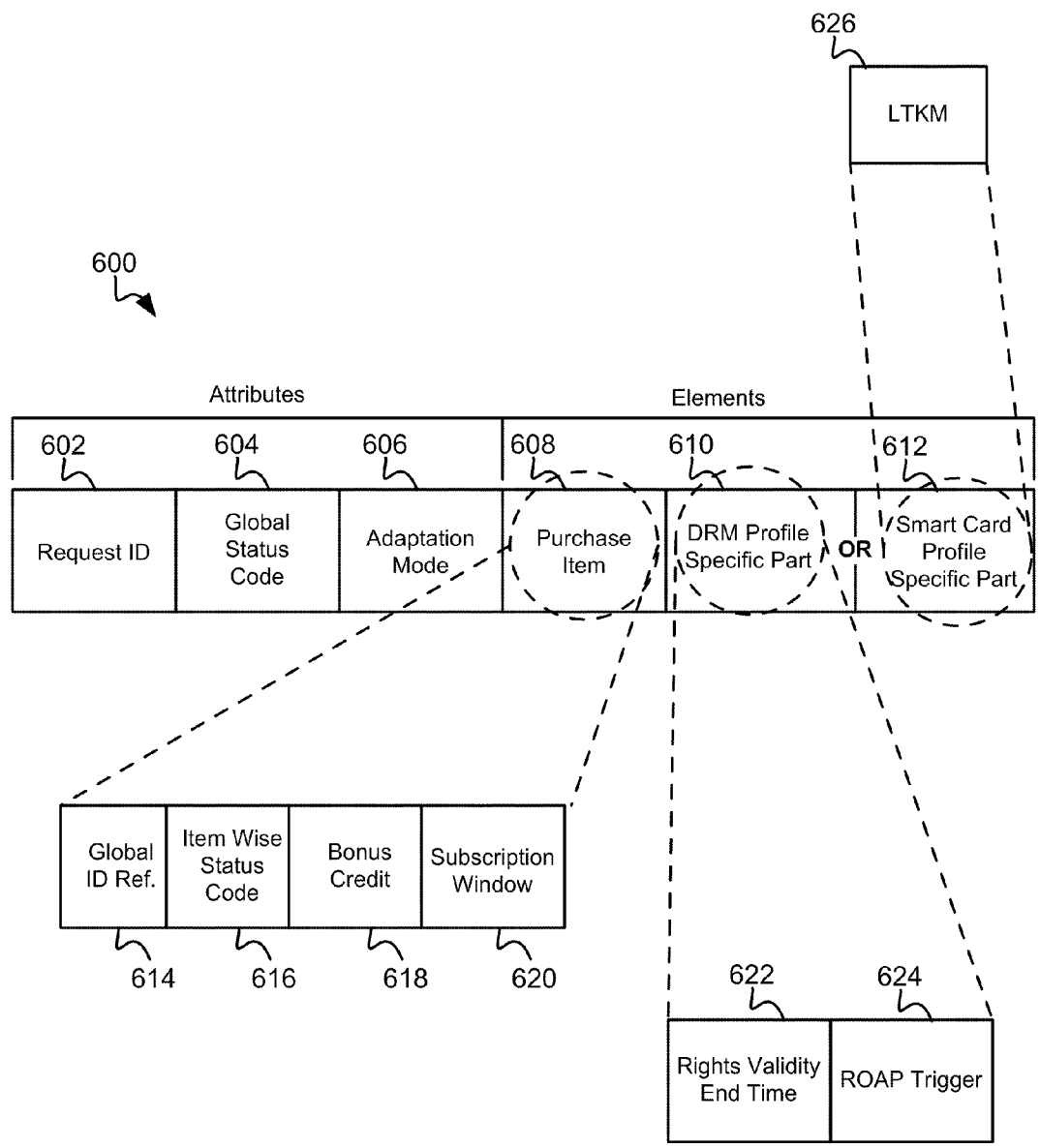
FIG. 6 is a message structure diagram of an embodiment of a subscription response message.

FIG. 6 illustrates an example format and contents of an embodiment subscription response message 600 suitable for delivering credits to mobile devices 40. This subscription response message 600 may be sent to mobile devices 40 in response to a service request message sent by a mobile device 40 to purchase services from the service provider 30. A subscription response message 600 may include several components which may be categorized into attributes and elements. As illustrated in FIG. 6, a subscription response message 600 may include optional attributes such as a request ID 602, global status code 604 and adaptation mode 606. A request ID 602 may be an identifier for the corresponding service request message 506. To allow the correct responses to reach the right requesting party, the request ID may identify and correlate a subscription response message 600 to the correct service request message 506. Using a request ID 602 the user's mobile device 40 can determine whether the correct service response is received.

The global status code 604 may provide information about the overall outcome of the request according to certain defined return codes. Exemplary return codes are described in more detail below with reference to FIG. 9. By using the global status code 604, the mobile device 40 may determine whether a request was been processed successfully. In other words, the global status code 604 may communicate the status (i.e., success or failure due to error) of the service request message 506 sent by the user's mobile device 40. For example, if the global status code 604 is present in the subscription response message 600 and set to value "0", this may mean that the request was successfully processed and completed. In contrast, if the global status code 604 is present and set to a value other than "0", this may mean that there was an error in the receipt or processing of the request. It is worth noting that even if a service request message 506 was not successfully processed, the mobile broadcast service provider 30 may reply with a subscription response message 600 that transmits credits even if the mobile broadcast service provider 30 is unable to provide the specific service adjustment requested by the mobile device. If the global status code 604 is not present in the subscription response message 600, this may mean that there was an error concerning one or more purchase item elements 608 associated with the request. The purchase item element 608 is described in more detail below.

The optional adaptation mode element 606 may inform the mobile device 40 of the operational adaptation mode which may be generic or BDS-specific. For example, if the value of this attribute is set to "false", this may indicate that the adaptation mode 606 is generic. If the value of this attribute is set to "true", this may indicate that the adaptation mode 606 is BDS-specific. According to the various embodiments the adaptation mode 606 may only be present in a subscription response message 600 if the global status code 604 indicates "success", and the underlying BDS is BCMCS.

The elements of the subscription response message 600 may further include the purchase item element 608 and the optional elements of DRM profile specific part 610 or smart card profile specific part 612. The purchase item element 608 may describe what has been purchased or received, such as an item requested in the service request message 506. In other words the purchase item element 608 may inform the mobile device 40 whether the user's service request was successful and about the requested item delivered. For example, if the service request message 506 requested digital rights (e.g., a DRM profile) to play certain content, and the subscription purchase was successful, the purchase item element 608 may include the rights validity end time 622. Rights validity end time 622 is described in more detail below with reference to the DRM profile part 610. For either the DRM profile or smart card profile, when there is a failure in a purchase or subscription request, an itemized status code 616 may be present as an attribute of the purchase item 608 element to indicate the reason why the request was not accepted by the mobile broadcast service provider 30.

The purchase item element 608 may further include a variety of attributes and elements. For example, the purchase item element 608 may include the mandatory global ID reference attribute 614 and an optional itemized status code attribute 616. The purchase item element 608 may also include the optional bonus credit element 618 and a subscription window element 620. The global ID reference attribute 614 may be the designated ID for the purchase item element 608. As such, the global ID reference 614 may identify the purchased items using a global purchase item ID (not shown) found in the purchase item 608. A global ID reference 614 may be any Uniform Resource Identifier (URI), for example. A URI is a string of characters used to identify or name a resource on the unicast network, for example. Such identification may enable interaction with representations of the resource over a network using specific protocols. The itemized status code may be a more specific status code 616 (as compared to the global status code 604) that may specify a status for each purchased item using the same returned codes as the global status code 604 as described below with reference to FIG. 9.

Credits may be sent from the mobile broadcast service provider 30 to a mobile device 40 by using the optional bonus credit element 618. For example, credit (e.g., coupon and/or token) data may be inserted into the bonus credit element 618 before the service response is sent to the mobile device 40. In this manner, users may receive credits from the mobile broadcast service provider 30 when they transmit a request to purchase or subscribe to services. The credit type that may be part of the subscription response message 600 may vary and be tied to either the type of service requested, the identity of the user requesting service (e.g., based on the user's habits and use of the mobile broadcast TV system) or both. For example, zero or more standalone bonus credit (also known as purchase data) sub-elements may be present in the purchase item element 608. These bonus credit sub-elements may include user unique credit data for the bonus services that may result from the transaction. These credits may be stored in the memory of the mobile device and managed based on the service guide rules and the user's membership level. Exemplary embodiment bonus credit 618 message structures are described in more detail below with reference to FIGS. 7 and 8.

The mandatory subscription window element 620 of a purchase item element 608 may include data pertaining to the time interval during which the subscription or coupon is valid. The service provider 30 may use this element for time-based subscriptions and may include it for PPV purchase response messages 600. The user mobile device 40 may use information in the subscription window element 620 to determine the validity period of a subscription. The subscription window 620 element may further include a mandatory start time attribute (not shown) and an optional end time attribute (not shown). The start time attribute may include a network time protocol (NTP) time stamp expressing the start of a subscription. The end time attribute may include an NTP time stamp expressing the end of the subscription. In an exemplary embodiment, this attribute may be omitted for open ended subscriptions.

The optional DRM profile specific part element 610 may include a service and content protection DRM-profile specific part. This part may be mandatory to support the DRM profile and is not applicable to the smart card profile. The DRM profile specific part 610 further may include an optional rights validity end time attribute 622 and an optional rights object acquisition protocol (ROAP) trigger element 624. The rights validity end time 622 attribute may be present to indicate the end time and date of validity of the LTKM associated with the purchased content after which it has to be renewed and when BSM accepts the request message. This field may be expressed in the first 32 bit integer part of NTP time stamps. For example, this attribute may be validated if a rights object (RO) is broadcasted. Otherwise, this attribute is not necessary. When the optional element ROAP trigger 624 is present, the mobile device 40 may be expected to use it to initiate one or more LTKM acquisitions.

The optional smart card profile specific part element 612 may include a service and content protection smart card profile specific part. This part may be mandatory to support the smart card profile and may not be applicable to DRM profiles. The smart card profile specific part element 612 may include an optional LTKM element 626. The LTKM element 626 may be a smart card profile mobile broadcast TV LTKM including a base64-encoded MIKEY message. This element may be present in a subscription response message 600 if the requesting mobile device 40 and the service provider 30 have agreed on "HTTP" (i.e., Internet) as the LTKM delivery mechanism during the registration procedure.

Figure 7A:
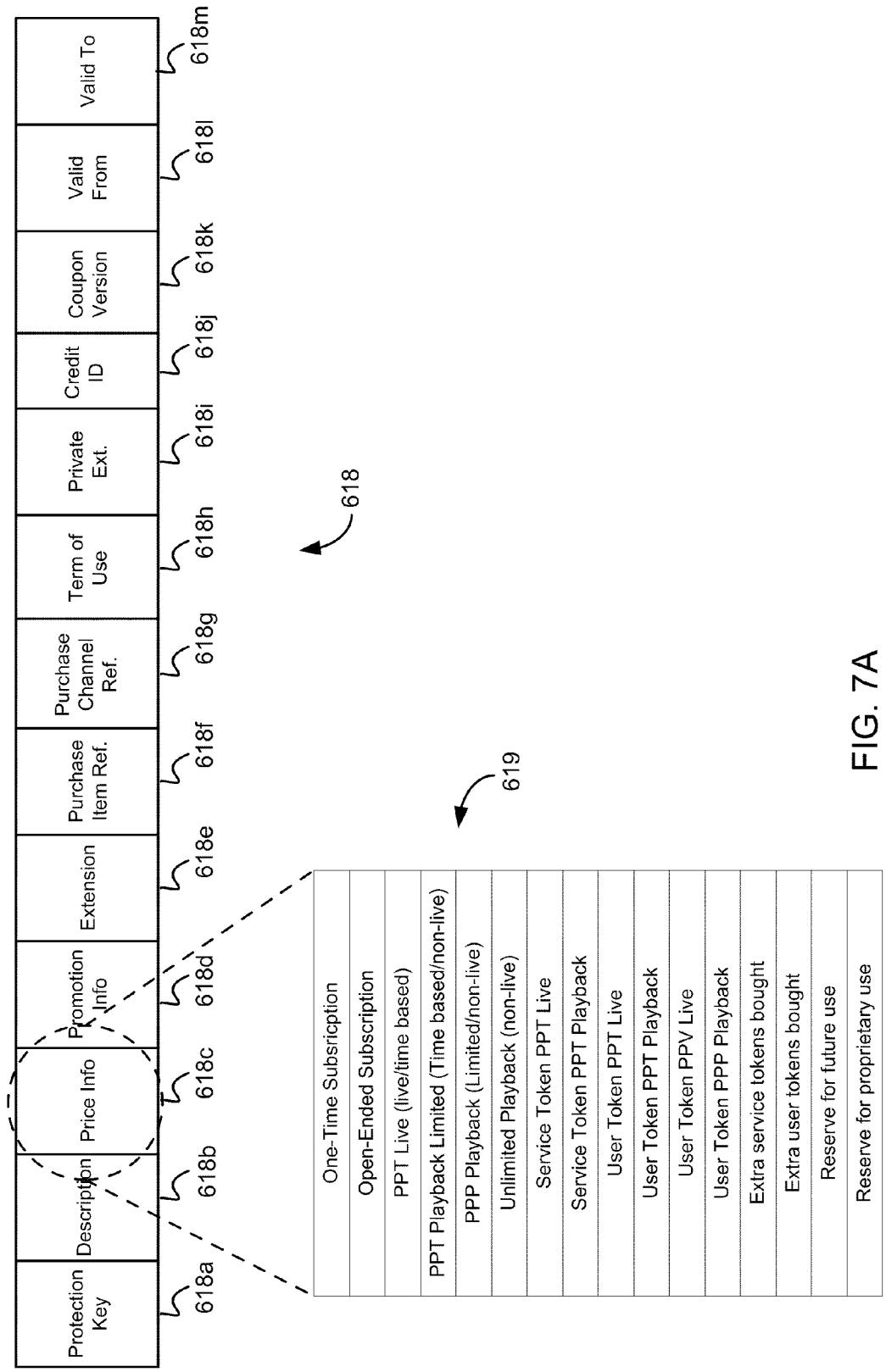
FIG. 7A is a message structure diagram of an embodiment of a bonus credit element.

FIG. 7A illustrates a data structure for an embodiment bonus credit element 618. As shown in FIG. 7A, a bonus credit 618 element may include several parameters and sub-elements, including a protection key 618a, a description 618b, a price information 618c, a promotion information 618d, an extension 618e, a purchase item reference 618f, a purchase channel reference 618g, a term of use 618h, a private extension 618i, an ID 618j, a version parameter 618k, a valid-from parameter 618l, and a valid-to parameter 618m. The protection key 618a may include an encrypted key which may be decoded based on the user's membership level as described in the service guide rules. The description 618b may include a description of the product, service or subscription that is being sold to the user, in one or more languages. The price information 618c may include description of the type of purchase or credit transaction.

The price information 618c may contain two components, a discount amount 619a and a purchase type 619b. The discount amount 619a may contain one or more monetary values, which may be represented as negative numbers, potentially in different currencies, that represent the savings that may be realized when using the discount/coupon. A special value (such as 0) may be reserved, indicating that the associated discount/coupon makes the referenced purchase item free. In some embodiments, the discount amount 619a may be omitted, in which case its value may be taken to be zero, indicating that the item is free.

The purchase type table 619b shown in FIG. 7A illustrates different types and values of purchase or credit transactions that may be used to populate the price information sub-element 618c when a subscription response message is sent to a user's mobile device 40. The different types of purchase type values within the price table 619 may include one-time subscriptions, open-ended subscriptions, pay-per-time (PPT) live to allow time-based consumption of live content, PPT playback to allow time-based consumption of non-live content, pay-per-play (PPP) playback to allow certain number of playback for non-live content, unlimited playback to allow for unlimited playback of non-live content, service token PPT live to allow time-based consumption of live content by using service tokens, using service token PPT playback to allow time-based consumption of non-live content by using service tokens, user token PPT live to allow time-based consumption of live content by using user token, user token PPT playback to allow time-based consumption for non-live content using user tokens, user token PPV live by using user tokens, user token PPP playback by using user tokens, extra service tokens bought to add to the service purse linked to this service/content SEK/PEK ID key group which may need a valid LTKM to use the service tokens, extra user tokens bought which may be linked to the mobile broadcast service provider 30 ID for adding to the user purse (this may not be linked to a specific service content and may need a valid LTKM to be used), a non-broadcast (i.e. real-world) product, e.g. a product from a store, reserved for future use, and reserved for proprietary use.

The promotion information 618d may represent a discount/coupon that the user can acquire by purchasing the referenced purchase item. The extension 618e may include additional information identifying or relating to the program, product or promotion. The purchase item reference 618f may be an identifier that identifies the particular purchase item associated with the promotional discount coupon. For example, the purchase item reference 618f may identify a particular purchase item, such as CNN Headline News. The purchase channel reference 618g may include information identifying where or how the user can purchase the referenced purchase item. In the case of coupons or tokens for programming purchases, the purchase channel reference 618g may identify the content provider (e.g., Disney, AOL, CBS, etc.). In the case of coupons for purchasing products from merchants, the purchase channel reference 618g could be the store or chain from which the product must be purchased (e.g., Home Depot, Sears, etc.)

The term of use 618h may include information about how the credit may be used. For example, certain credits may not be duplicated or transferred to others. The terms of use 618h may define these boundaries to allow the integrity of the credit to remain intact. Additionally, this sub-element may define the type of credit and for what purposes this credit may be use. For example, a coupon might only be used for receiving discounts when purchasing content from the mobile broadcast service provider 30. Such a coupon could not be used for purchasing other products or services.

The private extension 618i may allow vendor- and application-specific extensions to be implemented in addition to the baseline SG standard. The credit ID 618j may include data that can be used to validate the credit and prevent the user from forging the credit, such as a nonce ID, an encrypted value, etc. The coupon version 618k may include information to identify the version of the coupon which may allow vendors to issue over time subsequent coupons for similar purchases with differing terms and values. Thus, the coupon version information may be used to support successive versions of the same type of coupon. The valid-from value 618l may include information about the date and time at which a credit becomes valid. The valid-to value 618m may include information about the date and time at which a credit becomes invalid and may no longer be used. The valid-to value may be omitted if the coupon never expires.

Additionally, the bonus credit element 618 may include an extension URL element (not shown). Such a URL element would provide a pointer to a web resource providing further information related to the credit element. For example, a WWW page related to the credit or coupon may be reached by following an extension URL in the credit element. If the mobile device 40 has the capability to access the Internet, it uses the URL to access an Internet website to obtain additional information related to the credit or coupon using HTTP.

Certain parameters and sub-elements may be mandatory for a bonus credit element 618 to be valid and functional. These mandatory parameters and sub-elements are illustrated in the message structure diagram shown in FIG. 8. These mandatory fields include a purchase item reference field 618f, a purchase channel reference field 618g, a valid-from field 618l, a credit ID field 618j, and a coupon version field 618k.

Figure 7B:
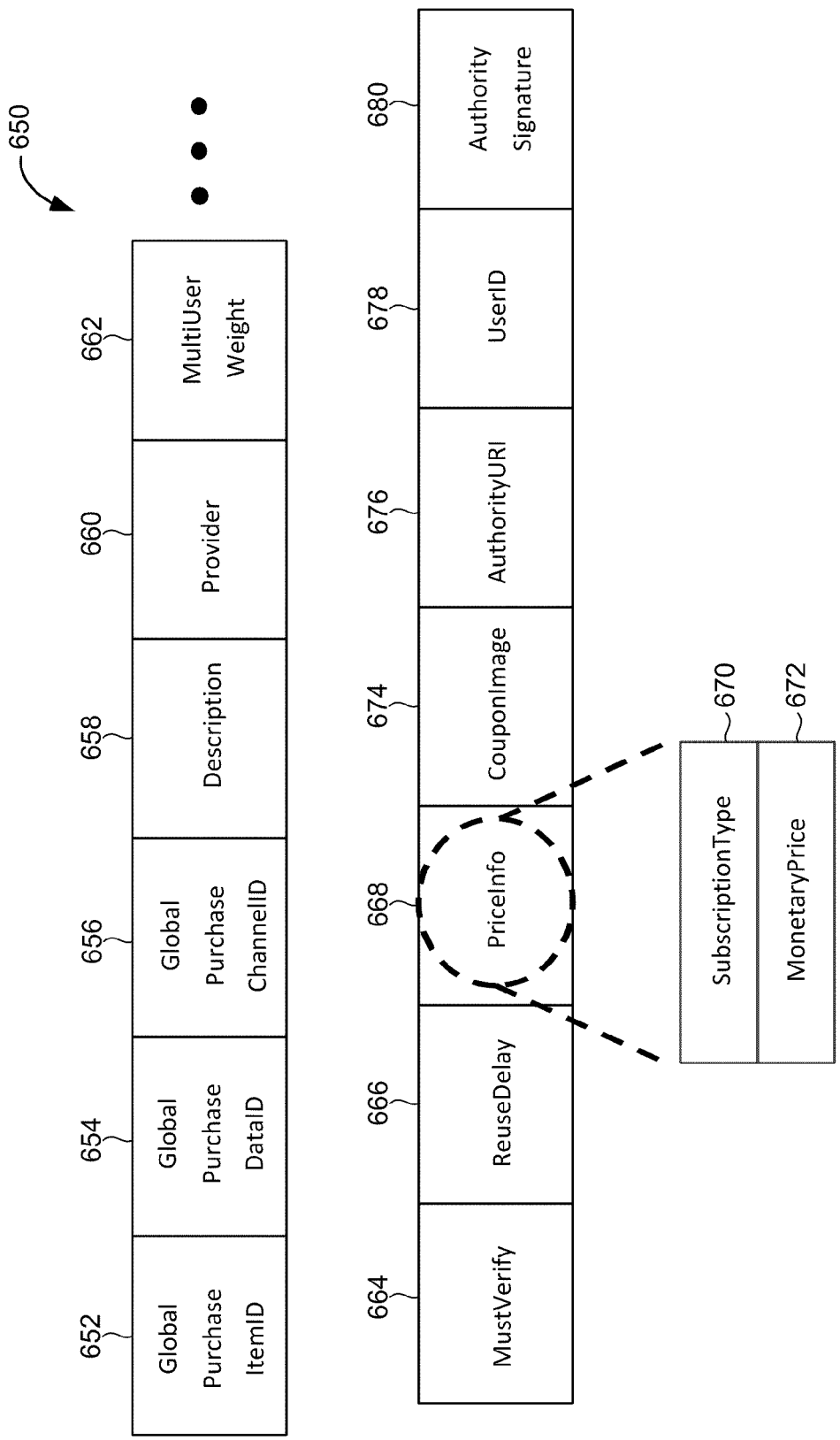
FIG. 7B is a message structure diagram of another embodiment of a coupon element.

An alternative embodiment of the coupon element 650 and its components is shown in FIG. 7B. The sub-elements of this alternative coupon embodiment includes the information required to identify the coupon, described the coupon, indicate the price or discount provided by the coupon, identify its weight for purposes of combining with other coupons (as is described more fully below) and verify the coupon, such as in the form of a digital signature. Example information that may be included in a coupon object include: an identifier (ID), such as a globally unique identifier; a version number; a first moment validity date (valid from date); a last moment validity date (valid to date) 652; a flag or value indicating that the coupon must be verified by the issuer before being redeemed 664; an identifier of the product or service to which the coupon applies 654; and identifier for the channels through which the product or service must be purchased for the coupon to be valid 656; a description of the coupon 658; an identifier of the provider of the coupon (e.g., the nature of the business issuing the coupon) 660; a multi-use weight value 662 as is described more fully below with reference to FIG. 27; an indication of how soon after the coupon is redeemed it may be reused 666; price information 668, such including relative price or discount value information; an indication of the intended type of purchase item for which the coupon is valid 670; a monetary discount price to be applied when the coupon is redeemed 672; an indicator of the monetary currency in which the coupon is valid; an address, such as a URL, at which a coupon printable image may be obtained 674; a URI which describes the authority that provided a digital signature for the coupon and that will be deemed the coupon 676; a user ID field and identifiers of the type of user ID 678; and a digital signature 680, such as an XML digital signature, from the issuing authority.

Figure 7C:
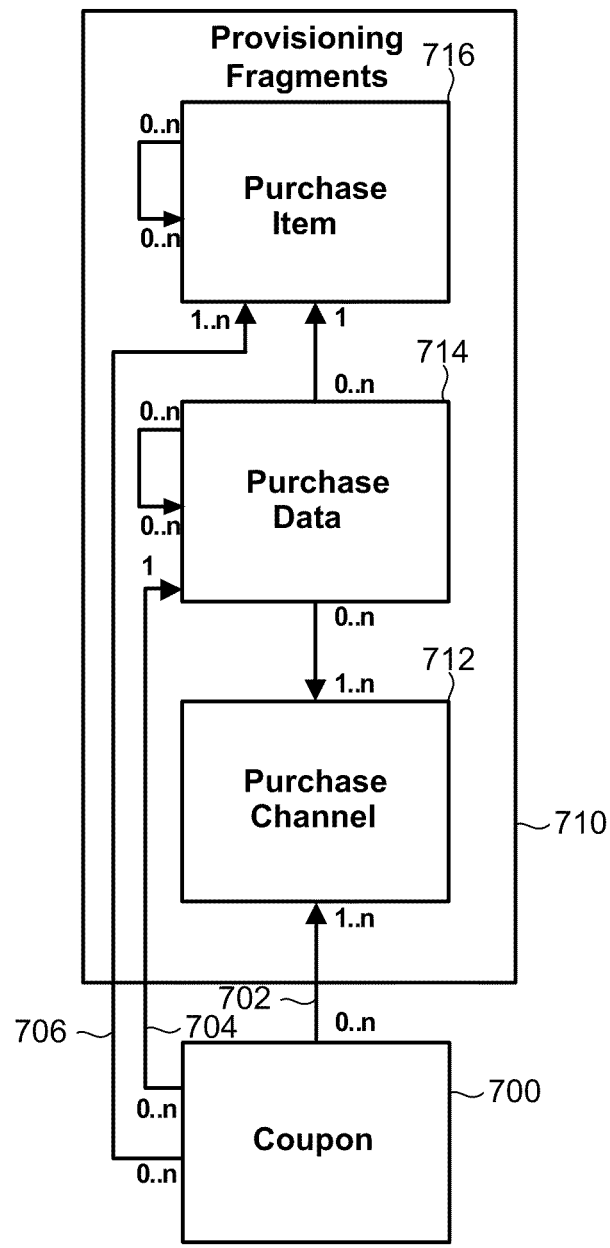
FIG. 7C is a diagram illustrating pointer references between a coupon document and service guide fragments according to an embodiment.

When the electronic coupon is delivered and processed as a separate coupon document or coupon object, the coupon object may be maintained outside of the service guide. Nevertheless, the coupon object may include pointers to fragments in the service guide which identifies information related to the coupon. FIG. 7C illustrates relationships between a coupon object 700 and the service guide 710.

Specifically, a coupon object 700 may include pointers 702, 704, 706 to provisioning fragments 712, 714, 716 with in the service guide 710, or to particular information fields within provisioning fragments. Such pointers may be in the form of globally unique pointers which do not change as the service guide is updated, so that the information referred to by the coupon object 700 is always available via the pointers 702, 704, 706 included in the coupon.

Figure 8:
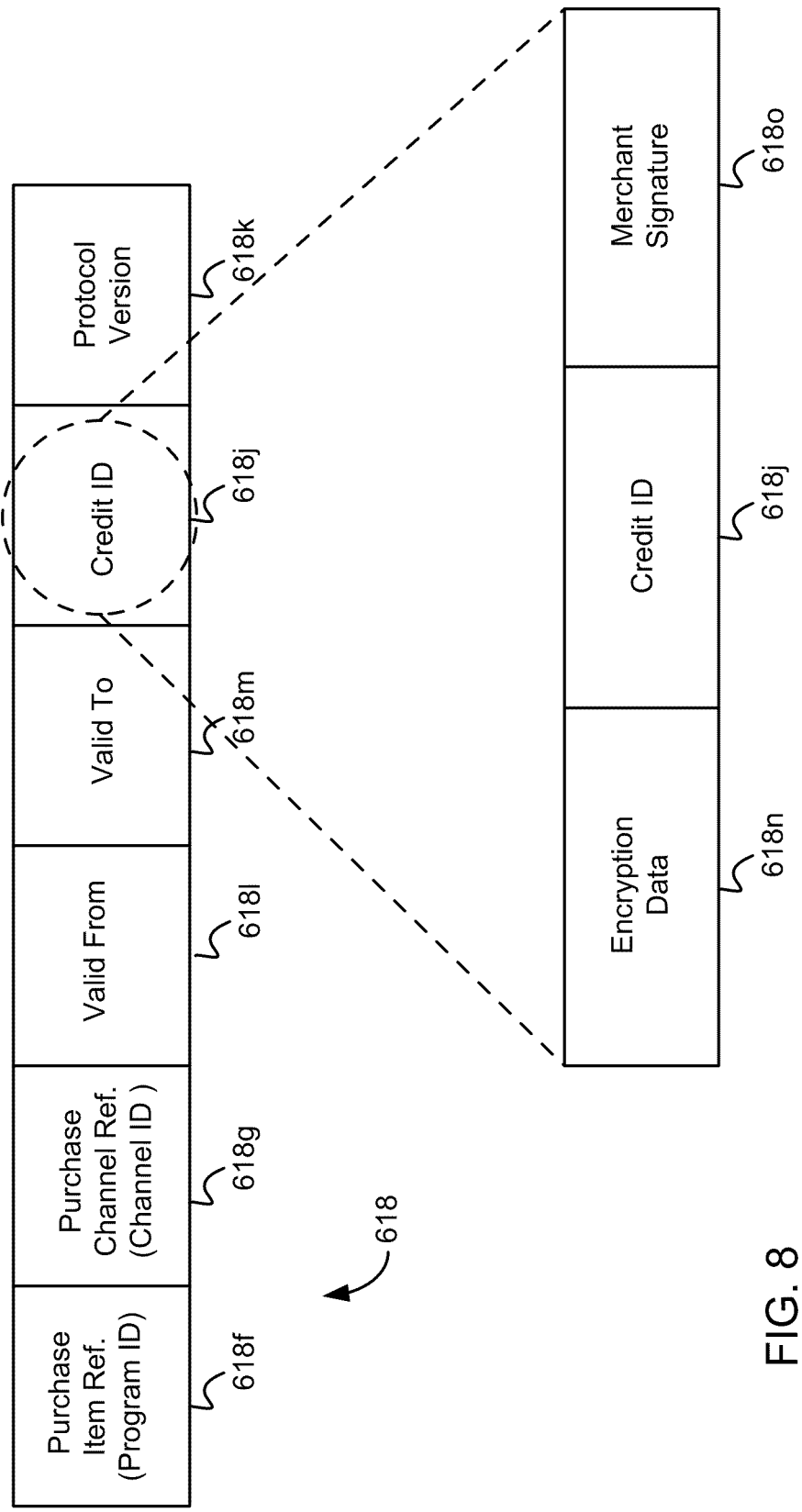
FIG. 8 is a message structure diagram of an embodiment of a bonus credit element.

In an embodiment, the credit ID field 618*j* may include additional sub-elements as shown in FIG. 8, such as an encryption parameter 618*n*, a credit identifier 618*p* and a multipurpose signature 618*o*. The encryption parameter 618*n* may be used to specify an encryption algorithm and associated parameters such as an encryption salt or nonce. The credit identifier 618*p* may be a globally unique identifier for the coupon.

The multipurpose signature 618*o* may be used to provide protection for the coupon when it is transported over hostile networks. The multipurpose signature 618*o* may be used to authenticate the coupon with a cryptographic signature (i.e., an encrypted digest of all or some of the coupon field), together with a hierarchy of one or more X.509 digital certificates retrieved on-demand and/or cached by the merchant server. In an embodiment, the multipurpose signature 618*o* may be used by a coupon issuer to produce a coupon that cannot be modified without detection (such as by using well known public key cryptography methods). In an embodiment, the multipurpose signature 618*o* may be created using an X.509 signature hierarchy so that coupon recipients (e.g., the mobile device and merchants) can verify that the coupon was issued by a particular authority, as discussed in more detail below. In this embodiment, the signature algorithm may be specified in the X.509 certificate.

Figure 9:
FIG. 9 is a list of potential error codes for use in an embodiment.

FIG. 9 is a table 604*a* of different globe status codes 604 and their associated status messages that may be included in a subscription response message 600. For example, a subscription response message 600 including the global status code "000" may indicate that the request process was successful. A subscription response message 600 including the global status code "003" may indicate that the requested purchase item in unknown. The "003" code may also be received if, for example, the device has a cached service guide service with old information, in which case the user may re-acquire the service guide. A subscription response message 600 including the global status code "009" may indicate that the charging step failed. For example, when an agreed credit limit is reached the account may be blocked, in which case the user may contact the service provider 30 to resolve the issue. The "009" code may also be used between different businesses involved in a transaction. A subscription response message 600 including the global status code "011" may indicate that the operation that the device attempted to perform is not permitted under the contract between the service provider 30 and the user. Upon receiving such an error message the user may contact the service operator 30 to change the contract terms. The "011" code may also be used between businesses. A subscription response message 600 including the global status code "015" may indicate that the requested service is unavailable due to transmission problems, in which case the request might be reinitiated at a later time. The "015" code may also be used between businesses. A subscription response message 600 including the global status code "016" may indicate that an identical request has been previously processed in which case a user or an entity may check to see if the request had already been processed. This may be done by determining whether an LTKM was received and if not, reentering the request. A user subscription response message 600 including the global status code "021" may indicate that the information given is invalid and cannot be used by the system. In such a situation the user may recheck and resent the request again. The subscription response message 600 including the global status code "022" may indicate that the requesting key materials and messages are not valid and cannot be fulfilled. In such a scenario the user may recheck and if necessary resend the request. A subscription response message 600 including the global status "031" may indicate that the user tried to employ a bonus credit 618 which carried with it a coupon but the coupon has an expiration date and is no longer valid for the purchase transaction. A subscription response message 600 including the global status code "032" may indicate that the user employed a validated bonus credit (which carried with it a coupon) to purchase an available content object, but the coupon had already been used in a previous transaction, and therefore the coupon is no longer valid.

In an embodiment, credits may be delivered or pushed to users' mobile devices 40 without receiving a voluntary service request from the user. In other words, the mobile broadcast TV system may "bootstrap" the users' mobile devices 40 and push out credits to the user's mobile device 40 without them sending a request message. Such delivery methods may allow the third parties 50 and the mobile broadcast service provider 30 to transmit credits to mobile devices 40 using the broadcast network 80 to deliver messages to all users or using the unicast network 70 to deliver messages to specific users or groups of users. Bootstrapping the users' mobile devices 40 may be done by different methods. In one embodiment, as described below with reference to FIGS. 10 and 11, solicited pull messages may be broadcasted to users' mobile devices 40. Solicited pull messages may solicit credit purchase requests from the user's mobile devices 40. In another embodiment, as described below with reference to FIGS. 13-14, credit grant push messages may be broadcasted to users' mobile devices 40 to allow the users' mobile devices 40 to receive credits without having to take explicit action.

To illustrate the delivery of credits using bootstrapping methods, the following exemplary embodiments describe deliver of free tokens to users. Free tokens can be redeemed for mobile TV program viewing much like purchased tokens. While the processes for delivering tokens are used as examples in the following embodiments, the same processes may be used to deliver other types of credit, such as coupons which can be redeemed for products or services. Therefore, the following examples are not intended to limit the scope of this invention to delivery of tokens.

Figure 10A:
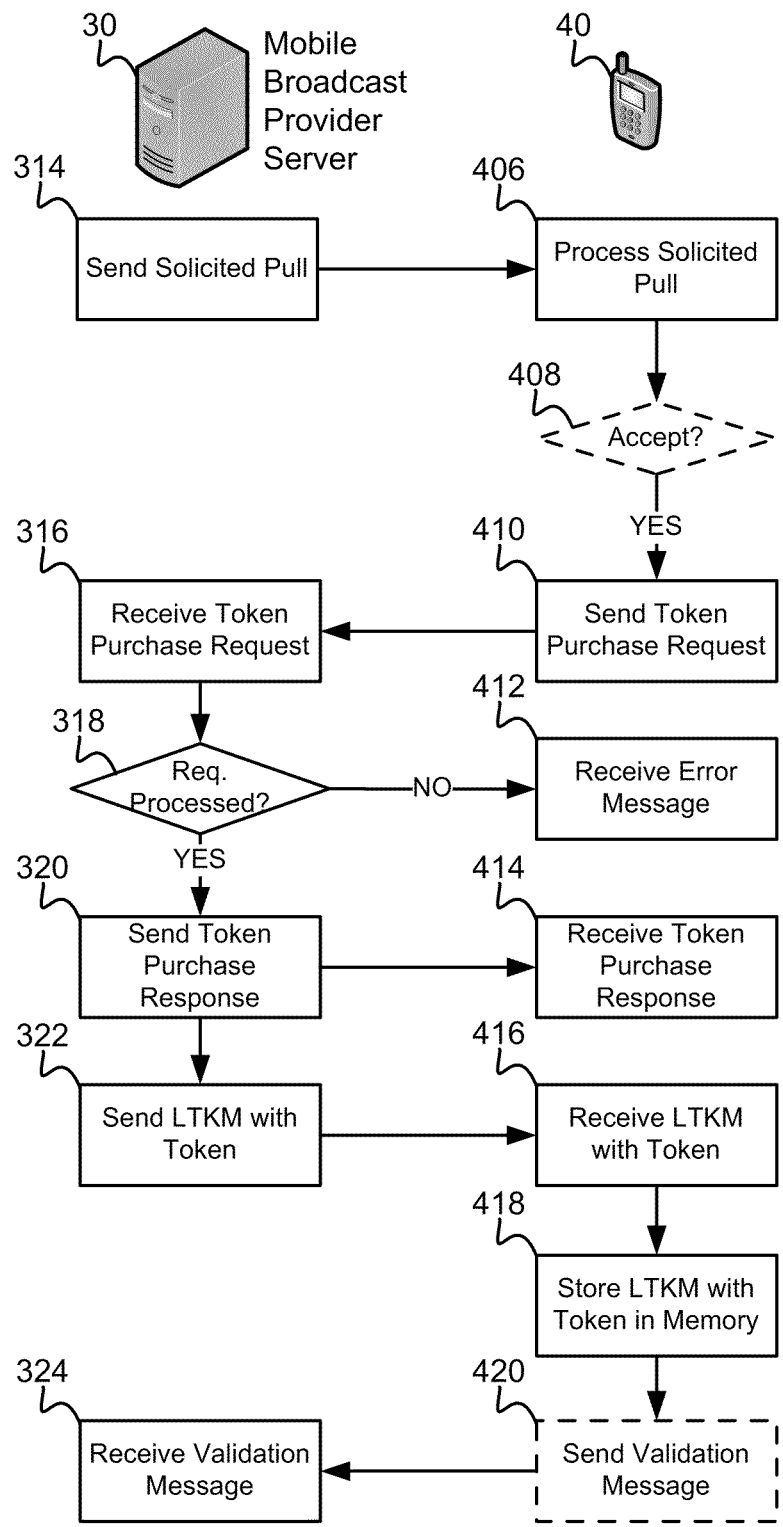
FIG. 10A is a process flow diagram of an embodiment method for delivering credits or coupons to a receiver device.
Figure 11A:
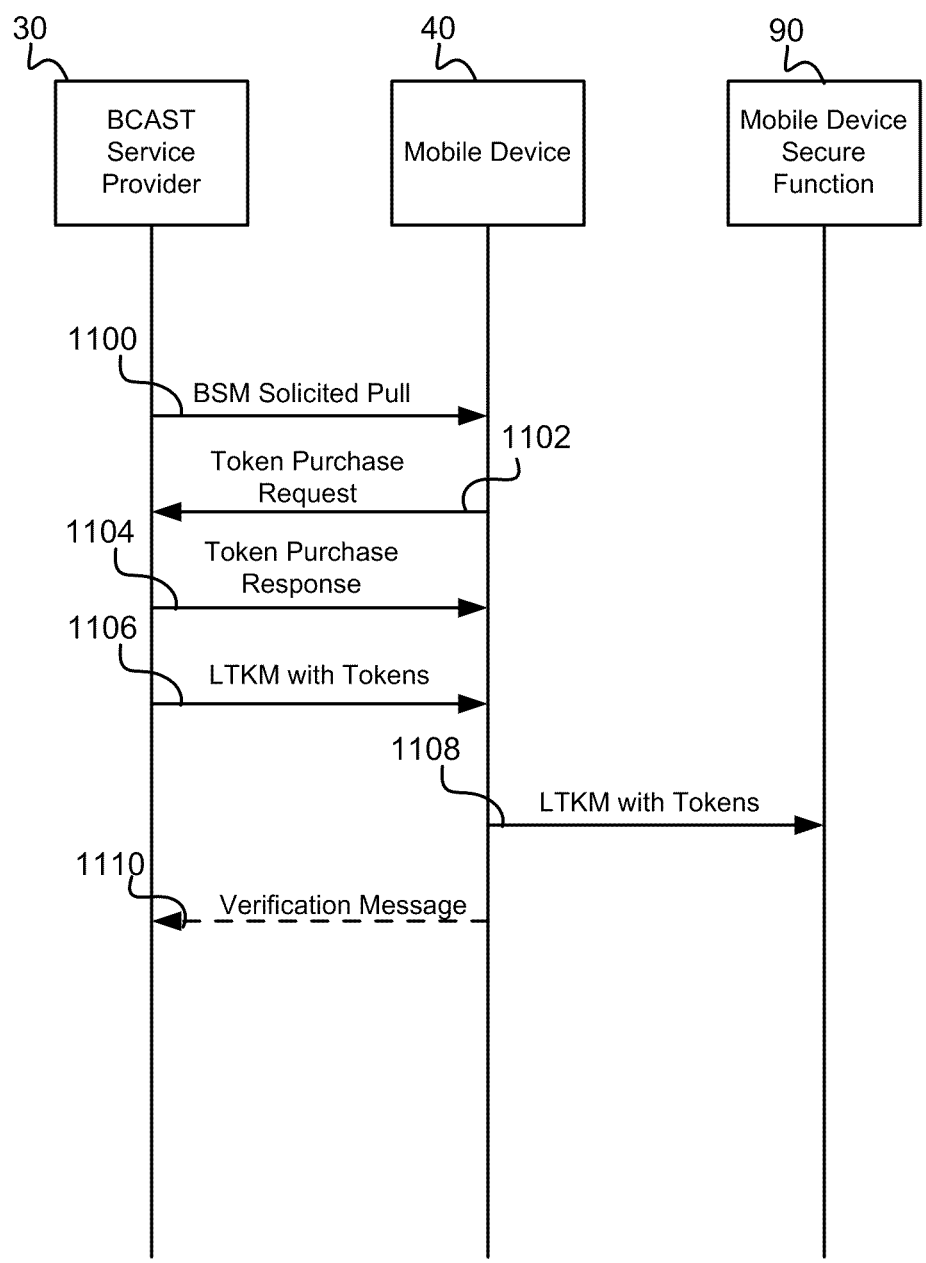
FIG. 11A is a message flow diagram of the embodiment method illustrated in FIG. 10A for delivering credits or coupons to a receiver device.

FIG. 10A is a process flow diagram of an exemplary embodiment method using solicited pull messages to bootstrap users' mobile devices to receive free tokens. FIG. 11A is a message flow diagram of messages which may be exchanged between different mobile broadcast TV system components to deliver tokens according to the method shown in FIG. 10A. This embodiment is described below with reference to both FIGS. 10A and 11A.

To initiate an involuntary token purchase request, a mobile broadcast service provider 30 may send a solicited pull message to the user's mobile device 40, step 314 in FIG. 10A which relates to message 1100 in FIG. 11A. The solicited pull message 1100 may be sent through either the broadcast network 80 or unicast network 70. The solicited pull message 1100 is a message that will prompt the mobile device 40 send a purchase request message, thereby initiating the credit delivery process described above with reference to FIGS. 4 and 5. The user's mobile device 40 may receive and process the solicited pull message, step 406. Optionally, the user may be prompted to accept or reject the solicited pull, optional determination 408. This optional user choice may be useful, for example, for mobile device users whose privacy or security concerns may outweigh a desire to receive credits. If the user responds to the prompt by rejecting the solicited pull, the mobile device 40 may simply ignore the solicited pull message. However, if the user responds to the prompt by accepting the solicited pull (i.e., determination 408="YES"), the mobile device 40 may send a token purchase request to the mobile broadcast service provider 30, step 410 in FIG. 10A which relates to message 1102 in FIG. 11A. As described above with reference to FIGS. 4 and 5, the token purchase request message 1102 may be transmitted to the service provider 30 through the unicast network 70 or another network, such as the Internet 90. The token purchase request message 1102 may include information specified in the solicited pull message (e.g., an identifier) or may specify a purchase request of zero, such as when a token purchase request is for free tokens based on rules defined in the solicited pull message 1100 sent by the mobile broadcast service provider 30. Upon receiving the token purchase request message 1102, step 316, the mobile broadcast service provider 30 may process the request to determine whether any errors exist, determination 318. If the token purchase request message 1102 is not successfully received (i.e., determination 318="NO"), a token purchase response with an error message may be sent to the mobile device 40, step 412, message 1104. This error message may include one or more of the codes and status messages described above with reference to FIG. 9. If the token purchase request is processed successfully (i.e., determination 318="YES"), the mobile broadcast service provider 30 may then send a token purchase response message, step 320 in FIG. 10A which relates to message 1104 in FIG. 11A, that the user's mobile device 40 may receive, step 414. The token purchase response message 1104 may include attributes and elements that are described in more detail below with reference to FIG. 12. Following transmission of the token purchase response message, the mobile broadcast service provider 30 may transmit an LTKM message to the mobile device 40 which includes the tokens along with the terms and conditions under which the free tokens may be used, step 416 in FIG. 10A which relates to message 1106 in FIG. 11A. This LTKM may be transmitted through the unicast network 70 or another network, such as the Internet 90. Upon receiving the LTKM, step 416, the mobile device 40 may store the tokens in its memory, step 418 in FIG. 10A which relates to internal message 1108 in FIG. 11A. Optionally, the mobile device 40 may send a verification message to the mobile broadcast service provider 30, step 420 in FIG. 10A which relates to message 1110 in FIG. 11A, to indicate safe receipt of the tokens. This verification message 1110 may be transmitted through the unicast network 70 or another network, such as the Internet 90. The verification message 1110 may be received by the mobile broadcast service provider 30, step 324.

Figure 10B:
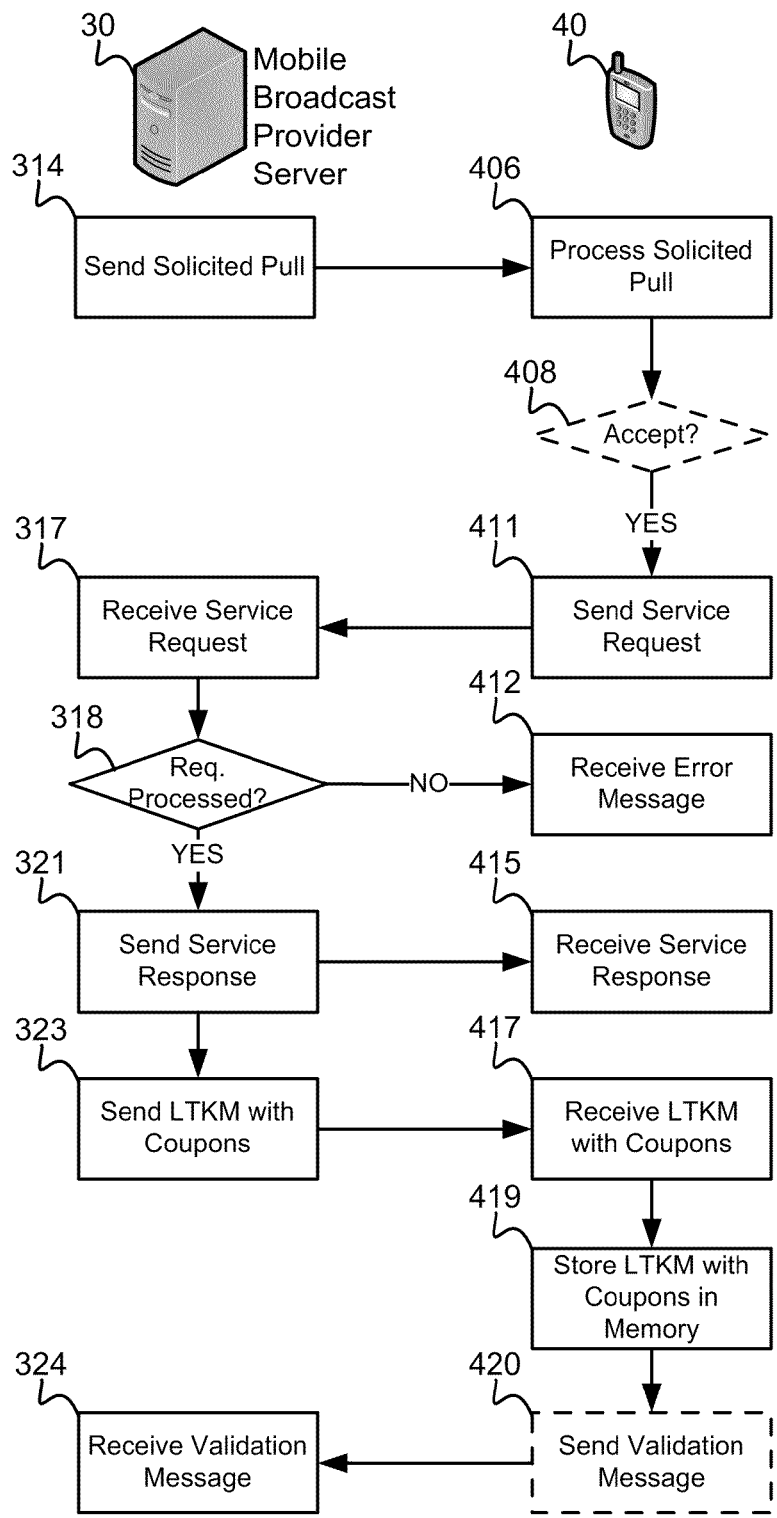
FIG. 10B is a process flow diagram of another embodiment method for delivering credits or coupons to a receiver device.
Figure 11B:
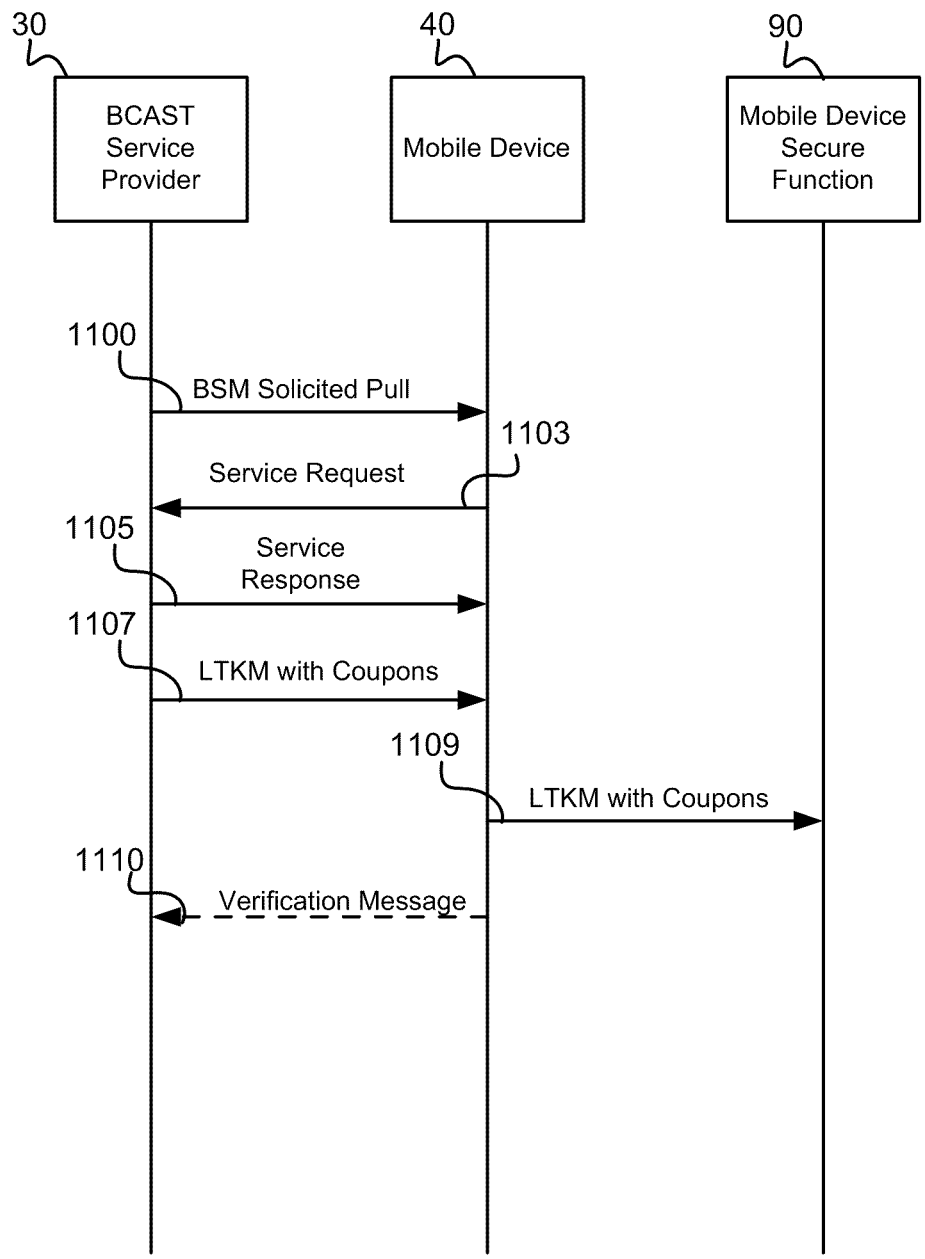
FIG. 11B is a message flow diagram of the embodiment method illustrated in FIG. 10B for delivering credits or coupons to a receiver device.

While FIGS. 10A and 11A illustrate one example embodiment in which tokens are exchanged via token purchase request and purchase response messages, the solicited pull process may be used to send a general subscription request message (i.e., service requests) as a mechanism for receiving credits, such as to receive coupons instead of tokens. FIG. 10B is a process flow diagram of an exemplary embodiment method for using solicited pull messages to bootstrap users' mobile devices to receive coupons via a service request. FIG. 11B is a message flow diagram of messages which may be exchanged between different mobile broadcast TV system components to deliver coupons according to the method shown in FIG. 10B. The processes and messages with like numbered references are consistent with those described above with reference to FIGS. 10A and 11A.

Referring to FIGS. 10B and 11B together, in response to receiving a solicited pull message 1100 (step 406 in FIG. 10B), the mobile device 40 may send a service request message to the mobile broadcast service provider 30, steps 411 and 317 in FIG. 10B which corresponds to message 1103 in FIG. 11B. The mobile broadcast service provider 30 may respond by sending a service response message to the mobile device 30, steps 321 and 415 in FIG. 10B which corresponds to message 1105 in FIG. 11B. The mobile broadcast service provider 30 may then send an LTKM message including coupons (or other item of value) to the mobile device 30, steps 323 and 417 in FIG. 10B which correspond to message 1107 in FIG. 11B. The mobile device 30 may store the LTKM and coupons in memory, step 419 in FIG. 10B and internal message 1109 in FIG. 11B, and respond with an optional validation message as described above for steps 420 and 324 and message 1110.

Figure 12:
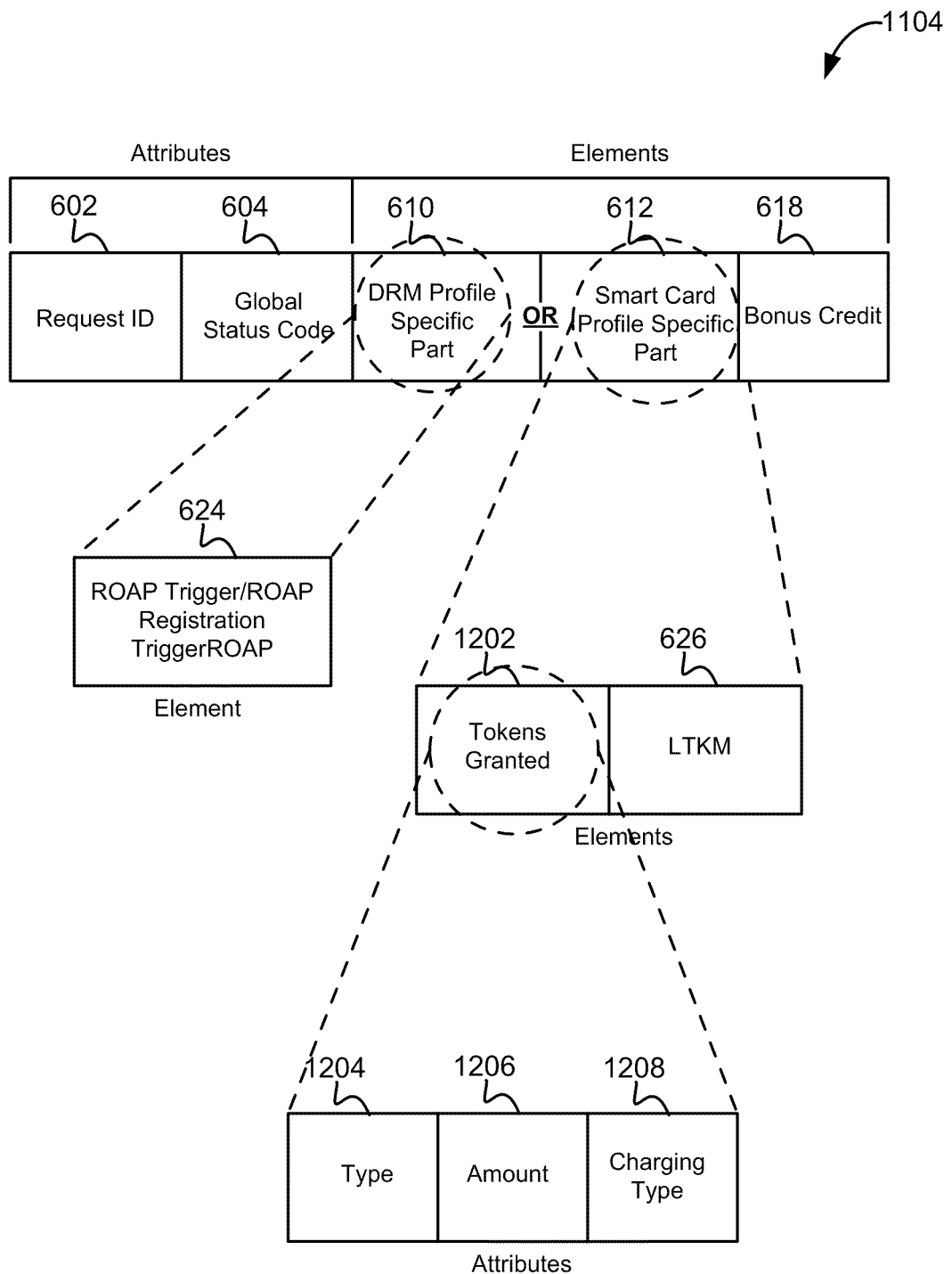
FIG. 12 is a message structure of an embodiment of a token purchase response.

FIG. 12 illustrates various attributes and elements that may be included in an embodiment token purchase response message 1104. The token purchase response 1104 may include an optional request ID attribute 602, and a mandatory global status code attribute 604. As described above with reference to FIG. 6, a request ID attribute 602 may be an identifier for the corresponding service request message. Accordingly, to allow the correct responses to reach the right requesting party, the request ID attribute 604 may identify and correlate a token purchase response message 1104 to the correct token purchase request message 1102. Using a request ID attribute 602 the user's mobile device 40 can determine whether the correct token purchase response message 1104 is received. As described above with respect to FIG. 6, the global status code 604 may provide information about the overall outcome of the token purchase request according to certain defined return codes. Exemplary return codes are described in more detail above with reference to FIG. 9. By using the global status code 604, the mobile device 40 may determine whether the request was processed successfully or failed due to some error. In other words, the global status code 604 may communicate the status (i.e. success or failure due to error) of the service request to the user's mobile device 40.

The token purchase response 1104 may also include optional elements such as a DRM profile specific part element 610, a smart card profile specific part element 612, and a bonus credit element 618. The DRM profile specific part element 610 and smart card profile specific part element 612 are mutually exclusive. Accordingly, a token purchase response message may only contain either the DRM profile specific part element 610 or the smart card profile specific part element 612. The service and content protection DRM profile specific part element 610 may be mandatory to support for DRM profile, and may not be applicable to the smart card profile.

The DRM profile specific part element 610 may contain the optional element of a ROAP trigger 624. The ROAP trigger 624 element in a token purchase response message 1104 is similar to the ROAP trigger 624 in a subscription response message 600 with a few differences. If the token purchase succeeds, the token purchase response message 1104 may include a ROAP trigger 624 as an additional payload. The mobile device 40 may use this ROAP trigger 624 to initiate one or more token acquisitions (i.e., by initiating an LTKM acquisition). This is the same function as the ROAP trigger 624 in the subscription response message 600 described above. However, in contrast to the ROAP trigger 624 element of the subscription response message 600, if the token purchase request fails because the mobile device 40 is, for example, unregistered, the token purchase response message 1104 may include a ROAP registration trigger as an additional payload. The mobile device 40 may then be prompted to initiate a registration process with the service provider 30 and then resend the token purchase request message 1102 once it is successfully registered.

The token purchase response message may include an optional token granted element 1202 and an LTKM element 626. The token grant element 1202 may include several attributes such as information about the granted tokens in response to the token purchase request message 1102. These attributes may include type 1204, amount 1206, and charging type 1208. The type attribute 1204 may specify the type of token granted in the token purchase transaction. Different types of token that may be granted and their assigned values may include reserved tokens (value 0), tokens for DRM profile (value 1), service tokens for smart card profile added to the live PPT purse (value 2), service tokens for smart card profile added to the playback PPT purse (value 3), user tokens for the smart card profile added to the user purse associated with the service provider 30 ID (value 4), tokens reserved for the future use (value 5-127) and tokens reserved for proprietary use (values 128-255). The amount attribute 1206 may include information specifying the number of tokens granted in the token purchase transaction. For the type attribute 1204 the value specified in the attribute may correspond to the number of tokens granted. The charging type attribute 1208 may include information about the type of charging to be associated with the token purchase transaction. The charging types may include unspecified (value 0), prepaid (value 1), postpaid (value 2), reserve for future use (values 3-127), and reserved for proprietary use (values 128-255). As described above with reference to FIG. 6, the LTKM 626 element may be a smart card profile mobile broadcast TV LTKM including a base 64-encoded MIKEY message. This element may be present in a token purchase response message 1104 if the requesting mobile device 40 and the service provider 30 have agreed on "HTTP" (i.e., Internet) as a LTKM delivery mechanism during the registration procedure.

Similar to the subscription response message 600 described above with reference to FIG. 6, the token purchase response message 1104 may also include an optional bonus credit element 618 by which credits, such as tokens or coupons, may be sent to users. For example, credit (i.e. coupon and/or token) data may be inserted into the bonus credit element 618 before the token purchase response 1104 is sent to the user's mobile device 40. In this manner, the users may receive credits from the mobile broadcast service provider 30 when their mobile devices 40 respond to the solicited pull message sent by the mobile broadcast service provider 30. The credit type that may be part of the token purchase response message 1104 may be varied and tied to, for example, the type of token being pushed to the users, the identity of the user sent the solicited pull message 1100 or responding with a token purchase request message 1102 (based on the user's habits and use of the mobile broadcast TV system) or both. For example, zero or more standalone bonus credit (also known as purchase data) parameters may be present as an attribute of the purchase item 608. These bonus credit parameters may include user unique credit data for bonus services that may result from this token purchase transaction. The credits may be stored in the memory of the user's mobile device 40 and managed based on the service guide rules and the user's membership level. Example embodiment bonus credit 618 message structures are described in more detail above with reference to FIGS. 7 and 8.

Figure 13:
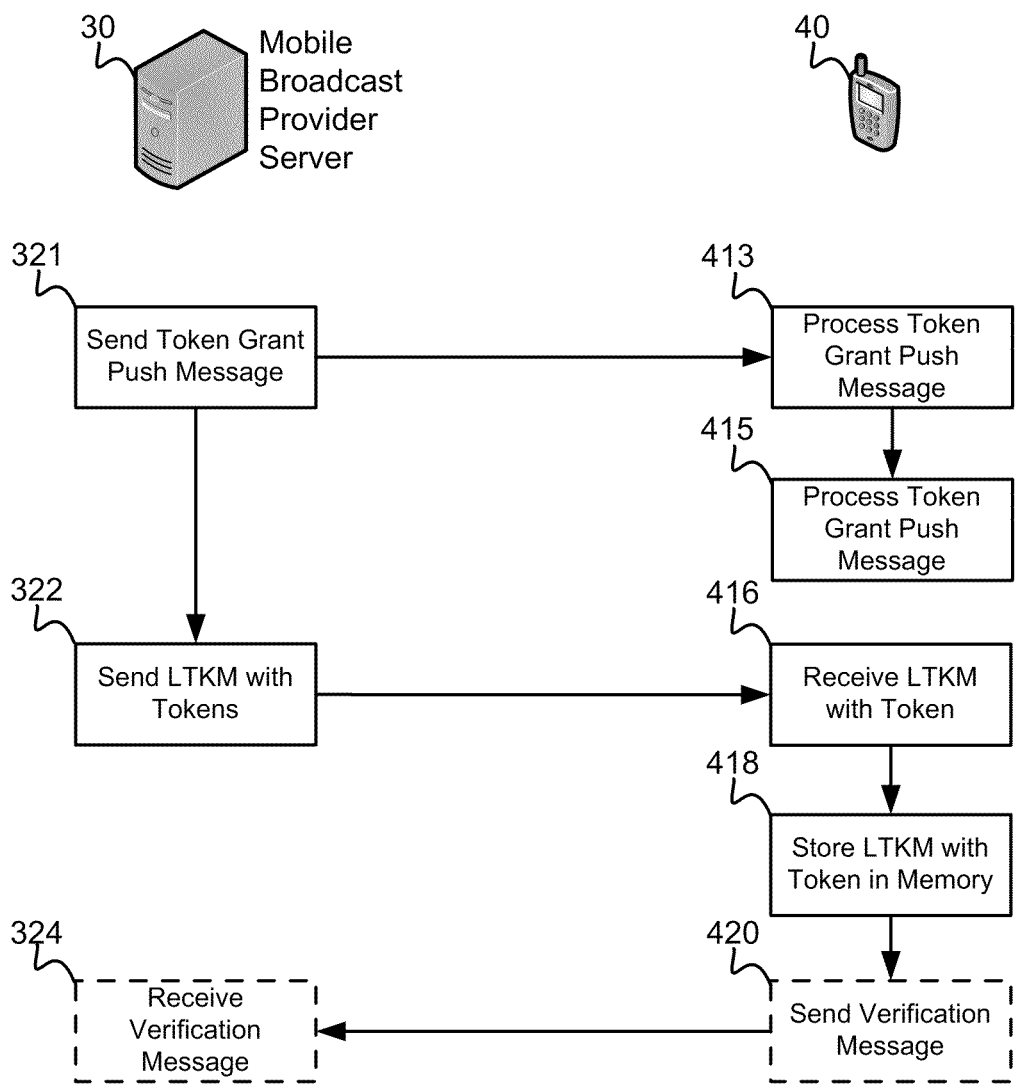
FIG. 13 is a process flow diagram of another embodiment method for delivering credits or coupons to a receiver device.
Figure 14:
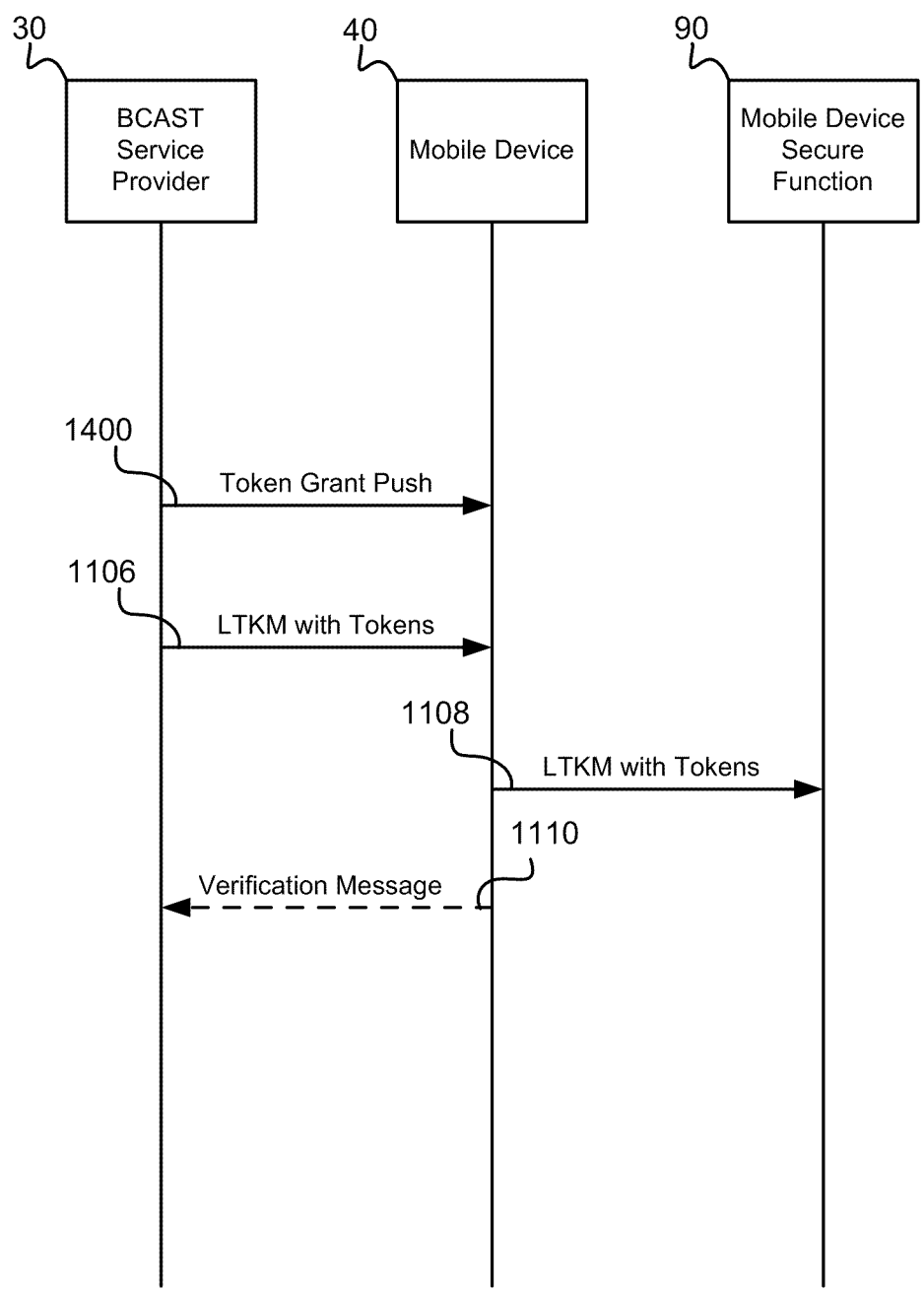
FIG. 14 is a message flow diagram of the embodiment illustrated in FIG. 13.

FIG. 13 illustrates a process flow of an exemplary embodiment using token grant push messages to bootstrap users' mobile devices 40 to receive free tokens. FIG. 14 is a message flow diagram illustrating messages that may be exchanged between different mobile broadcast TV system components for delivery of credits according to the method illustrated in FIG. 13. This embodiment is described with reference to both FIGS. 13 and 14.

To initiate the delivery of tokens to a mobile device 40 the mobile broadcast service provider 30 may send a token grant push message to the mobile device 40, step 321, message 1400. The mobile device 40 may receive and processes the token grant push message, step 413. The token grant push message notifies the mobile device 40 that an LTKM will be transmitted so that the mobile device 40 can prepare to receive credits in an LTKM. Following the token grant push message 1400, the mobile broadcast service provider 30 may send to the mobile device 40 an LTKM which identifies the free tokens and the terms of use, step 322, message 1106. Upon receipt of the LTKM 1106 the mobile device 40 processes the information, step 416, and stores the free tokens in memory, such as in the mobile device secure function 90 (e.g. smart card memory), step 418, internal message 1108. The mobile device 40 may reply with a verification message to the mobile broadcast service provider 30, step 420, message 1110, to indicate that the LTKM and the free tokens were received and stored successfully. Alternatively or optionally, if the tokens are not successfully stored in the memory, the mobile device 40 may include that information in the verification message (not shown). The mobile broadcast service provider 30 may receive the verification message 1110, step 324, and take appropriate steps based on the content of the message. For example, if the verification message 1110 indicates that the tokens were successfully received and stored by the mobile device 40, the service provider 30 may take no further actions. However, if the verification message 1110 includes information indicating that the tokens were not successfully received or stored in the mobile device 40 memory, the mobile broadcast service provider 30 may take an appropriate action to remedy that the situation, such as resending the LTKM 1106.

Once the credits, such as free tokens or coupons, are delivered to the mobile device 40, a user may use them to purchase mobile TV programs, services or products. According to the various embodiments, different methods for redeeming credits may be employed. One example redemption method includes broadcasting an STKM for which the credits may be used to purchase only service content from a particular mobile broadcast service provider 30. Another example includes transmitting an LTKM purse mode using the unicast network 70 to cause the mobile device 40 to decrement particular credits from the on-board electronic purse (implemented either on secure memory on the terminal or in the smartcard) as part of payment for a purchase. The LTKM purse mode message is a message which includes instructions that cause the mobile device to decrement credits from its electronic purse. Another example includes broadcasting an STKM null program message which is a message that directs the mobile device 40 to decrement particular credits from its electronic purse as part of the payment. Each of these credit redemption methods are explained in more detail below with reference to FIGS. 15-20.

Figure 15:
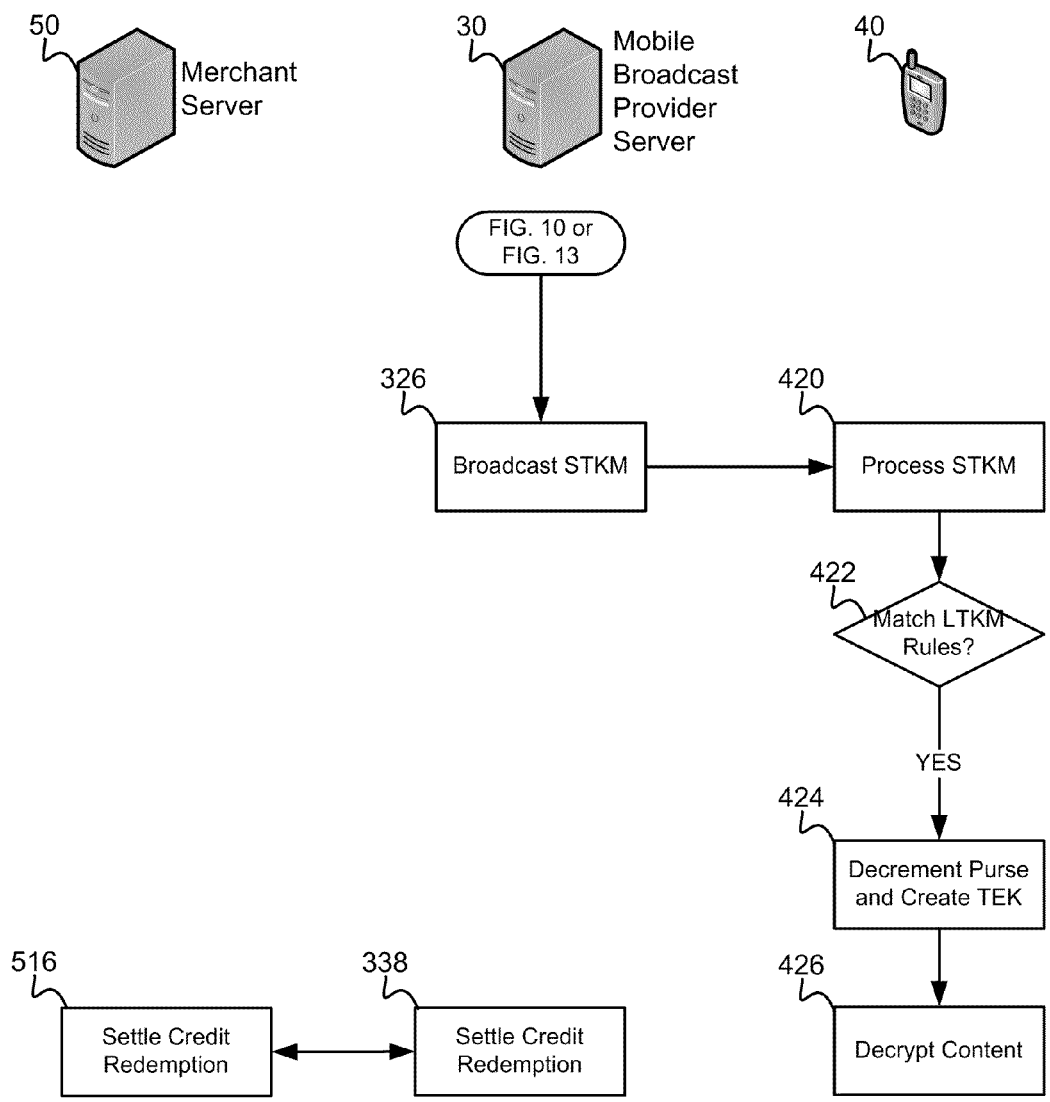
FIG. 15 is a process flow diagram of an embodiment method for redeeming credits or coupons.
Figure 16:
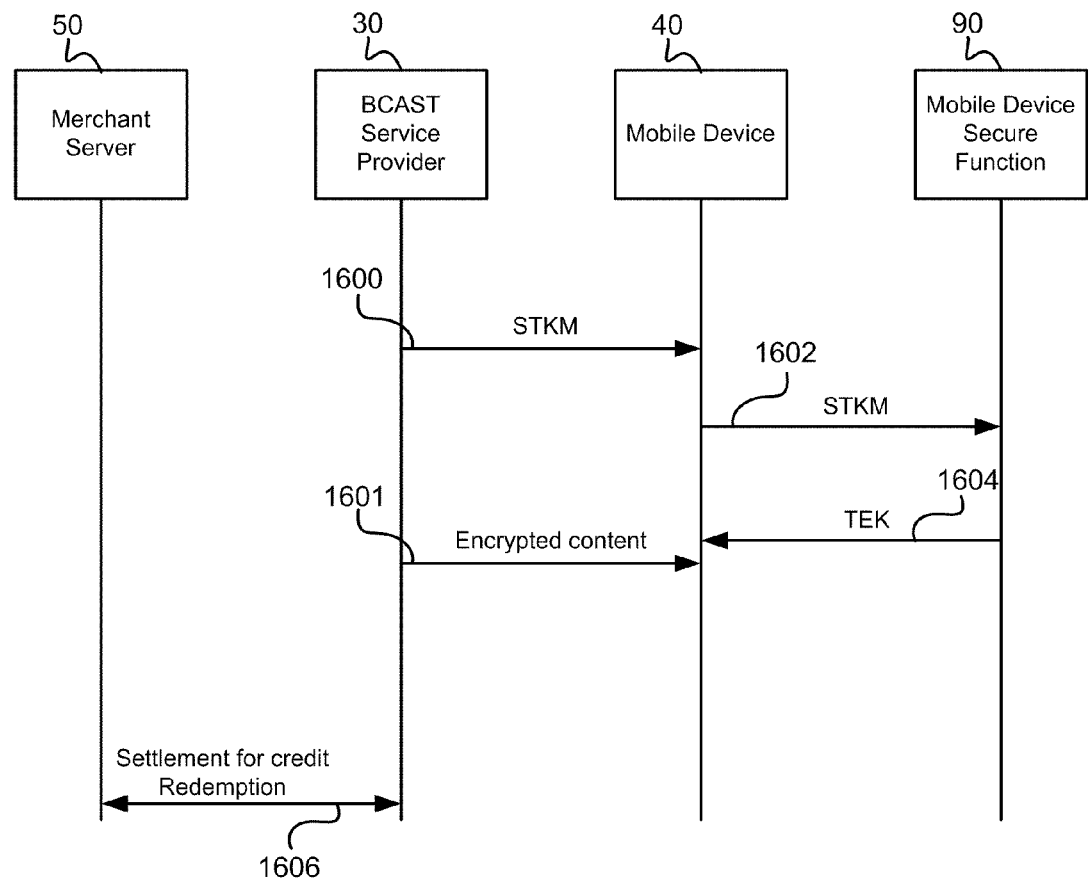
FIG. 16 is a message flow diagram of the embodiment illustrated in FIG. 15.

FIG. 15 is a process flow diagram of an exemplary embodiment for redeeming credits using STKM broadcasts. FIG. 16 is a message flow diagram of messages exchanged between different mobile broadcast TV system components for redeeming credits in the method shown in FIG. 15. This embodiment is described below with reference to both FIGS. 15 and 16.

According to the various embodiments, credits delivered or pushed to a mobile device 40 may include credits that may only be redeemed for purchasing free or discounted programs or content from the mobile broadcast service provider 30. In such a scenario, the mobile broadcast service provider 30 may broadcast an STKM stream, message 1600, and in addition, nominal or promotional programs and content stream, messages 1601, that may be purchased using credits stored in mobile devices 40, step 326. Message 1600 comprises broadcast delivery of an STKM stream. Message 1601 transmits the encrypted content as a continuous stream. A mobile device 40 may process a received STKM stream 1600 to determine whether credits in memory may be used to access the particular encrypted content stream (message 1601) associated with the STKM stream broadcast, step 420. A broadcasted STKM stream 1600 may be delivered by the broadcast network 80 to every mobile device 40 that is registered with the broadcast network. However, not every mobile device 40 that receives the STKM may be able to decrypt the included TEK to access the associated encrypted content stream, messages 1601. In order to access the encrypted content (messages 1601) associated with an STKM stream 1600 the receiving mobile device 40 must possess the correct codes and permissions. Such codes and permissions are defined by the LTKM rules that are stored on the mobile devices 40. For example, the LTKM rules that may be used may be those delivered along with the credits as described above with reference to FIGS. 10-14. When the mobile device 40 receives an STKM stream 1600, it may process it in the mobile device secure function 90, step 422, internal message 1602, to determine whether the LTKM rules allow access to the STKM stream 1600, determination 422. If the mobile device 40 determines that the LTKM rules do not allow access to the STKM stream (i.e., determination 422="NO"), the mobile device 40 may ignore the STKM stream (not shown). However, if the LTKM rules allow access to the STKM stream (i.e., determination 422="YES"), the mobile device 40 may decrement the amount of credit from the credit purse and required to decrypt one or more TEKs from the STKM stream, step 424, internal message 1604, subject to availability of credits in the purse. The mobile device 40 may then use the TEKs to decrypt at least a portion of the encrypted content stream, message 1601.

For example, a message stream 1601 may carry encrypted content of a premium channel program, such as a new movie on HBO®. Only mobile devices 40 that have previously received credits in an LTKM for accessing such programs may access and decrypt the HBO® program (messages 1601). Other mobile devices 40 which did not receive the LTKM and credits required for this promotion may not have access to the contents associated with this STKM stream 1600.

Once the encrypted content 1601 is decrypted and accessed by the mobile device 30, the mobile broadcast service provider 30 may settle the credit redemption with the merchant 50, steps 338, 516, message 1606. This settlement between the service provider 30 and the third party 50 or content provider 60 may be accomplished using any conventional business transaction process, including known electronic commerce transaction methods.

Figure 17:
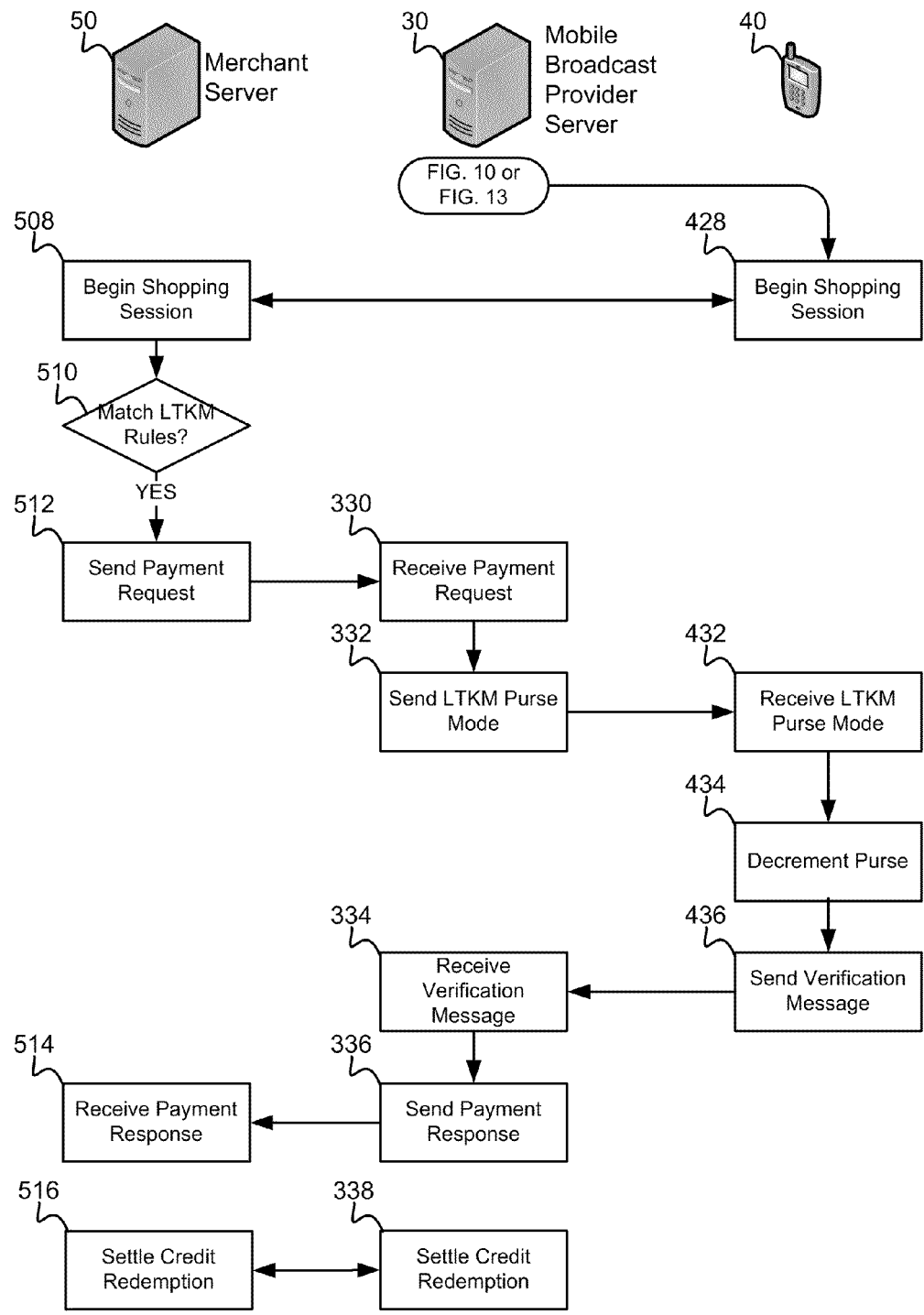
FIG. 17 is a process flow diagram of another embodiment method for redeeming credits or coupons.
Figure 18:
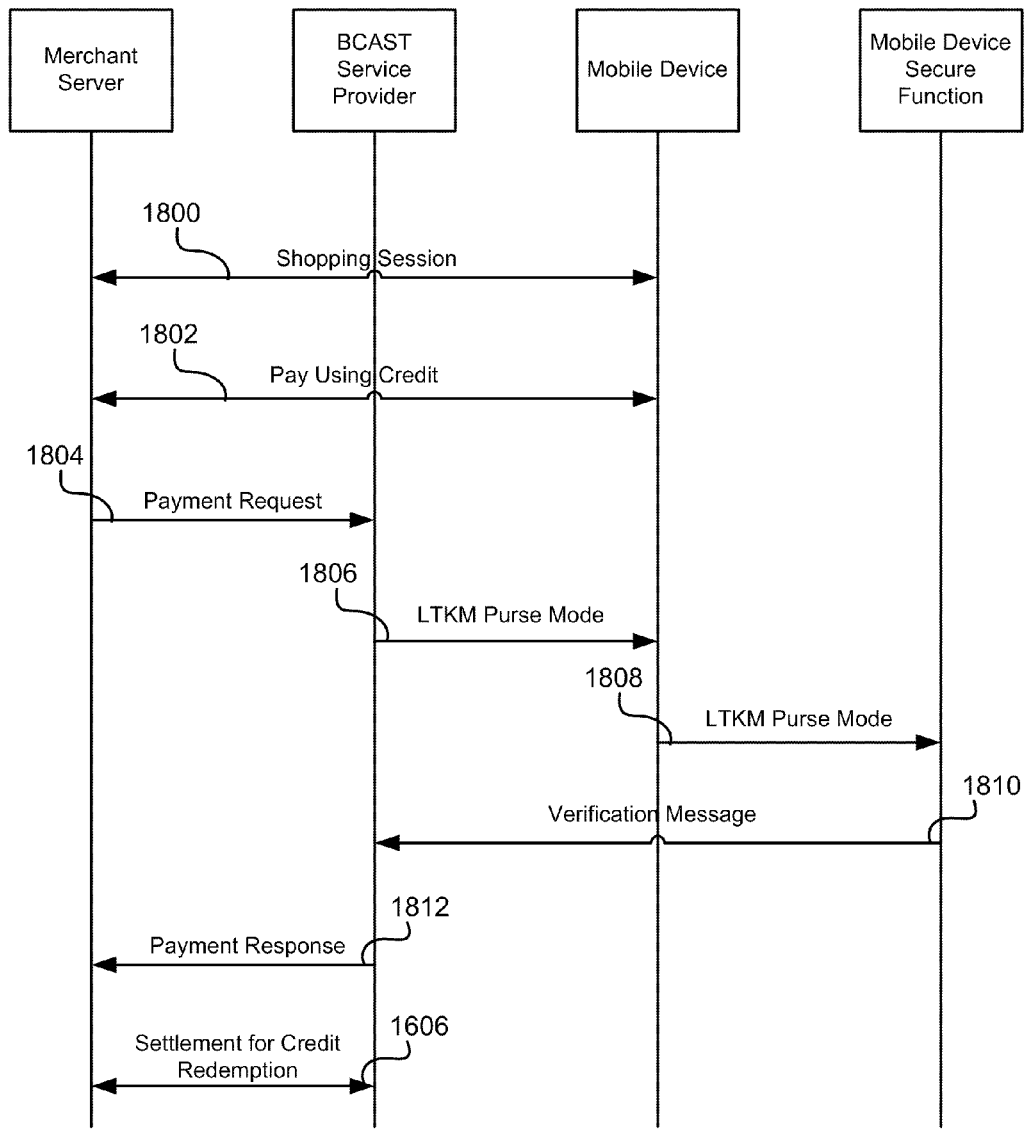
FIG. 18 is a message flow diagram of the embodiment illustrated in FIG. 17.

FIG. 17 is a process flow diagram of an exemplary embodiment enabling users to expend credit to purchase a service or product from a merchant. FIG. 18 is a message flow diagram of messages that may be exchanged between system components for implementing the steps as shown in FIG. 17. This embodiment is described below with reference to both FIGS. 17 and 18.

In this exemplary embodiment, the promotional credit delivered to a mobile device 40 in an LTKM may be used to purchase products while shopping at merchant or on a vendor website. The process of receiving and storing credits is described above with reference to FIG. 10 or 13. Such credits may be used to pay for or to receive discounts on services or products when shopping, such as while physically shopping at the vendor's location (i.e., at the POS) or while shopping on-line. The user through his/her mobile device 40 may begin a shopping session with the merchant 50, steps 428, 508, messages 1800. The user may indicate a desire to finalize a purchase and transmit information regarding the coupons or credits stored in the mobile device 40 from the mobile device 40 to the merchant 50, message 1802. This message may be transmitted via the Internet in an on-line shopping session, or from the mobile device 40 to the merchant's POS system via a variety of known transmission methods, including, for example, a near field communication (NFC) link, a displayed barcode, or by manual entry of a coupon ID. The merchant 50 may determine whether the proffered credits may be used as part of paying for this transaction, determination 510. If credits may not be used for paying for this transaction, the merchant 50 may allow the user to pay using other means of payment, such as with a credit card (steps not shown). However, if the merchant 50 determines that the user's credits or coupons may be used (i.e., determination 510="YES"), the merchant 50 may send a payment request to the mobile broadcast service provider 30, step 512, message 1804. This payment request message 1804 may be transmitted via the Internet 90 or another network and identify the proffered coupons, the user and/or the mobile device 40. Upon receiving the payment request, step 330, the mobile broadcast service provider 30 may create and send an LTKM purse mode message to the mobile device 40 of the user, step 432, message 1806. The LTKM purse mode message 1806 may be transmitted to the user 40 using the unicast network 70 and may include instructions directing the user's mobile device 40 to decrement the appropriate credits from the mobile device 40 electronic purse. The mobile device 40 may receive the LTKM purse mode message 1806, step 432, and based on the LTKM rules, decrement the credits from the electronic purse, step 434, internal message 1808. If the credits are not decremented completely or successfully, the mobile device 40 may transmit a signal to the mobile broadcast service provider 30 (not shown). If the credits are not completely or successfully decremented from the mobile device 40 purse, the mobile broadcast service provider 30 may resend the LTKM purse mode (not shown). However, if the credits are decremented successfully, the mobile device 40 may send a verification message to the mobile broadcast service provider 30, step 436, message 1810. This verification message 1810 may be transmitted via the unicast network 70. The mobile broadcast service provider 30 may receive the verification message 1810, step 334, and send a payment response message to the merchant 50, step 336, message 1812, which the merchant may receive via the Internet or another network, step 514. The payment response message 1812 may provide information to the merchant 50 that the credits were successfully decremented from the user's mobile device 40 purse. The merchant 50 may complete the transaction with the user. Settlement of the credit redemption between the mobile broadcast service provider 30 and the merchant 50 may occur at the time of the sale, such as in conjunction with the transmission of the payment response message 1812, or at a later time, steps 338, 516.

Figure 19:
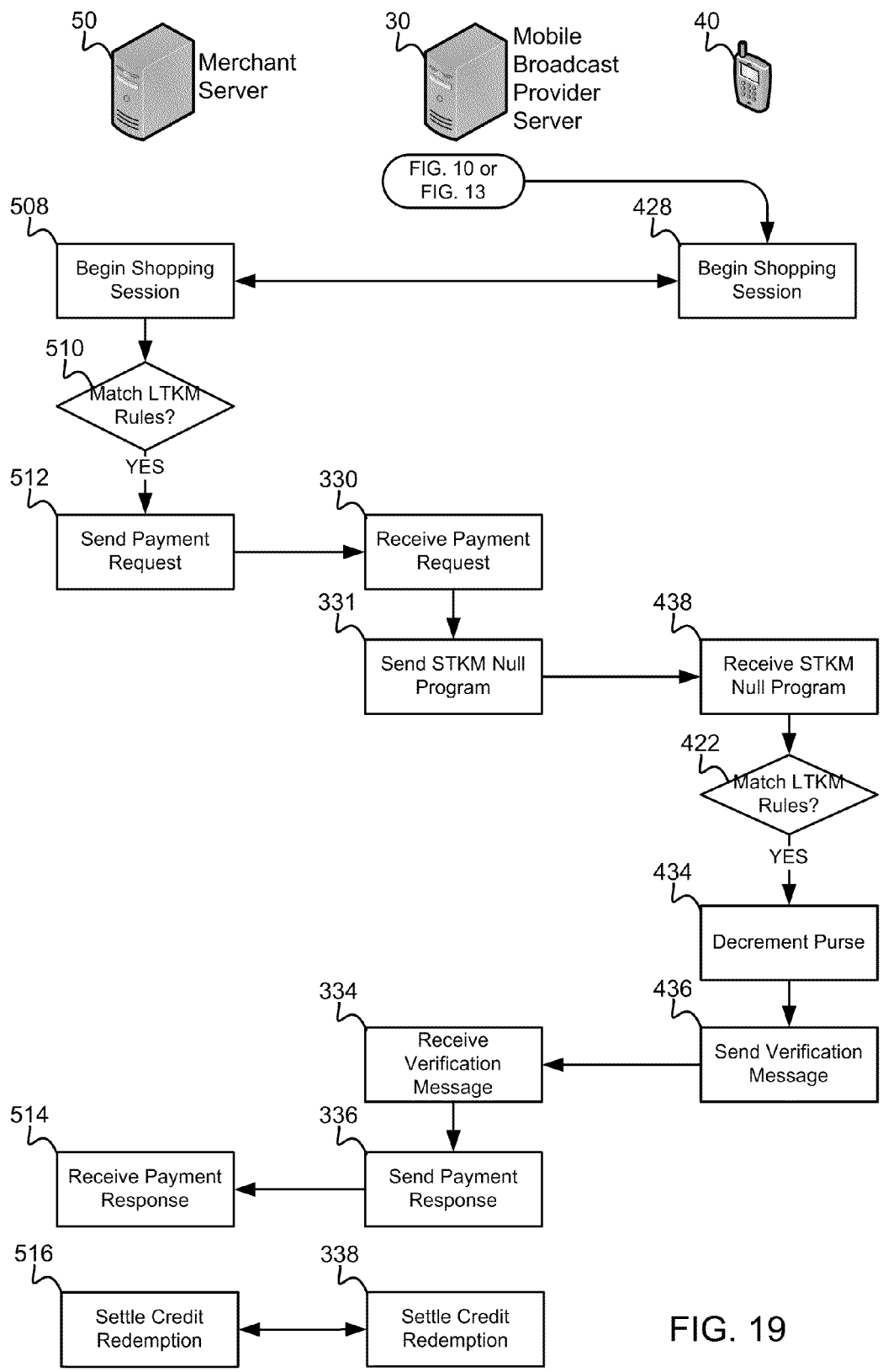
FIG. 19 is a process flow diagram of another embodiment method for redeeming credits or coupons.
Figure 20:
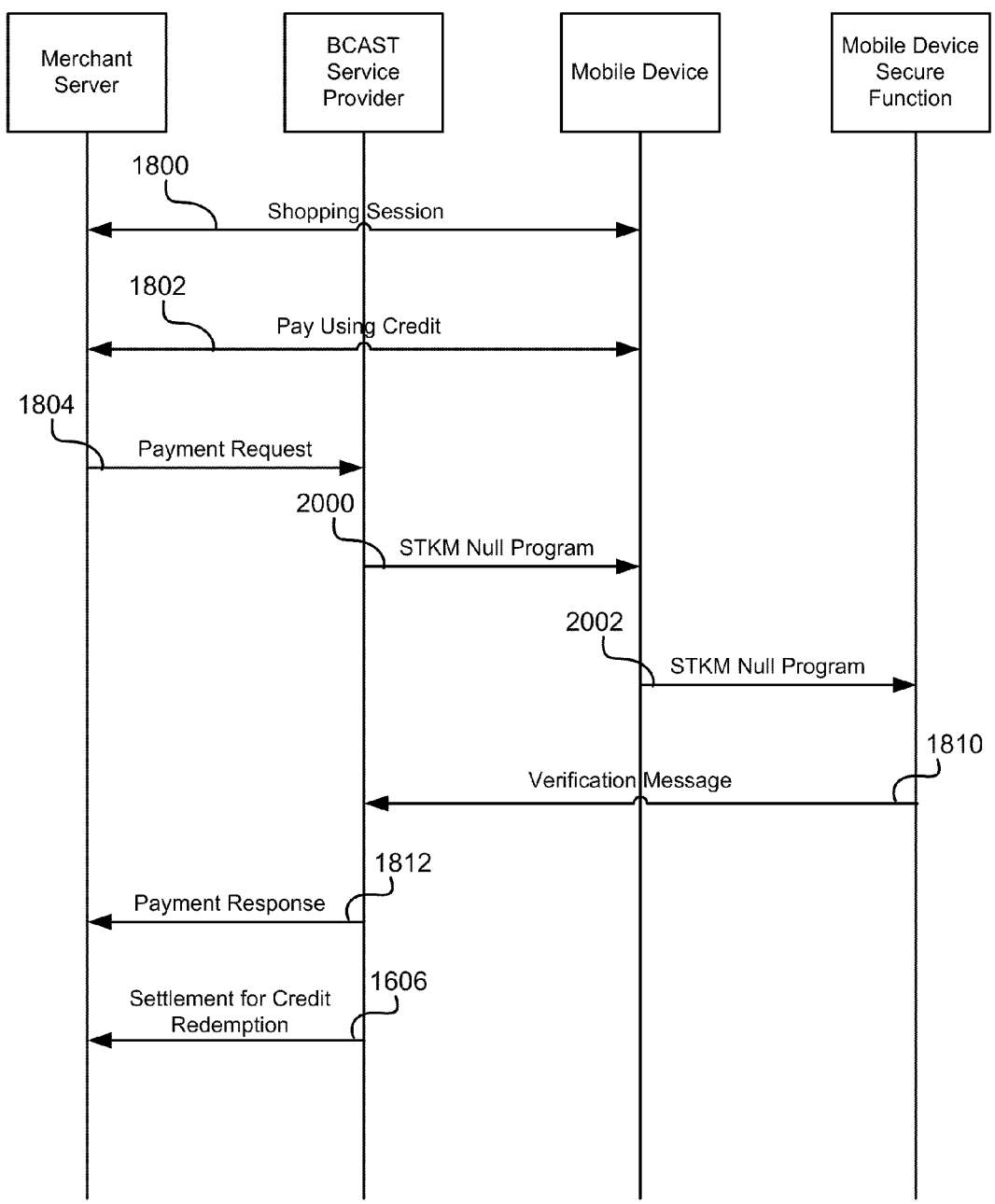
FIG. 20 is a message flow diagram of the embodiment illustrated in FIG. 20.

In an exemplary embodiment illustrated in FIG. 19, an STKM null program message may be transmitted to the user's mobile device 40 to decrement credits in order to pay for purchases of products or service. Since the STKM null program message is broadcast to all terminals, only the mobile device which had engaged in the shopping transaction should be affected by this special payment message. This is ensured by carrying the unique shopping transaction ID in the STKM null program message. All other mobile devices whose users did not engage in the shopping transaction may simply ignore this STKM message. FIG. 20 is a message flow diagram of messages that may be exchanged in the method illustrated in FIG. 19. This embodiment is described below with reference to both FIGS. 19 and 20.

The process of receiving and storing credits is described above with reference to FIG. 10 or 13. As described above, credits stored on a mobile device 40 may be used to pay for service or products when shopping at the vendor's location (POS) or while shopping on-line. The user through his/her mobile device 40 may begin a shopping session with the merchant 50, steps 428, 508 in FIG. 19 which corresponds to message 1800 in FIG. 20. The user may indicate a desire to finalize a purchase and transmit information regarding the coupons or credits stored in the mobile device 40 from the mobile device 40 to the merchant 50, message 1802 in FIG. 20. This message may be transmitted via the Internet in an on-line shopping session, or from the mobile device 40 to the merchant's POS system via a variety of known transmission methods, including, for example, a near field communication (NFC) link, a displayed barcode, or by manual entry of a coupon ID. The merchant 50 may determine whether credits may be used to pay for this transaction, determination 510. If credits may not be used for paying for this transaction (step not shown), the merchant 50 may allow user to pay using other means of payment, such as with a credit card. However, if the merchant determines that the user may pay using credits (i.e., determination 510="YES"), the merchant 50 may send a payment request message to the mobile broadcast service provider 30, step 512 in FIG. 19 which corresponds to message 1804 in FIG. 20. This payment request message 1804 may be transmitted by the Internet 90 or another network and identify the proffered coupons, the user and/or the mobile device 40. Upon receiving the payment request, step 330, the mobile broadcast service provider 30 may broadcast an STKM null program message to the mobile device 40, step 331 in FIG. 19 which corresponds to message 2000 in FIG. 20. The STKM null program message 2000 may be transmitted via the broadcast network 80 encoded so only the user's mobile device 40 can receiving and decrypt it. The mobile device 40 may receive the STKM null program broadcast message 2000, step 438, and decrypt its contents using the keys within the LTKM associated with the credits that are stored on the mobile device 40 to determine whether the LTKM rules allow access to the STKM null program broadcast message 2000, determination 422. If the LTKM rules allow access to the STKM null program message 2000 (i.e., determination 422="YES"), the message may be sent to the purse in which the credits are stored, internal message 2002, and the credits may be decremented from the purse, step 434. Once the credits are decremented, a verification message may be sent to the mobile broadcast service provider 30, step 436 in FIG. 19 which corresponds to message 1810 in FIG. 20. This verification message 1810 may be transmitted via the unicast network 70. The mobile broadcast service provider 30 may receive the verification message 1810, step 334, and send a payment response message to the merchant 50, step 336 in FIG. 19 which corresponds to message 1812 in FIG. 20. The payment response message 1812 may be transmitted via the Internet 90 or another network. The merchant 50 may receive the payment response, step 514, which informs the merchant 50 that the credits were successfully decremented so that the merchant 50 may finalize the sale. Credit redemption may then be settled between the mobile broadcast service provider 30 and the merchant 50 via any known financial transaction mechanism, steps 338, 516 in FIG. 19 which correspond to message 1606 in FIG. 20.

If the STKM null program message 2000 cannot or should not be accessed by the mobile device 40, the mobile device 40 may ignore the message. As a result, no credits will be decremented and no verification message 1810 will be sent to the service provider 30. Since the mobile broadcast service provider 30 does not receive a verification message it will send a payment response message 1812 that informs the merchant 50 that no credits were transferred. In such a scenario, the merchant 50 may deny the credits or coupons and request the user to use another form of payment for the service or product.

Figure 21:
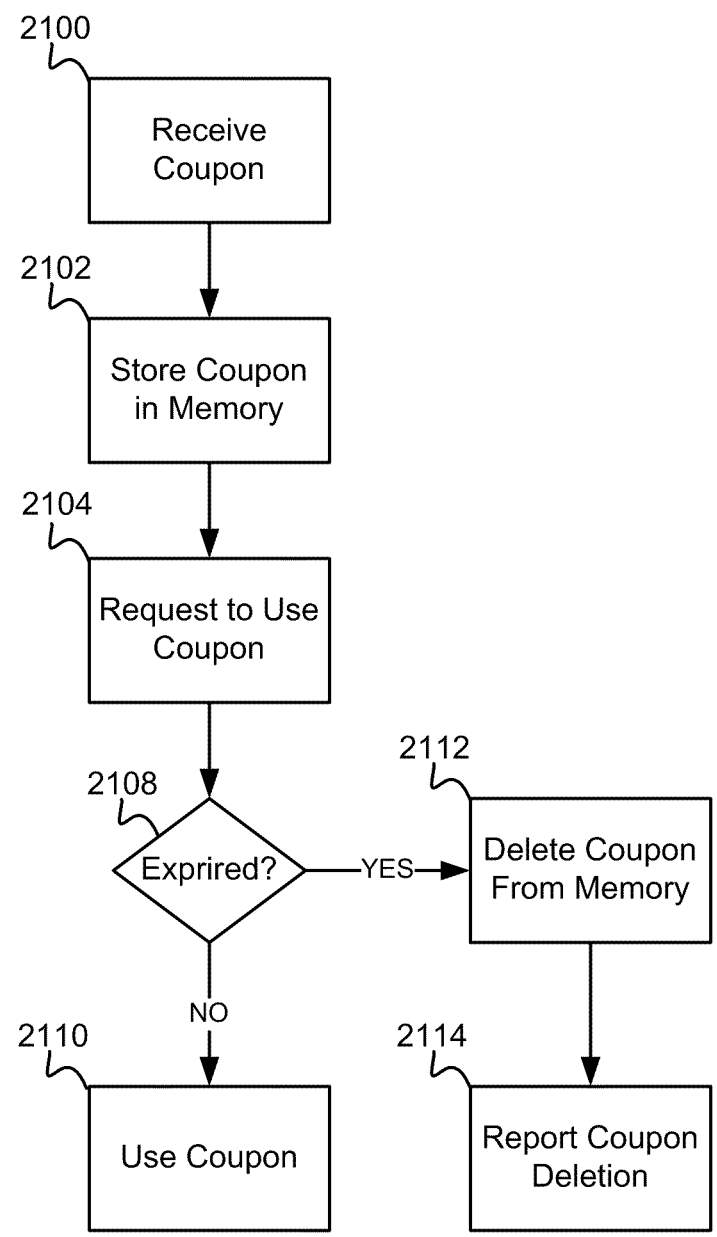
FIG. 21 is a process flow diagram of an embodiment method for managing expired credits or coupons.

Certain rules may be defined to govern the use of credits. For example, credits may include expiration dates or may only by used one time. For illustration purposes, the following examples refer to the use of coupons, however the scope of the invention is not limited to this form of credits. FIG. 21 is a process flow diagram of an embodiment method for identifying and deleting expired coupons from an electronic purse of a mobile device 40. A coupon may be received by a mobile device 40, step 2100, and stored in memory, step 2102. Later, a request to use the coupon may be received by the mobile device, step 2104. As described above, a request may be received in the form of an LTKM or STKM from the broadcast service provider 30. When the coupon is accessed in response on an LTKM or STKM, the mobile device 40 may determine whether the coupon is expired before allowing the use of the coupon, determination 2108. If the coupon is expired (i.e., determination 2108="YES"), the coupon may be deleted from the memory, step 2112, and a report of the deletion of the expired coupon may be sent to the mobile broadcast service provider 30, step 2114. Such a report of deletion of an expired coupon may be transmitted via the unicast network 70. If the coupon is not expired (i.e., determination step 2108="NO"), the coupon may be applied towards a purchase based on the received LTKM or STKM as described above, step 2110.

Figure 22:
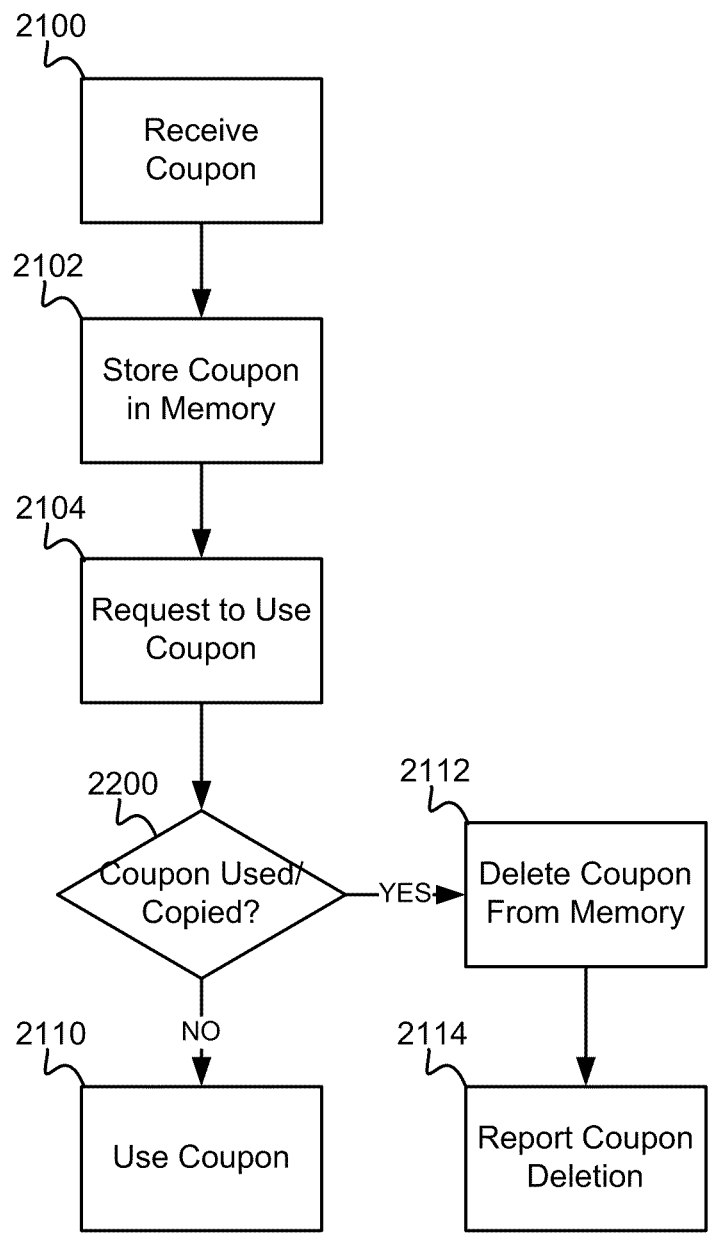
FIG. 22 is a process flow diagram of an embodiment method for managing used credits or coupons.

FIG. 22 is a process flow diagram of an exemplary embodiment method for identifying and deleting a used coupon. A coupon may be received by a mobile device 40, step 2100, and stored in the memory, step 2102. A request to use the coupon may be received by the mobile device, step 2104. As described above, a request may be received in the form of an LTKM or STKM from the broadcast service network 30. When the coupon is accessed in response to a received LTKM or STKM, the mobile device 40 may determine whether the coupon has already been used or was previously copied before it is decremented to pay for a purchase transaction, determination 2200. This determination enables coupons to be defined so they are usable just once by anyone user, usable once each by any user, useable multiple times during a promotional period, or usable according to other usage patterns that coupon creators may envision. If the coupon was used or previously copied (i.e., determination 2200="YES"), the coupon may be deleted from the memory, step 2112, and a report of the deletion may be sent to the mobile broadcast service provider 30 via the unicast network 70, step 2114. If the coupon was not previously used or copied (i.e., determination step 2108="NO"), the coupon may be applied towards the purchase based on the received LTKM or STKM as described above, step 2110.

While the foregoing embodiment descriptions referred to mobile devices communicating with the mobile broadcast service provider via a unicast network, other communication links may be used. For example, such messages could be delivered to a server pool within the mobile broadcast service provider network via an anycast network communication without departing from the scope of the claims and the invention.

While the foregoing embodiments deliver coupons or tokens to mobile devices via long term decryption key messages (e.g., LTKM) and control decrementing coupons or tokens via short term decryption key messages (e.g., STKM), the claims may encompass implementations which use dedicated coupon transaction messages which are not currently part of the known mobile broadcast standards. If such standards are modified to include dedicated coupon transaction messages, such messages would include many of the elements of and be processed similar to the short and long term decryption key messages described herein.

By using public key cryptography and electronically signing coupons, a user and/or a retailer can verify that a coupon is authentic without contacting the original issuer, or store copies of all coupons issued, respectively. In an embodiment a coupon may be issued and usable by only a single person or user-group, and may not be reused by others. In such cases, the digest in the multipurpose signature 618o may cover not only the entire contents of the coupon object, but may also cover the account identity of the user (or user-group) authorized to use the coupon, as well as other aspects of the coupon record. When a coupon is authenticated using digital signature techniques, third party attempting to submit a coupon which was not issued to him or her will be detected easily because the signature will not verify with the unauthorized account identity.

In an embodiment, the multipurpose signature 618o may be formed using an X.509 signature hierarchy. X.509 is a well-known ITU-T standard for a public-key infrastructure that specifies, among other things, formats for public-key certificates and certification path validation algorithms that enable a recipient to confirm that the signature was generated by an authority trusted by a root X.509 authority. In sum, the digital signature is obtained via a chain of certificates, with each certificate pointing to a higher certificate, and the chain of certificates pending in a trusted X.509 certificate stored by the coupon redeemer. By leveraging the X.509 authority, the root X.509 authority can authorize other companies to issue valid coupons by handing out child certificates. In this manner, the coupon verification entity can hand out coupon signature certificates to companies that wish to issue coupons, who may then issue child certificates to individual business units or divisions which use those certificates to issue verifiable coupons. A merchant point-of-sale system or merchant server 50 presented with a coupon verified by a digital signature using the X. 509 signature hierarchy can use cached verification certificates provided by the X.509 authority to verify the coupon without the need for establishing a trust relationship with the individual coupon issuer. Thus, the use of digital signatures formed using the X.509 signature hierarchy can enable merchants systems to validate coupons when they trust the X.509 authority, thereby greatly simplifying the redemption of coupons delivered according to the various embodiments. This enables merchants systems to verify coupons without having to communicate with the coupon issuer.

Figure 23:
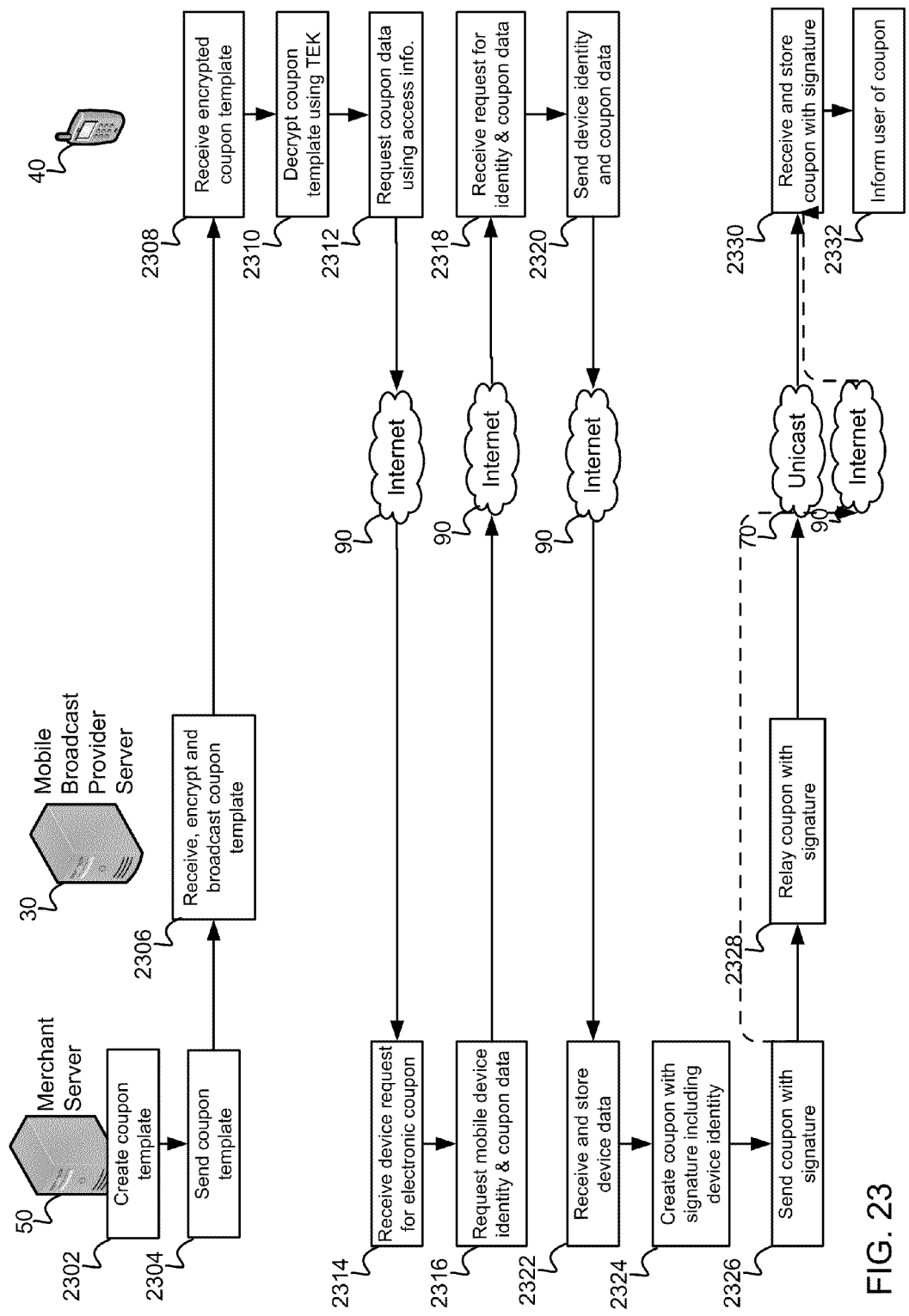
FIG. 23 is a process flow diagram of an embodiment method for broadcasting encrypted coupons templates and retrieving digitally signed coupons.

In an embodiment, coupons with digital signatures may be created and broadcasted to the mobile device 40 via mobile multimedia broadcast networks. FIG. 23 is illustrates an embodiment method for broadcasting coupons with signatures. In an embodiment, a merchant server 50 may create a coupon template including access information for coupon acquisition, such as a UR, L and a coupon ID number, step 2302, and send the coupon template to the mobile broadcast provider 30 via a network, such as the Internet, step 2304. The mobile broadcast provider 30 may receive the coupon template from the merchant server 50, and encrypt and broadcast it, step 2306. Mobile devices 40 may receive the encrypted coupon template from broadcast transmissions, step 2308. Mobile devices 40 may decrypt the coupon template by using a TEK, step 2310. As described above, the TEK is retrieved based on the LTKM and STKM that mobile devices 40 receive from the mobile broadcast provider 30. If the mobile device is one of the intended recipients of the broadcasted coupon, the mobile device 40 may receive the TEK (via the LTKM and STKM methods) that enables the device to decrypt the coupon template. If the mobile device is not part of the group for which the coupon is intended, the mobile device 40 may not have the corresponding TEK, and therefore will be unable to decrypt the coupon template. Once the coupon template is decrypted, the mobile device 40 may request a usable electronic coupon by using the Internet 90, such as via a unicast network, to access a website hosted by the merchant server 50 using the coupon access information, step 2312.

In this embodiment, the merchant server 50 may act as a coupon data repository that may receive the mobile device 40 request for an electronic coupon, step 2314. The merchant server 50 may send a request via the open Internet connection to the mobile device 40 for device identity information as well as any coupon data not conveyed in the initial request, step 2316. The mobile device 40 may receive the request for identity and coupon data via the internet 90, step 2318, and send the requested data to the merchant server 50 in response, step 2320. Such mobile device identity information may be any form of information that will identify the device and/or the user to the merchant server 50. Examples of such information include a device identifier (e.g., a MAC ID), a device telephone number, a user account number, a membership number, user name, a secret number stored in device memory known to the merchant server 50, such as a personal identification number (PIN), etc. During a transaction, one or more of these device identifiers may be required to be submitted by the mobile device.

Device identity data may be sent to the merchant server 50 using different methods. For example, the device identity data may be transmitted to the merchant server 50 automatically, such as in response to the request for the information. In such an implementation, the mobile device 40 may be configured to automatically respond to the merchant server 50 request by providing the requested identity parameters in a reply message to the merchant server 50. Alternatively, the mobile device may notify the user of the request and transmit device identity data to the merchant server 50 only upon user instructions. In such an implementation, the mobile device 40 may be configured to inform the user of the request from the merchant server 50 for identity data and prompt the user to approve or disapprove sending the requested data, and only respond when it receives a user input permitting transmission of such identity data to the merchant server 50.

The merchant server 50 may use the identity and coupon data to create a coupon that includes a digital signature, step 2324. The digital signature digest may include requesting device identification information and a coupon ID. As discussed above, the digital signature may be generated using a certificate with an X.509 signature hierarchy relating back to a root X.509 authority. As described below, the digital signature along with the device information and coupon ID may be used at the point of sale to verify the authenticity of the coupon before accepting the coupon. The verification methods at the point of sale are described in more details below with reference to FIG. 25. The merchant server 50 may send the signed coupon to the broadcast provider 30, step 2326. The broadcast provider 30 may relay the signed coupon from the merchant server 50 to the mobile device 40 using the unicast network, step 2330. Alternatively, the merchant server 50 may send the signed coupon to the mobile device 40 directly via the open communication link via the Internet 90. The mobile device 40 may receive and store the signed coupon, step 2330, and inform the user about the receipt of an electronic coupon that can now be used in a transaction, step 2332.

In an alternative embodiment, instead of providing a URL, the coupon template may include a different communication indicator or address, such as a telephone number. In such an embodiment, the mobile device 40 may communicate with the merchant server 50 to exchange device identity and receive a signed coupon via the telecommunication network, such as using SMS or MMS communication methods.

Figure 24:
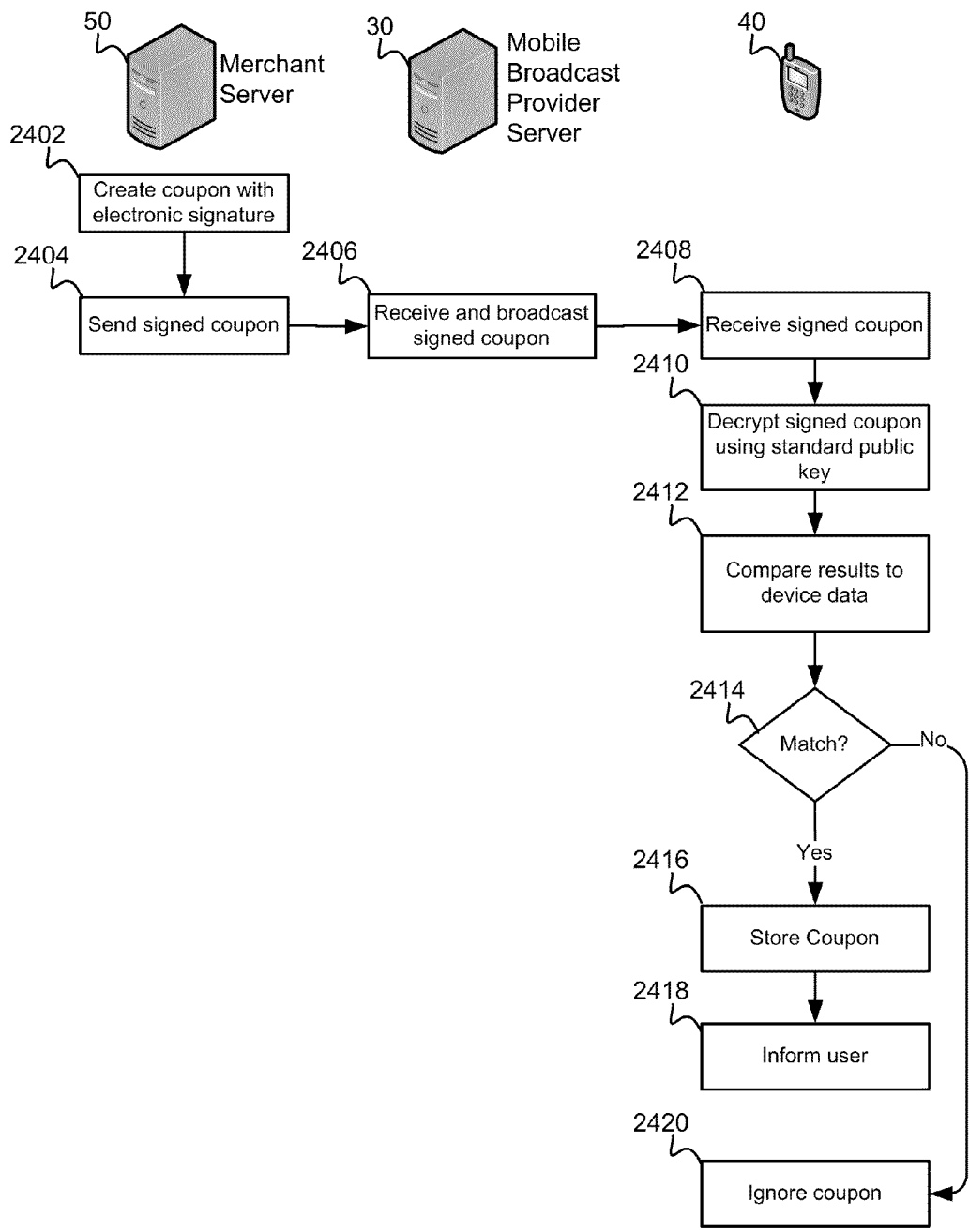
FIG. 24 is a process flow diagram of an embodiment method for broadcasting digitally signed coupons.

FIG. 24 illustrates another embodiment method by which merchant server 50 may create signed electronic coupons for broadcast to mobile devices 40 without having to encrypt the broadcast coupon. In this embodiment, the merchant server 50 may create a coupon with a digital signature encompassing the coupon data, coupon identity number and intended recipient mobile device identity data (if known) using conventional signature methods, step 2402, and send the signed coupon to the mobile broadcast provider 30 to be broadcasted, step 2404. As discussed above, the digital signature may be generated using a certificate with an X.509 signature hierarchy relating back to a root X.509 authority. As with the previous embodiment, the mobile device identity data may include any one or more device identifier, such as the device MAC ID, telephone number, PIN, an account number, or a group number. A group number may be assigned to mobile devices 40 which join or are assigned to a group of mobile devices or users (i.e., a group ID), such as through contracts or interactions with the merchants. For example, a merchant may have a frequent customer rewards program with which users can sign up and receive a group identifier that may be stored within their mobile devices for receiving electronic coupons. In this example, the merchant may issue for broadcast electronic coupons signed with the customer rewards program identifier, so that only registered customers will receive redeemable coupons via the broadcast network.

The mobile broadcast provider 30 may receive the signed coupon from the merchant server 50, and broadcast it as part of normal broadcast transmission, step 2406. In this exemplary embodiment, the signed coupon need not be encrypted by the broadcast provider 30 before it is broadcasted since the digital signature can be used to verify the coupon use by the user and by the merchant server to ensure that only certain mobile devices receive and process the coupon.

To receive and decrypt digitally signed coupons from the merchant server 50, the mobile device 40 may be pre-registered with the merchant server 50. As part of the pre-registration, the merchant may provide a decryption key for storage on the user's mobile device. Such a decryption key may be a standard public decryption key that may be shared by the merchant server 50 with the mobile device 40, such as a X.509 verification certificate. Additionally, during the pre-registration process, the mobile device 40 may share device data with the merchant server 50. The merchant server 50, may store and employ such device data received during the pre-registration to create coupons including that data with the digital signature including the device data along with the coupon data. This method enables the generation of electronic coupons that can only be used by a particular mobile device, since the digital signature can only be verified with the device data. This allows coupons awarded to individual users or small groups of users to be broadcasted in an unencrypted manner over a broadcast network 80.

Upon receipt of a broadcasted digitally signed coupon, step 2408, the mobile device 40 may use the decryption key received during pre-registration to decrypt the coupon signature, step 2410. By decrypting the signature, the mobile device 40 may access the encrypted signature data, such as the coupon data, device ID, step 2412, and determine whether the IDs retrieved from the signature match those stored on the device, determination 2414. When the digital signature is generated using a X. 509 signature certificate, the mobile device may also verify that the coupon was issued by an entity trusted by the root X.509 authority and thus by a trustworthy business. Mobile devices which do not have the proper decryption key may receive the coupon broadcast but will be unable to decrypt the signature, and thus will ignore the data.

If the device data received in the signature matches the mobile device data (i.e., determination 2414="Yes"), the mobile device 40 may store the coupon in memory of the mobile device 40, step 2416, and inform the user of receipt of an electronic coupon that can now be used in a transaction, step 2418. If the device data obtained from the decrypted signature does not match the mobile device 40 data (i.e., determination 2414="No"), the mobile device 40 may ignore the coupon as one not intended for the mobile device 40, step 2420. Also, if the mobile device 40 does not have the required decryption key to decrypt the coupon signature, the mobile device 40 may ignore the received coupon. Various combinations of encryption and digital signatures may be employed in similar manners to provide verifiable electronic coupons to specific users or groups of users via mobile broadcast networks without using the encryption methods of the broadcaster (e.g., the LTKM and STKM methods described above).

Figure 25:
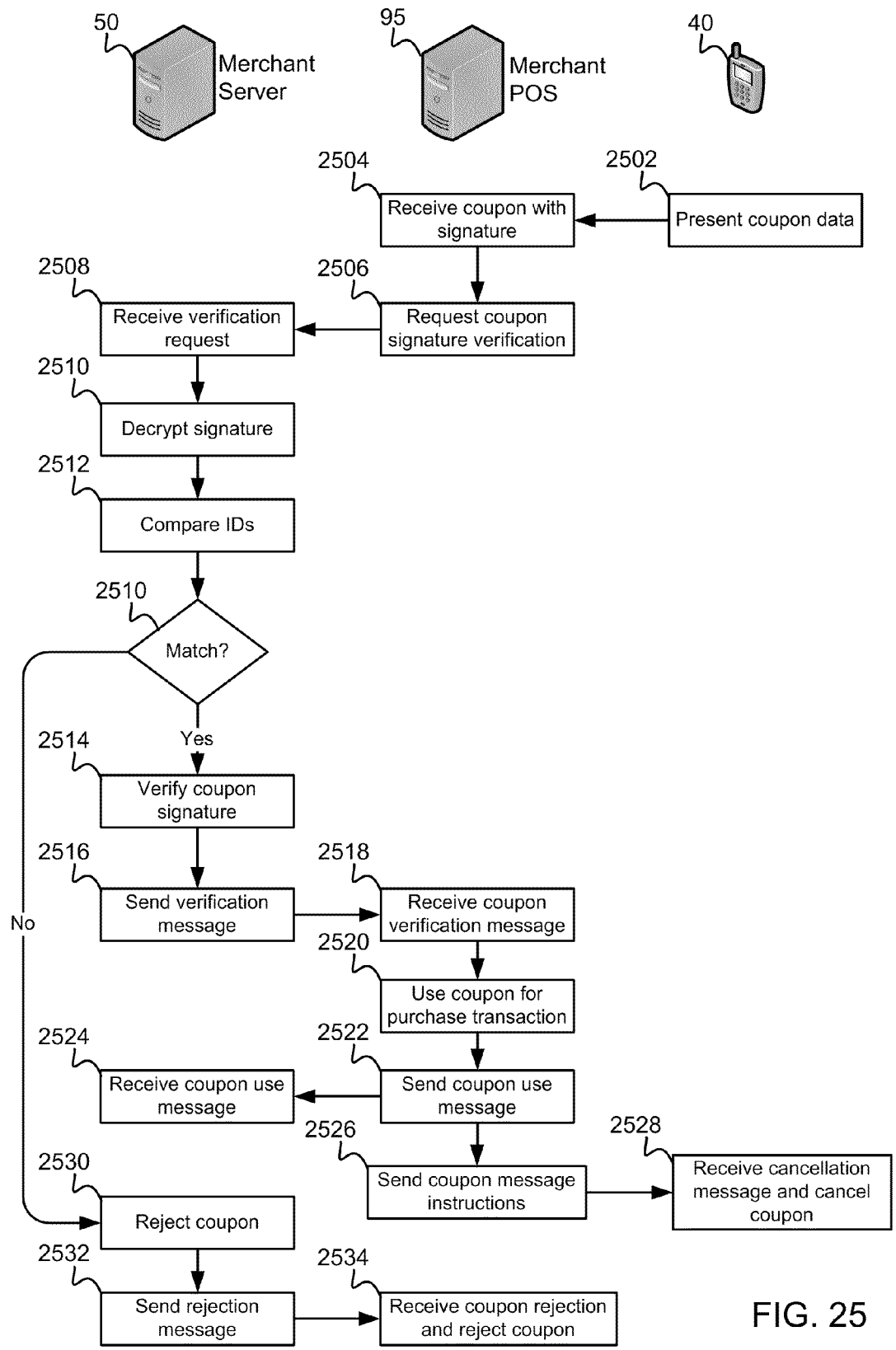
FIG. 25 is a process flow diagram of an embodiment method for redeeming digitally signed coupons.

A digitally signed coupon may be redeemed at a merchant's point of sale (POS) in a variety of ways. For example, depending on the type of coupon, merchandise may be purchased at discounts or free of charge at the point of sale. FIG. 25 illustrates an embodiment method for redeeming signed coupons during a purchase transaction at a point of sale. During the sale transaction (e.g., during "check out"), the user may present the mobile device 40 storing the signed coupon to the POS system 95. The mobile device 40 and POS system may negotiate a communication link, such as using the well known near-field communication (NFC) link, over which the mobile device 40 may then transmit the electronic coupon data along with device identity data, step 2502. The POS system 95 may receive the signed coupon and device identity data, step 2504, and send a request to the merchant server 50 requesting verification of the signed coupon, step 2506.

The verification request message from the POS may include the coupon signature, a coupon ID, and the received device identity data. The merchant server 50 may receive the verification request message, step 2508, decrypt the signature, step 2510, and compare the coupon ID and device identity data retrieved from the signature to the coupon ID and device identity data received from the POS, step 2512. When the digital signature is generated using a X. 509 signature certificate, the merchant server 50 may also verify that the coupon was issued by an entity trusted by the root X.509 authority and thus by a trustworthy business. If the digital signature is correctly decrypted (which confirms that the issuer is trusted) and the coupon ID and device identity data retrieved from the signature match those received from the POS system in the verification request message (i.e., determination 2510="Yes") the merchant server 50 may verify the coupon, step 2514.

As part of verifying the coupon, the merchant server 50 may also look up the coupon ID in a database of coupons (e.g., a dead coupon object list as described below) to determine if it has already been redeemed and may check the coupon fields to determine if the coupon has expired. If the coupon is verified by the digital signature and data records indicate it has not already been redeemed and it has not expired, the merchant server 50 may send a verification message to the POS system, step 2516. The POS system may receive the verification message, step 2518, and apply the coupon to the purchase transaction, step 2520. The POS system may optionally send a coupon use message to the merchant server 50 to inform the merchant server 50 about the use of the coupon, step 2522. The POS system may also send a coupon cancellation message to the mobile device 40, step 2526. The merchant server 50 may receive the coupon use message, step 2524, and record that the coupon ID has been redeemed. The mobile device 40 may receive the cancellation message and delete the coupon from memory, step 2528.

If the coupon ID and device identity data retrieved from the signature does not match those received from the POS, determination 2510="No", or if the coupon has expired or has already been redeemed, the merchant server 50 may reject the coupon, step 2530, and send a rejection message to the POS system, step 2532. The POS system may receive the rejection message and reject the coupon during the purchase transaction, step 2534.

Figure 26:
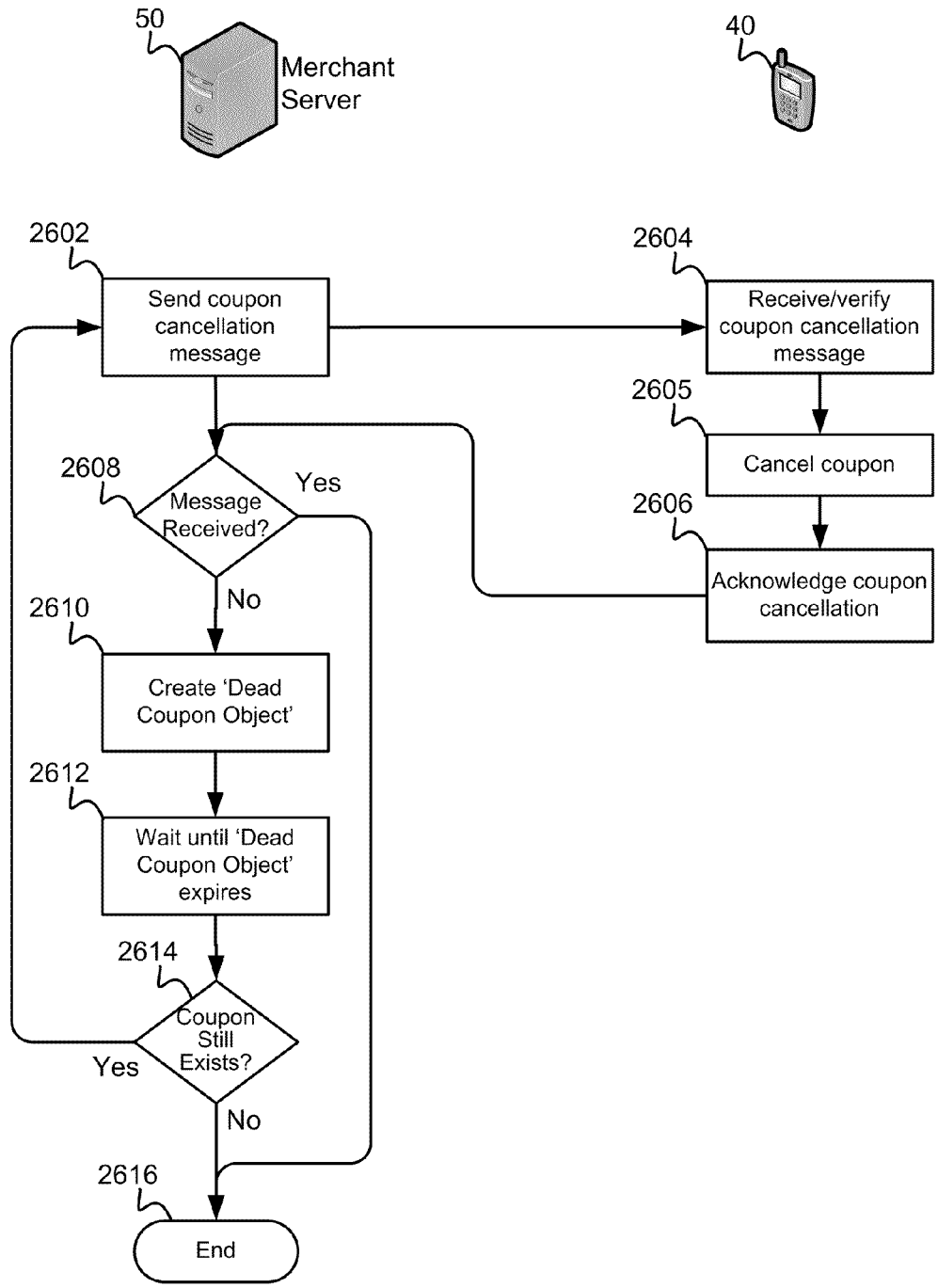
FIG. 26 is a process flow diagram of an embodiment method for managing used digitally signed coupons.

FIG. 26 illustrates an embodiment method for canceling digitally signed coupons which had been previously redeemed or have expired. Upon verifying or rejecting a signed coupon, the merchant server 50 may optionally send a coupon cancellation message to the mobile device 40, step 2602, to notify the mobile device 40 that the coupon should not be used for other purchase transactions. The coupon cancellation message may be transmitted to the mobile device 40 using a unicast network, such as SMS, email, MMS or other conventional methods. The mobile device 40 may receive the coupon cancellation message, step 2604. As part of receiving the coupon cancellation message, the mobile device 40 may check a digital signature associated with the cancellation message to verify its authenticity before deleting the corresponding coupon data from memory. This digital signature may be formed using an X.509 signature hierarchy to enable the mobile device 40 to verify that the cancellation message was sent by an authorized authority.

Upon receiving and verifying the coupon cancellation message, the mobile device 40 may delete the coupon stored in the mobile device 40, step 2605, and reply to the merchant server 50 acknowledging deletion or cancellation of the coupon in the mobile device memory, step 2606. Configuring the mobile device to delete or cancel the coupon and send a message to the merchant server 50 confirming cancellation/deletion of the coupon protects the merchant and coupon issuers from unscrupulous users attempting to cash the same coupon multiple times.

To ensure reliable operation of the coupon distribution and redemption system, the merchant server 50 may confirm whether a coupon cancellation message acknowledgement has been received in determination step 2608. If the coupon cancellation acknowledgement message has been received (i.e., determination step 2608="Yes"), the process of verifying and redeeming the coupon by the merchant server 50 may end, step 2616. However, if the coupon cancellation acknowledgment message is not received (i.e., determination step 2608="No"), the merchant server 50 may create a "dead coupon object" in a database maintained by or accessible to the server in order to track the coupon as having been redeemed, step 2610. The creation of the dead coupon object in a server-accessible database allows the server to recognize a previously redeemed coupon if presented a second time to the merchant. Thus, as part of the coupon verification process described above with reference to step 2514 in FIG. 25, the merchant server 50 may also check the dead coupon object database to determine whether the coupon is listed as having been redeemed. In an embodiment, the creation of a dead coupon object may start a countdown timer which, when expired in step 2612, prompts the merchant server 50 to determine whether the coupon is still listed in a database, such as the dead coupon object database. If the merchant server 50 is still tracking the redeemed coupon at that point in time (i.e., determination step 2614="Yes"), the merchant server may return to step 2602 to transmit another coupon cancellation message to the mobile device 40. If the merchant server 50 is no longer tracking the redeemed coupon (i.e., determination step 2614="No"), the process of verifying and redeeming the coupon by the merchant server 50 may end, step 2616. This process may also end when the coupon itself expires, since an expired coupon will be rejected based upon its expiration parameters.

In an embodiment, the electronic coupons created by the merchant server 50 may include a weighting value that may be used by merchants to define whether the coupons may be combined, and if so, the extent to which they may be combined with other coupons. The merchant may establish rules for use by POS system to use the assigned coupon weights to determine whether combination of several coupons are permitted. The merchant server 50 may implement rules such that if the sum of the weight numbers assigned to the coupons presented to the POS system is greater than a predetermined maximum, the combination of those coupons may be disallowed. For example, the merchant may assign a weight number of 0.2 to Coupon A, a weigh number of 0.5 to Coupon B, and weight number of 0.9 to Coupon C. The merchant may further implement the rule that when multiple coupons are presented to a POS system, if the sum of the weight numbers assigned to the coupons is greater than 1, the combination of those coupons is disallowed. Under such rules, the combination of Coupon A with Coupon B would be permitted because the sum of the weigh numbers assigned to Coupon A (0.2) and Coupon B (0.5) is less than 1. However, under the same rules, the combination of Coupon A with Coupon C is not permitted because the sum of the coupon weight numbers assigned to Coupon A and Coupon B equals 1.1 which is greater than 1. In the example, combining Coupons A, B and C is also not permissible, since the sum of the coupon weights is greater than 1. This process also allows the merchant system to validate and accept coupons without the need to contact the original coupon issuer(s).

Figure 27:
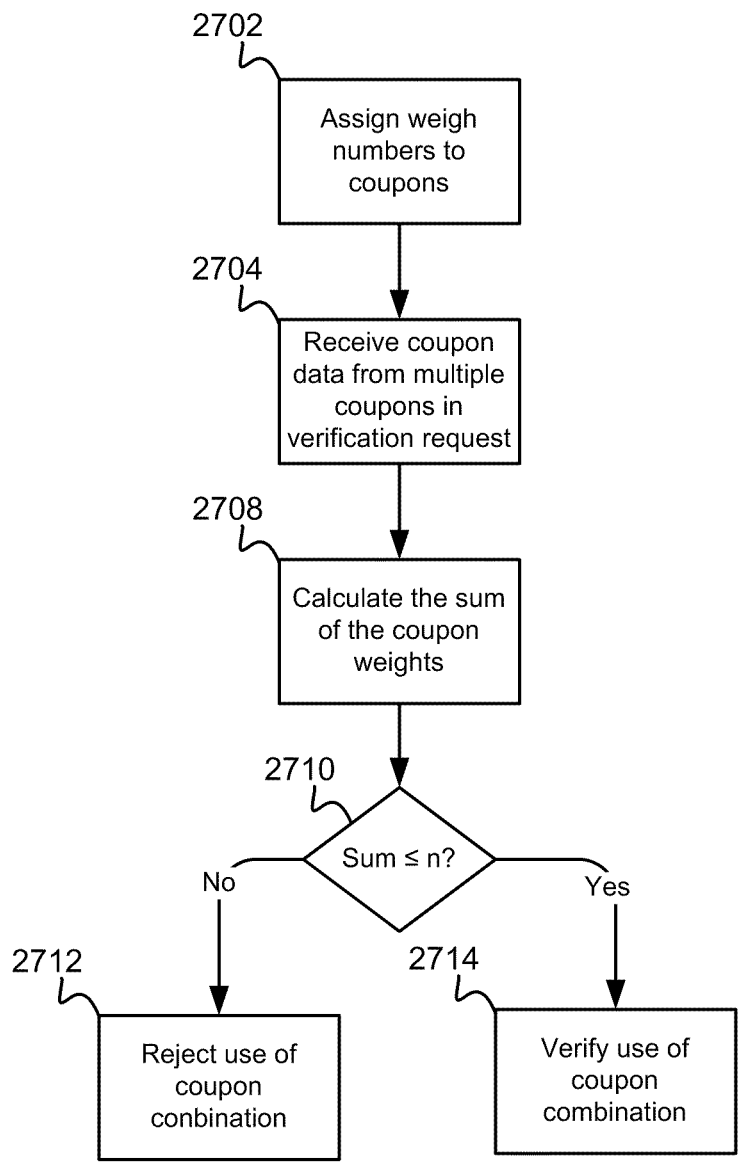
FIG. 27 is a process flow diagram of an embodiment method for permitting a combination of two coupons for one purchase transaction.

FIG. 27 illustrates an embodiment method for determining whether a combination use of multiple coupons with weights is permissible. Weigh numbers may be assigned to coupons by the coupon issuers as part of the coupon issuing process, step 2702. During a purchase transaction, a coupon manager, such as a merchant server 50, may receive a coupon verification request from a POS system (see FIG. 25) containing coupon data for two or more coupons, step 2704. The coupon manager may calculate the sum of the coupon weights, step 2708, and determine whether the sum of the coupon weights is greater than a pre-determined number "n," determination 2710. If the sum of the weights of the two or more coupons is less than or equal to "n" (i.e., determination 2710="Yes"), the merchant server 50 may verify the combined use of the two or more coupons for one purchase transaction, step 2714. If the sum of the weights of the two coupons is greater than "n" (i.e., determination 2710="No"), the merchant server 50 may reject the combined use of the two or more coupons for one purchase transaction, step 2712. The acceptance or rejection of the combined coupons may be communicated to the POS system in a verification or rejection message similar to that described above with reference to FIG. 25.

Figure 28:
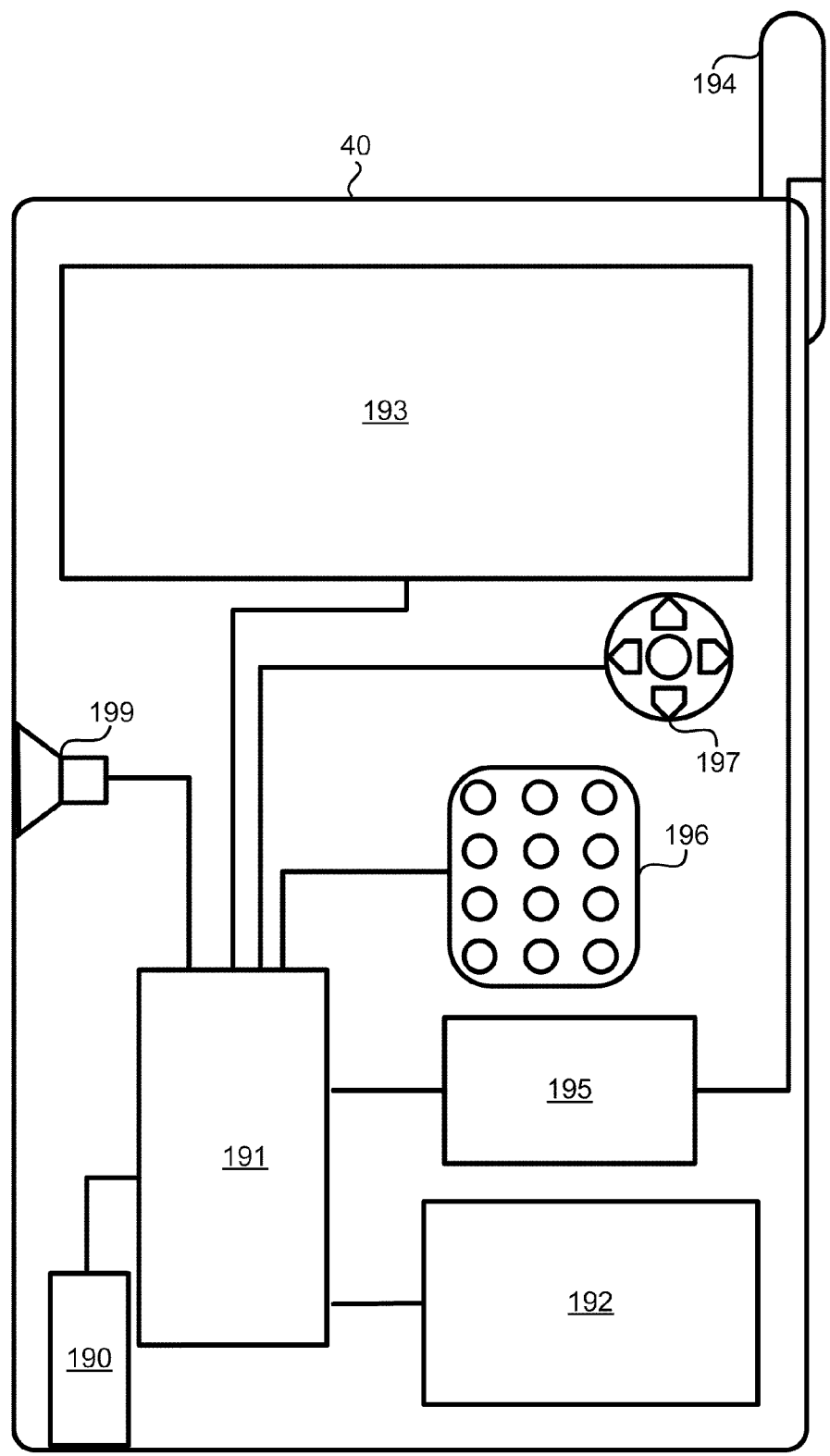
FIG. 28 is a component block diagram of a receiver device suitable for use in an embodiment.

Typical mobile receiver devices 40 suitable for use with the various embodiments will have in common the components illustrated in FIG. 28. For example, an exemplary mobile receiver device 40 may include a processor 191 coupled to internal memory 192, a display 193, and to a speaker 199. Additionally, the mobile receiver device 40 may have an antenna 194 for sending and receiving electromagnetic radiation that is connected to a wireless data link and/or cellular telephone transceiver 195 coupled to the processor 191. In some implementations, the transceiver 195 and portions of the processor 191 and memory 192 used for cellular telephone communications are collectively referred to as the air interface since it provides a data interface via a wireless data link. Mobile receiver devices typically also include a key pad 196 or miniature keyboard and menu selection buttons or rocker switches 197 for receiving user inputs.

The processor 191 may be any programmable microprocessor, microcomputer or multiple processor chip or chips that can be configured by software instructions (applications) to perform a variety of functions, including the functions of the various embodiments described herein. In some mobile devices, multiple processors 191 may be provided, such as one processor dedicated to wireless communication functions and one processor dedicated to running other applications. Typically, software applications may be stored in the internal memory 192 before they are accessed and loaded into the processor 191. In some mobile devices, the processor 191 may include internal memory sufficient to store the application software instructions. The mobile device 40 may also include a separate memory chip 190 such as smart card for storing information related to credits, token and coupons such as in an electronic purse according to the various embodiments. In some mobile devices, the secure memory may be in a separate memory chip coupled to the processor 191. In many mobile devices 40, the internal memory 192 may be a volatile or nonvolatile memory, such as flash memory, or a mixture of both. For the purposes of this description, a general reference to memory refers to all memory accessible by the processor 191, including internal memory 192, the memory chip 190, removable memory plugged into the mobile device, and memory within the processor 191 itself.

Figure 29:
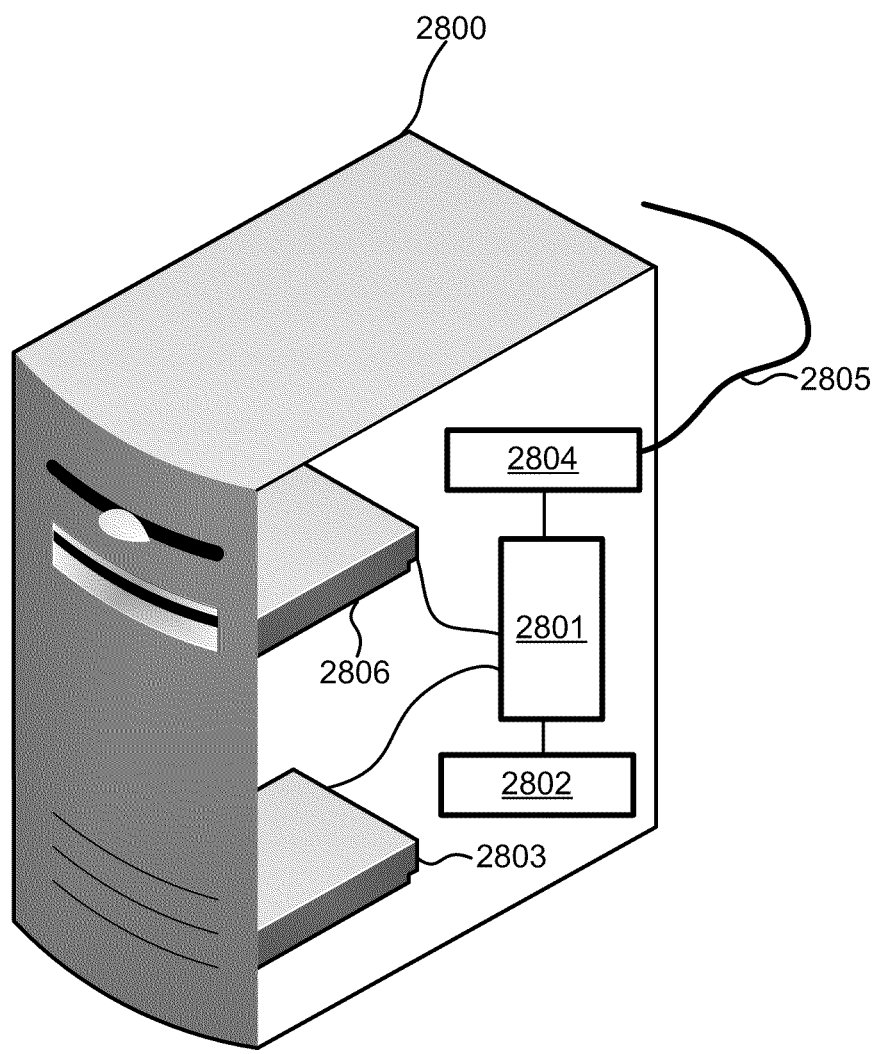
FIG. 29 is a component block diagram of a server device suitable for use in an embodiment.

A number of the embodiments described above may also be implemented with any of a variety of remote server devices, such as the server 2800 illustrated in FIG. 29. Such a server 2800 typically includes a processor 2801 coupled to volatile memory 2802 and a large capacity nonvolatile memory, such as a disk drive 2803. The server 2800 may also include a floppy disc drive and/or a compact disc (CD) drive 2806 coupled to the processor 2801. The server 2800 may also include network access ports 2804 coupled to the processor 2801 for establishing data connections with network circuits 2805, such as the Internet.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on as one or more instructions or code on a computer-readable medium. The steps of a method or algorithm disclosed herein may be embodied in a processor-executable software module executed which may reside on a computer-readable medium. Computer-readable media includes computer storage media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A system for distributing electronic coupons via a mobile broadcast television system, comprising:
    a mobile broadcast television network, comprising a broadcast transmitter, and a server configured with server-executable instructions configured to cause the server to perform operations comprising:
        causing the broadcast transmitter to broadcast a coupon template including coupon access information;
        receiving receiver device identity data from a receiver device;
        creating a digitally signed coupon including a digital signature, wherein included in a digest of the digital signature is the receiver device identity data received from the receiver device and a coupon ID; and
        transmitting the digitally signed coupon including the receiver device identity data and the coupon ID in the digest of the digital signature to the receiver device via a unicast network; and
    the receiver device configured to receive mobile broadcast television transmissions, comprising:
        a processor;
        a memory coupled to the processor; and
        a receiver circuit coupled to the processor and configured to receive the mobile broadcast television transmissions, wherein the processor is configured with processor-executable instructions to perform operations comprising:
            receiving the coupon template including the coupon access information;
            transmitting the receiver device identity data to the server based on the coupon template access information;
            receiving the digitally signed coupon from the server via the unicast network including the receiver device identity data and the coupon ID in the digest of the digital signature;
            determining whether the received receiver device identity data in the digest of the digital signature matches the transmitted receiver device identity data; and
            storing the digitally signed coupon in the memory when there is a match between the received receiver device identity data in the digest of the digital signature and the transmitted receiver device identity data.

2. The system of claim 1, wherein the coupon template access information is selected from a group consisting of a uniform resource locator, and a telephone number.

3. The system of claim 1, wherein the receiver device identity data comprises one or more items selected from a group consisting of a receiver device media access control identification, a telephone number, a user account number, a group identifier, a personal identification number, and a user name.

4. The system of claim 1, wherein the processor is configured with processor-executable instructions such that the receiver device identity data is transmitted to the server via the Internet.

5. The system of claim 1, wherein the processor is configured with processor-executable instructions such that the receiver device identity data is transmitted to the server via the unicast network.

6. The system of claim 1, wherein the server is configured with server-executable instructions such that generating the digital signature of the digitally signed coupon comprises generating the digital signature using a chain of X.509 certificates leading to a root X.509 coupon-signing authority.

7. The system of claim 1, further comprising a point of sale system, wherein the processor is configured with processor-executable instructions to perform operations further comprising providing coupon data and the digital signature from the receiver device to the point of sale system in a coupon redemption transaction.

8. The system of claim 7, wherein the point of sale system is configured to verify the coupon data based upon the coupon data and the digital signature.

9. The system of claim 7, further comprising a coupon verification system configured with server-executable instructions to perform operations comprising:
    receiving a coupon verification request from the point of sale system requesting verification of validity of the digitally signed coupon, wherein the verification request is accompanied by the digitally signed coupon, the receiver device identity data and the coupon ID;
    decrypting the digital signature of the digitally signed coupon received with the verification request;
    determining whether the receiver device identity and the coupon ID retrieved from the digital signature match the receiver device identity and the coupon ID; and
    transmitting a coupon verification message to the point of sale system verifying the digitally signed coupon if the receiver device identity and the coupon ID retrieved from the digital signature match the receiver device identity and the coupon ID.

10. The system of claim 9, wherein:
    the point of sale system is further configured to transmit a coupon cancellation message to the receiver device; and
    the processor is configured with processor-executable instructions to perform operations further comprising deleting the digitally signed coupon from the memory of the receiver device in response to receiving the coupon cancellation message.

11. The system of claim 9, wherein the coupon verification system is configured with server-executable instructions such that decrypting the digital signature comprises decrypting the digital signature using a chain of X.509 certificates leading to a root X.509 coupon-signing authority.

12. A receiver device, comprising:
    a processor;
    a memory coupled to the processor; and
    a receiver circuit coupled to the processor and configured to receive mobile broadcast television transmissions, wherein the processor is configured with processor-executable instructions to perform operations comprising:
        receiving a coupon template in a mobile broadcast television transmission, the coupon template including coupon access information;

establishing a communication link with a server based on the coupon access information;

transmitting to the server receiver device identity data of the receiver device;

receiving a digitally signed coupon including a digital signature, wherein included in a digest of the digital signature is the receiver device identity data transmitted from the receiver device and a coupon ID;

determining whether the received receiver device identity data in the digest of the digital signature matches the transmitted receiver device identity data; and storing the digitally signed coupon in the memory of the receiver device when there is a match between the received receiver device identity data in the digest of the digital signature and the transmitted receiver device identity data.

13. The receiver device of claim 12, wherein the coupon template access information is selected from a group consisting of a uniform resource locator, and a telephone number.

14. The receiver device of claim 12, wherein the receiver device identity data comprises one or more items selected from a group consisting of a receiver device media access control identification, a telephone number, a user account number, a group identifier, a personal identification number, and a user name.

15. The receiver device of claim 12, wherein the processor is configured with processor-executable instructions such that the communication link with the server and the receiver device identity data are transmitted to the server via the Internet.

16. The receiver device of claim 12, wherein the processor is configured with processor-executable instructions such that the communication link with the server and the receiver device identity data are transmitted to the server via a unicast network.

17. The receiver device of claim 12, wherein the processor is configured with processor-executable instructions to perform operations further comprising verifying the digital signature, wherein the digitally signed coupon is stored in the memory if the digital signature is verified.

18. The receiver device of claim 17, wherein the processor is configured with processor-executable instructions such that the digital signature is verified using a chain of X.509 certificates leading to a root X.509 coupon-signing authority.

19. The receiver device of claim 12, wherein the processor is configured with processor-executable instructions to perform operations further comprising providing coupon data and the digital signature to a point of sale system in a coupon redemption transaction.

20. The receiver device of claim 19, wherein the processor is configured with processor-executable instructions to perform operations further comprising:

receiving a coupon cancellation message from the point of sale system; and deleting the digitally signed coupon from the memory in response to receiving the coupon cancellation message.

21. A receiver device, comprising:

means for receiving a coupon template in a mobile broadcast television transmission, the coupon template including coupon access information;

means for establishing a communication link with a server based on the coupon access information;

means for transmitting to the server receiver device identity data of the receiver device;

means for receiving a digitally signed coupon including a digital signature, wherein included in a digest of the digital signature is the receiver device identity data transmitted from the receiver device and a coupon ID;

means for determining whether the received receiver device identity data in the digest of the digital signature matches the transmitted receiver device identity data; and means for storing the digitally signed coupon in the receiver device when there is a match between the received receiver device identity data in the digest of the digital signature and the transmitted receiver device identity data.

22. The receiver device of claim 21, wherein the coupon template access information is selected from a group consisting of a uniform resource locator, and a telephone number.

23. The receiver device of claim 21, wherein the receiver device identity data comprises one or more items selected from a group consisting of a receiver device media access control identification, a telephone number, a user account number, a group identifier, a personal identification number, and a user name.

24. The receiver device of claim 21, wherein:

means for establishing the communication link with the server comprises means for establishing an Internet communication link; and means for transmitting the receiver device identity data to the server comprises means for transmitting the receiver device identity data to the server via the established Internet communication link.

25. The receiver device of claim 21, wherein:

means for establishing the communication link with the server comprises means for establishing a unicast communication link; and means for transmitting the receiver device identity data to the server comprises means for transmitting the receiver device identity data to the server via the established unicast communication link.

26. The receiver device of claim 21, further comprising means for verifying the digital signature, wherein the digitally signed coupon is stored in memory if the digital signature is verified.

27. The receiver device of claim 26, wherein means for verifying the digital signature comprises means for verifying the digital signature using a chain of X.509 certificates leading to a root X.509 coupon-signing authority.

28. The receiver device of claim 21, further comprising means for providing coupon data and the digital signature to a point of sale system in a coupon redemption transaction.

29. The receiver device of claim 28, further comprising:

means for receiving a coupon cancellation message from the point of sale system; and means for deleting the digitally signed coupon from memory in response to receiving the coupon cancellation message.

30. A non-transitory processor readable storage medium having stored thereon processor-executable instructions configured to cause a processor within a receiver device capable of receiving mobile broadcast television transmissions to perform operations comprising:

receiving a coupon template in a mobile broadcast television transmission, the coupon template including coupon access information;

establishing a communication link with a server based on the coupon access information;

transmitting to the server receiver device identity data of the receiver device;

receiving a digitally signed coupon including a digital signature, wherein included in a digest of the digital signature is the receiver device identity data regarding transmitted from the receiver device and a coupon ID;
determining whether the received receiver device identity data in the digest of the digital signature matches the transmitted receiver device identity data; and
storing the digitally signed coupon in a memory of the receiver device when there is a match between the received receiver device identity data in the digest of the digital signature and the transmitted receiver device identity data.

31. The non-transitory processor readable storage medium of claim 30, wherein the coupon template access information is selected from a group consisting of a uniform resource locator, and a telephone number.

32. The non-transitory processor readable storage medium of claim 30, wherein the receiver device identity data comprises one or more items selected from a group consisting of a receiver device media access control identification, a telephone number, a user account number, a group identifier, a personal identification number, and a user name.

33. The non-transitory processor readable storage medium of claim 30, wherein:
establishing the communication link with the server comprises establishing an Internet communication link; and
transmitting the receiver device identity data to the server comprises transmitting the receiver device identity data to the server via the established Internet communication link.

34. The non-transitory processor readable storage medium of claim 30, wherein:
establishing the communication link with the server comprises establishing a unicast communication link; and
transmitting the receiver device identity data to the server comprises transmitting the receiver device identity data to the server via the established unicast communication link.

35. The non-transitory processor readable storage medium of claim 30, wherein the stored processor-executable instructions are configured to cause the processor to perform operations further comprising verifying the digital signature, wherein storing the digitally signed coupon is in the memory is accomplished if the digital signature is verified.

36. The non-transitory processor readable storage medium of claim 35, wherein verifying the digital signature comprises verifying the digital signature using a chain of X.509 certificates leading to a root X.509 coupon-signing authority.

37. The non-transitory processor readable storage medium of claim 30, further comprising providing coupon data and the digital signature to a point of sale system in a coupon redemption transaction.

38. The non-transitory processor readable storage medium of claim 37, wherein the stored processor-executable instructions are configured to cause the processor to perform operations further comprising:
receiving a coupon cancellation message from the point of sale system; and
deleting the digitally signed coupon from the memory in response to receiving the coupon cancellation message.

39. A method for providing electronic coupons to receiver devices via a mobile broadcast television system, comprising:
broadcasting a digitally signed coupon from a mobile broadcast television network, the digitally signed coupon including a digital signature, wherein included in a digest of the digital signature is receiver device identity data received from a receiver device and a coupon ID;
receiving the digitally signed coupon in the receiver device;
decrypting the digital signature using a decryption key;
obtaining the receiver device identity data included in the digital signature;
determining whether the obtained receiver device identity data matches identity data of the receiver device; and
storing the digitally signed coupon in a memory of the receiver device when there is a match between the obtained receiver device identity data and the identity data of the receiver device.

40. The method of claim 39, wherein decrypting the digital signature is accomplished using a chain of X.509 certificates leading to a root X.509 coupon-signing authority.

41. A receiver device, comprising:
a processor;
a memory coupled to the processor; and
a receiver circuit coupled to the processor and configured to receive mobile broadcast television transmissions, wherein the processor is configured with processor-executable instructions to perform operations comprising:
receiving a digitally signed coupon from a mobile broadcast television network, the digitally signed coupon and including a digital signature, wherein included in a digest of the digital signature is receiver device identity data of the receiver device and a coupon ID;
decrypting the digital signature using a decryption key;
obtaining the receiver device identity data included in the digital signature;
determining whether the obtained receiver device identity data matches identity data of the receiver device; and
storing the digitally signed coupon in the memory when there is a match between the obtained receiver device identity data and the identity data of the receiver device.

42. The receiver device of claim 41, wherein the processor is configured with processor-executable instructions such that decrypting the digital signature is accomplished using a chain of X.509 certificates leading to a root X.509 coupon-signing authority.

43. A receiver device, comprising:
means for receiving a digitally signed coupon from a mobile broadcast television network, the digitally signed coupon including a digital signature, wherein included in a digest of the digital signature is receiver device identity data of the receiver device and a coupon ID;
means for decrypting the digital signature using a decryption key;
means for obtaining the receiver device identity data included in the digital signature;
means for determining whether the obtained receiver device identity data matches identity data of the receiver device; and
means for storing the digitally signed coupon when there is a match between the obtained receiver device identity data and the identity data of the receiver device.

44. The receiver device of claim 43, wherein means for decrypting the digital signature using the decryption key comprises means for decrypting the digital signature using a chain of X.509 certificates leading to a root X.509 coupon-signing authority.

45. A non-transitory processor readable storage medium having stored thereon processor-executable instructions configured to cause a processor of a receiver device capable of receiving mobile broadcast television transmissions to perform operations comprising:
- receiving a digitally signed coupon from a mobile broadcast television network, the digitally signed coupon including a digital signature;
- decrypting the digital signature using a decryption key;
- obtaining the receiver device identity data included in the digital signature;
- determining whether the obtained receiver device identity data matches identity data of the receiver device; and
- storing the digitally signed coupon when there is a match between the obtained receiver device identity data and the identity data of the receiver device.

46. The non-transitory processor readable storage medium of claim 45, wherein decrypting the digital signature using the decryption key comprises decrypting the electronic digital signature using a chain of X.509 certificates leading to a root X.509 coupon signing authority.

* * * * *